April 17, 1945.  W. L. MAXSON ET AL  2,373,771
MATHEMATICAL APPARATUS
Filed June 24, 1938   32 Sheets-Sheet 1
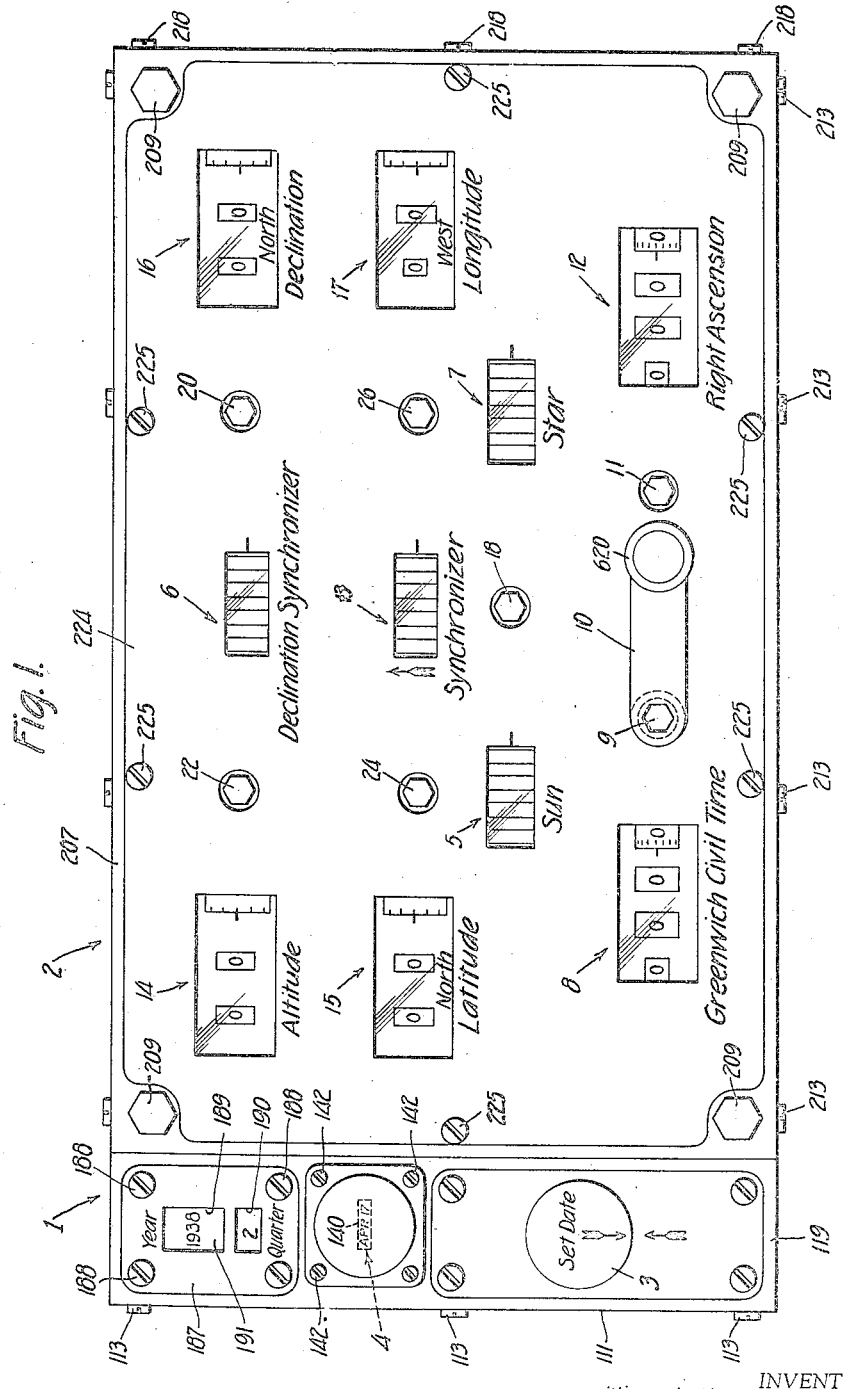
INVENTORS
William L. Maxson
Peter J. McLaren and
William T. Green
BY Moses & Nolte
ATTORNEYS

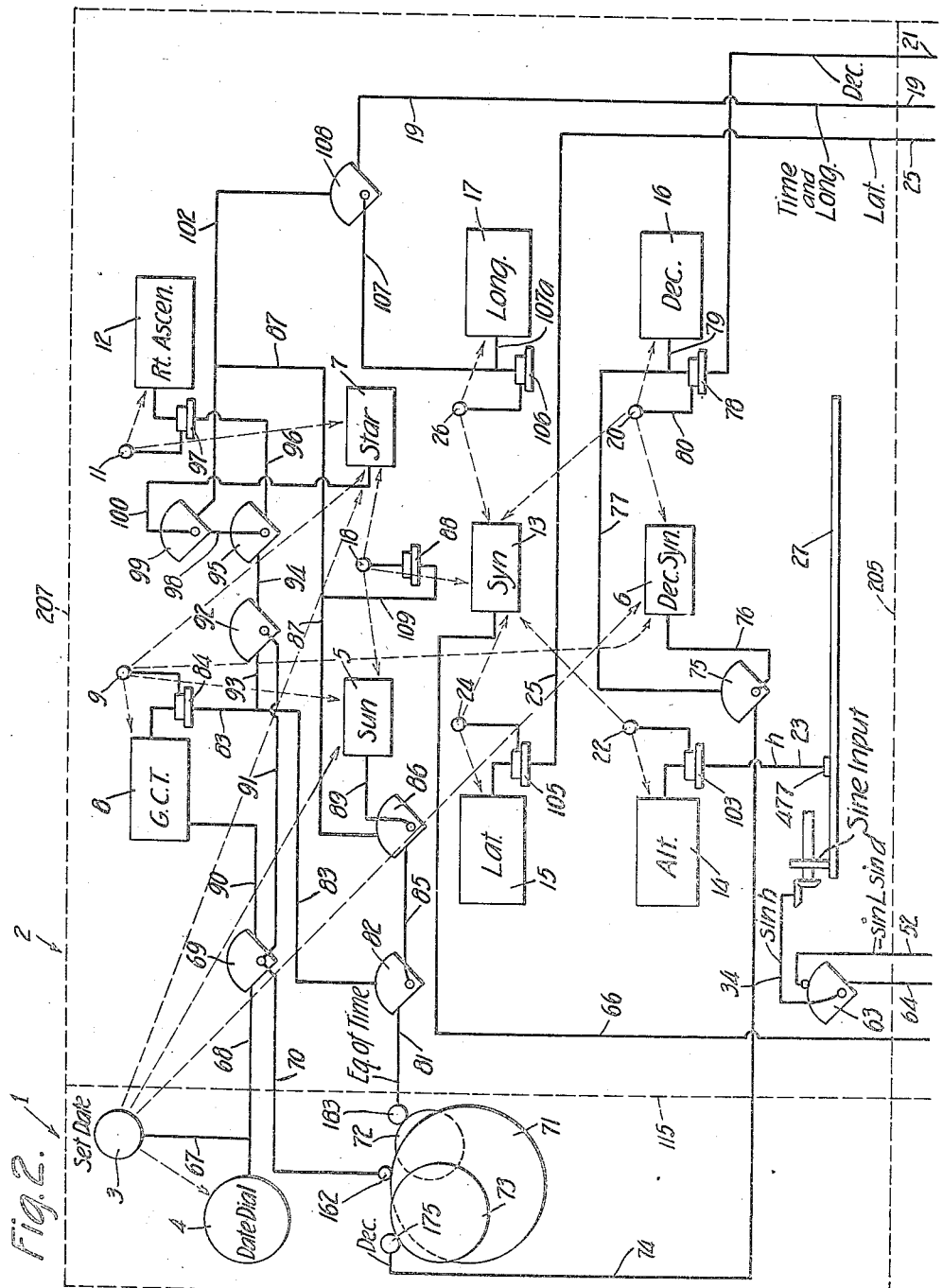

April 17, 1945.

W. L. MAXSON ET AL
MATHEMATICAL APPARATUS
Filed June 24, 1938
32 Sheets-Sheet 3

Fig. 3.

$\sin h = \sin L \sin d$ $\sin h - \sin L \sin d = \cos L \cos d \cos t + 1$ $\dfrac{4 - 4 \cos L \cos d \cos t}{1 - \cos L \cos d \cos t} = \dfrac{4}{1}$ $\dfrac{[1-\cos(L-d)] - [1-\cos(L+d)]}{} = \sin L \sin d$ $[1-\cos(L+d-t)] + [1-\cos(L-d+t)] = 2(1-\cos L \cos d \cos t + \sin L \sin d \cos t)$ $[1-\cos(L-d-t)] + [1-\cos(L-d+t)] = 2(1-\cos L \cos d \cos t - \sin L \sin d \cos t)$ INVENTORS
William L. Maxson
Peter J. McLaren and
William T. Green
BY Moses & Nolte
ATTORNEYS

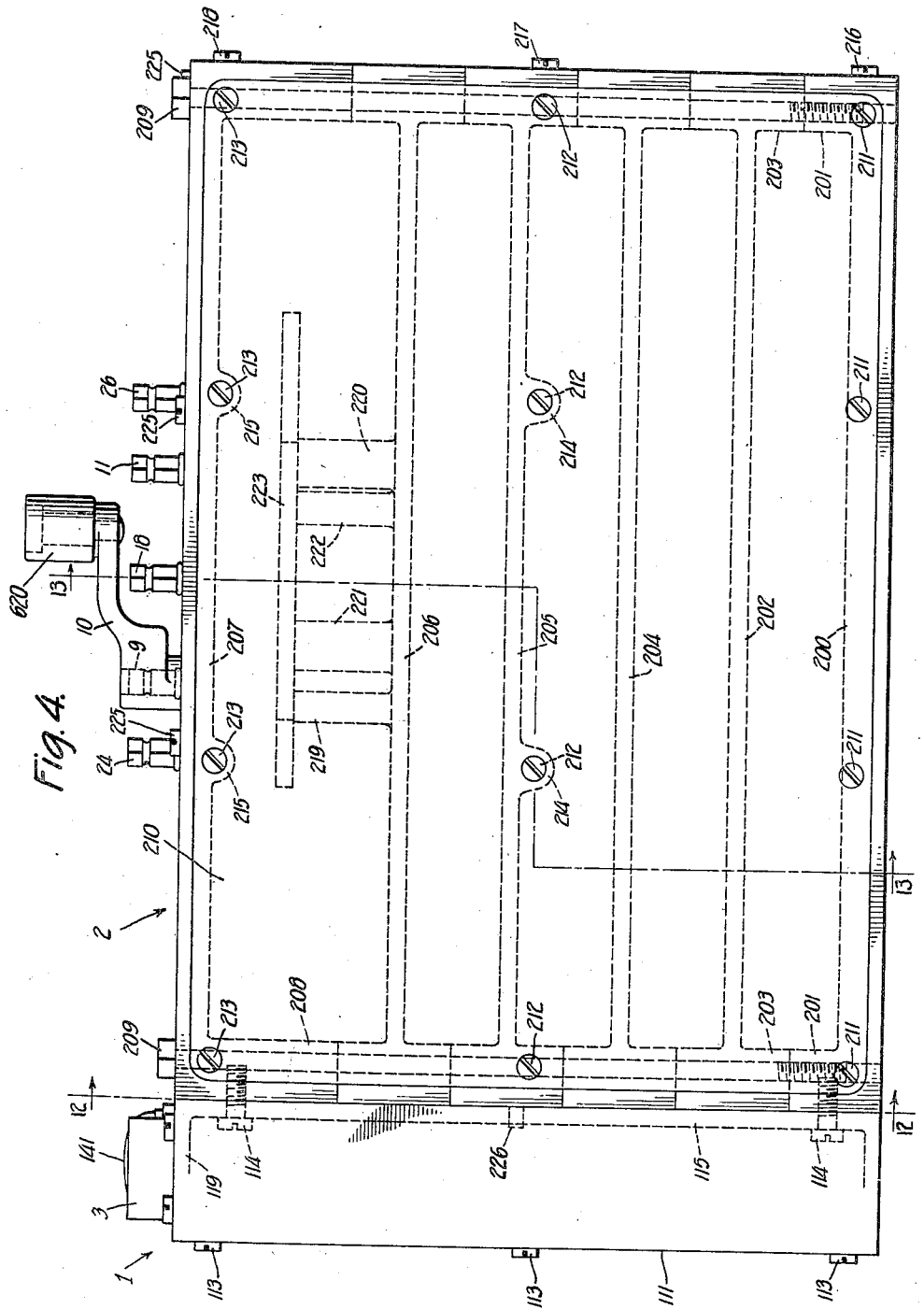

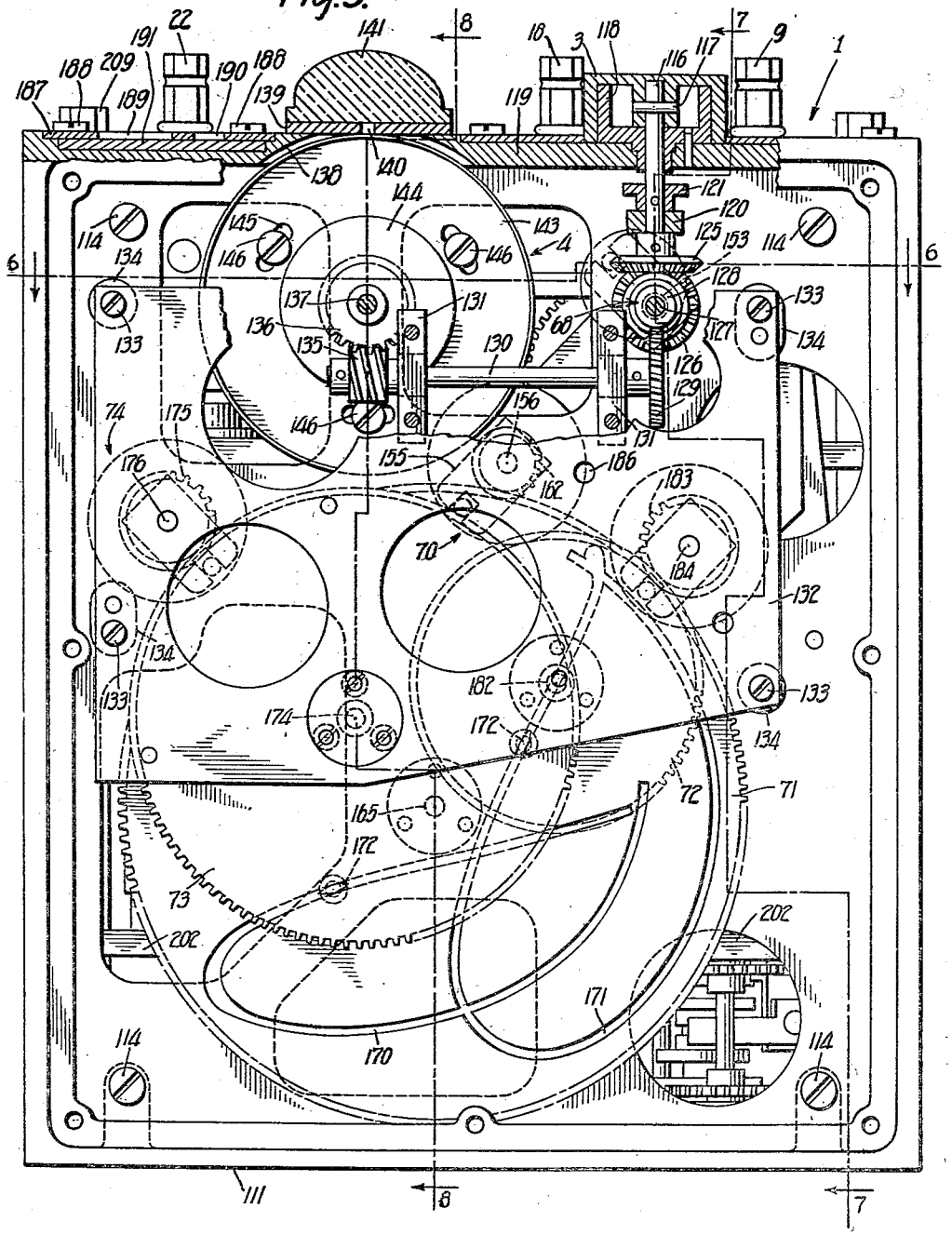

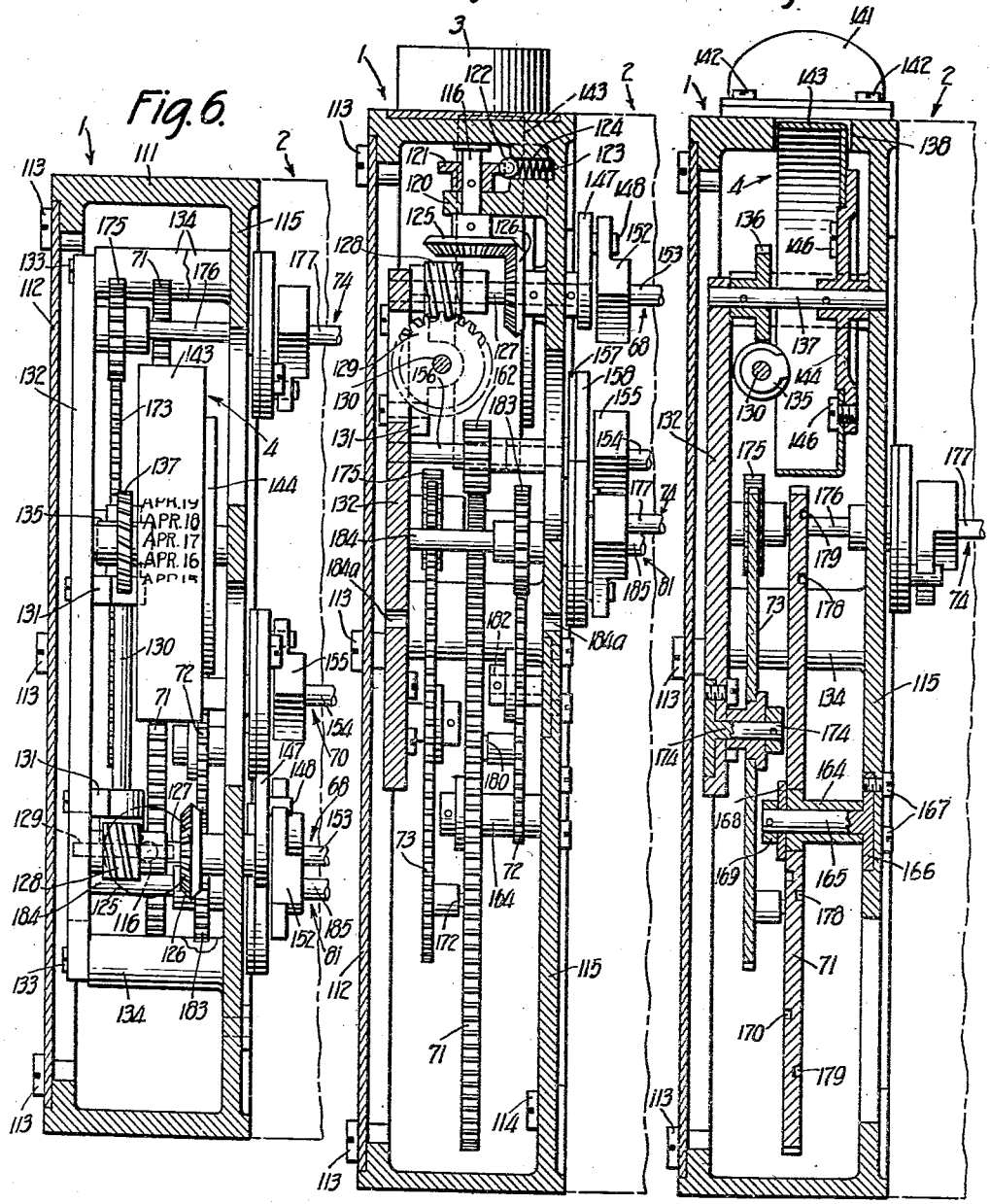

April 17, 1945.　　W. L. MAXSON ET AL　　2,373,771
MATHEMATICAL APPARATUS
Filed June 24, 1938　　32 Sheets-Sheet 7

INVENTORS
William L. Maxson
Peter J. McLaren and
William T. Green
BY Moses & Nolte
ATTORNEYS April 17, 1945.     W. L. MAXSON ET AL     2,373,771
MATHEMATICAL APPARATUS
Filed June 24, 1938     32 Sheets-Sheet 8

First Quarter Cam

Second Quarter Cam

INVENTORS
William L. Maxson
Peter J. McLaren and
BY William T. Green
ATTORNEYS

April 17, 1945. W. L. MAXSON ET AL 2,373,771
MATHEMATICAL APPARATUS
Filed June 24, 1938 32 Sheets-Sheet 9

INVENTORS
William L. Maxson
Peter J. McLaren and
William T. Green
BY Moses & Nolte
ATTORNEYS April 17, 1945.  W. L. MAXSON ET AL  2,373,771
MATHEMATICAL APPARATUS
Filed June 24, 1938   32 Sheets-Sheet 10

INVENTORS
William L. Maxson
Peter J. McLaren and
William T. Green
BY Moses & Nolte
ATTORNEYS

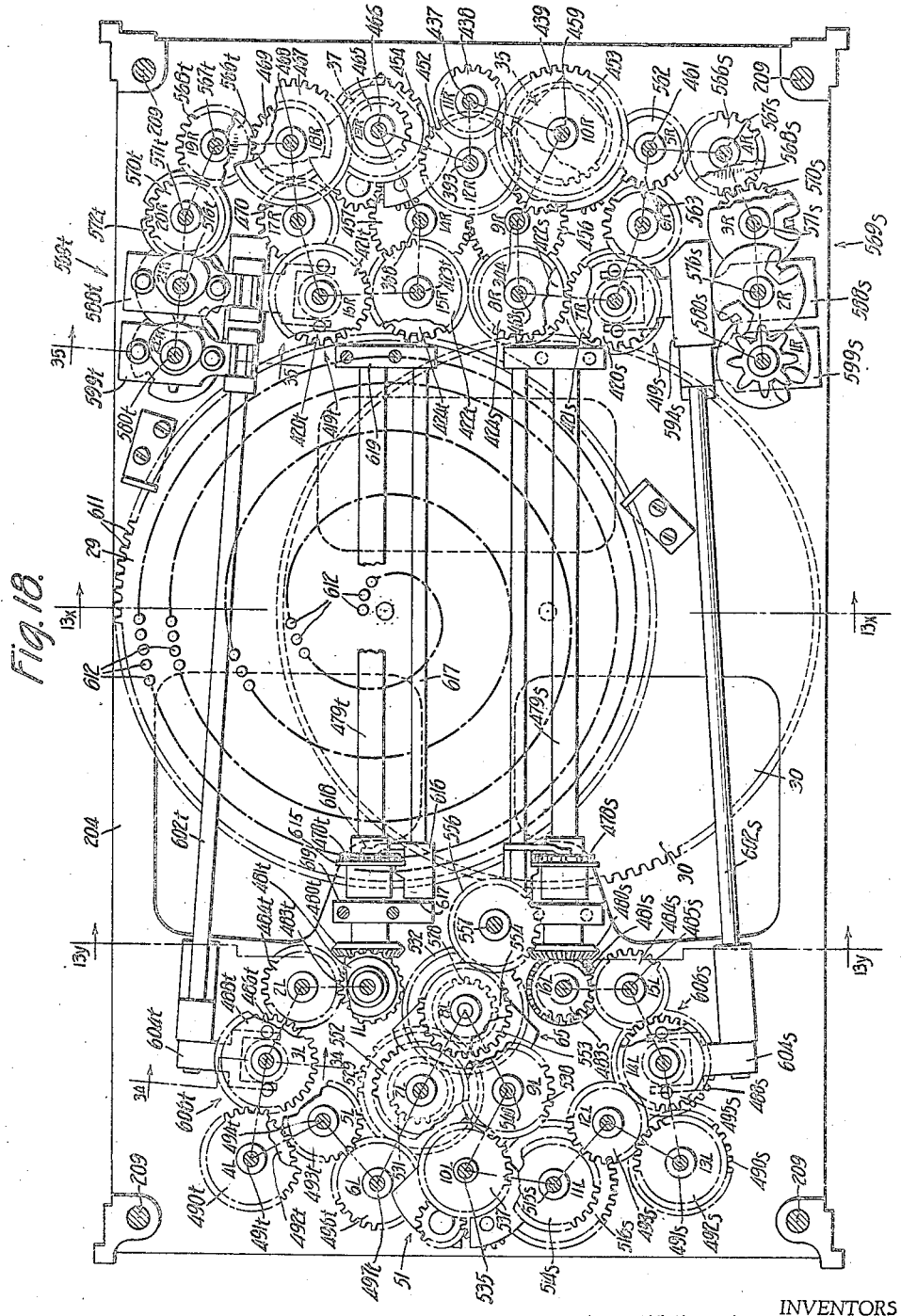

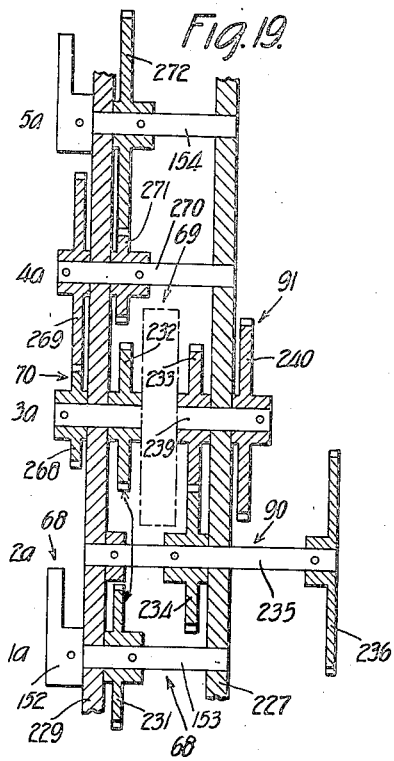
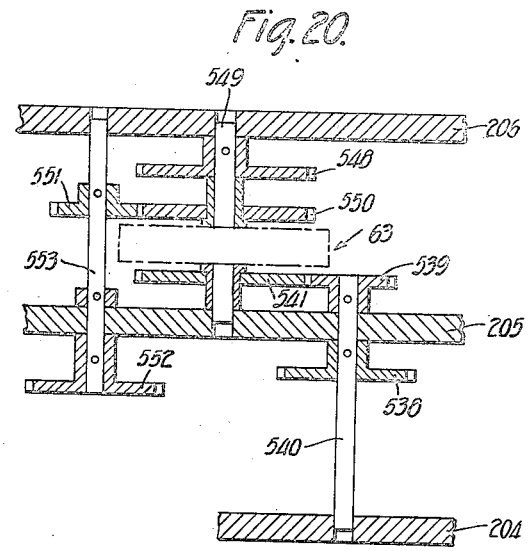
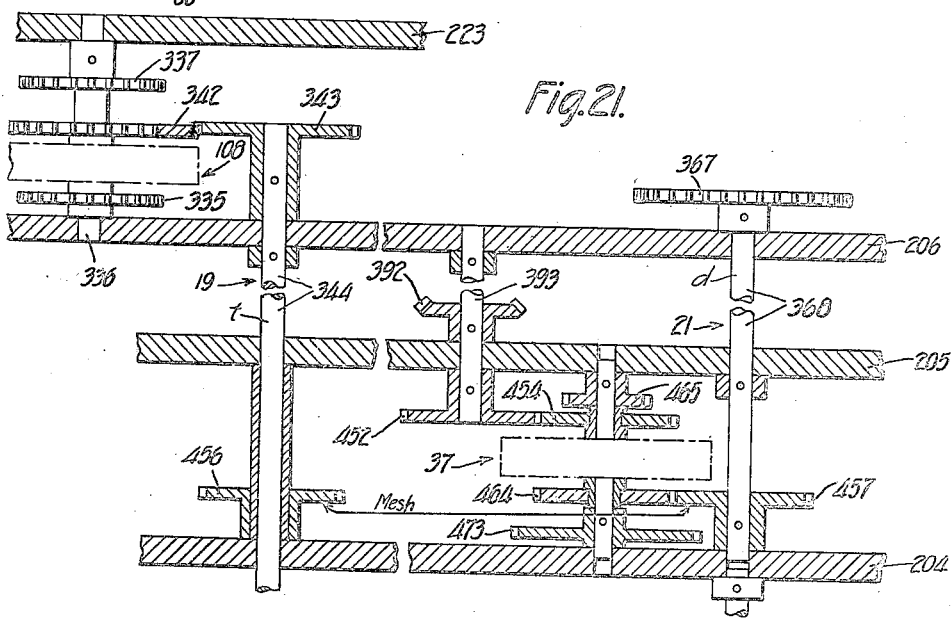

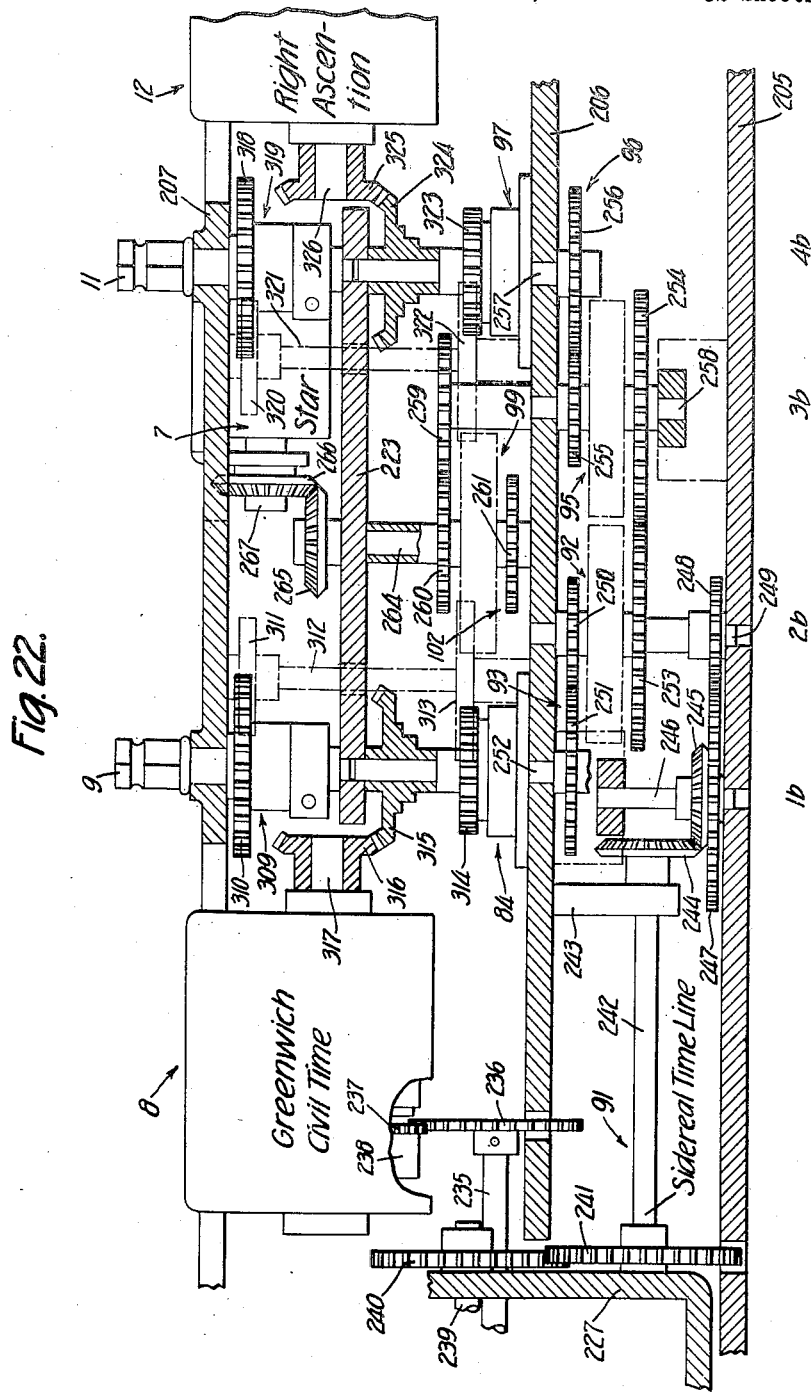

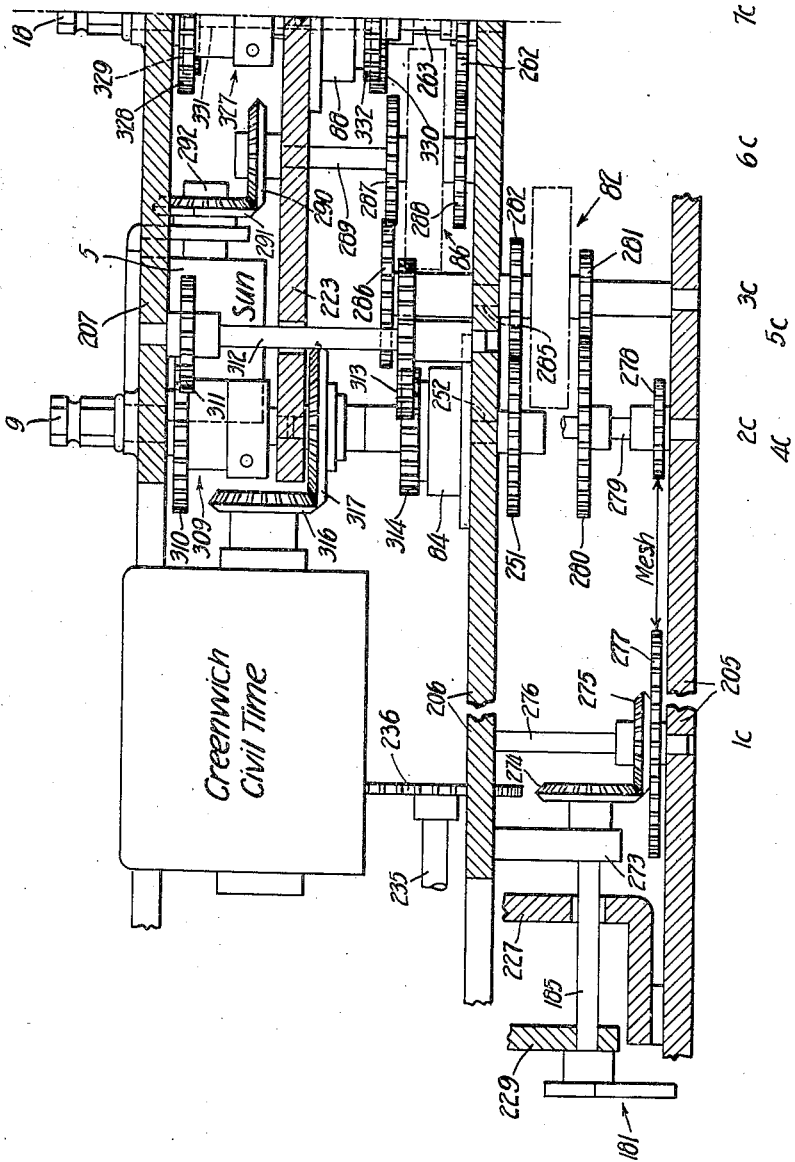

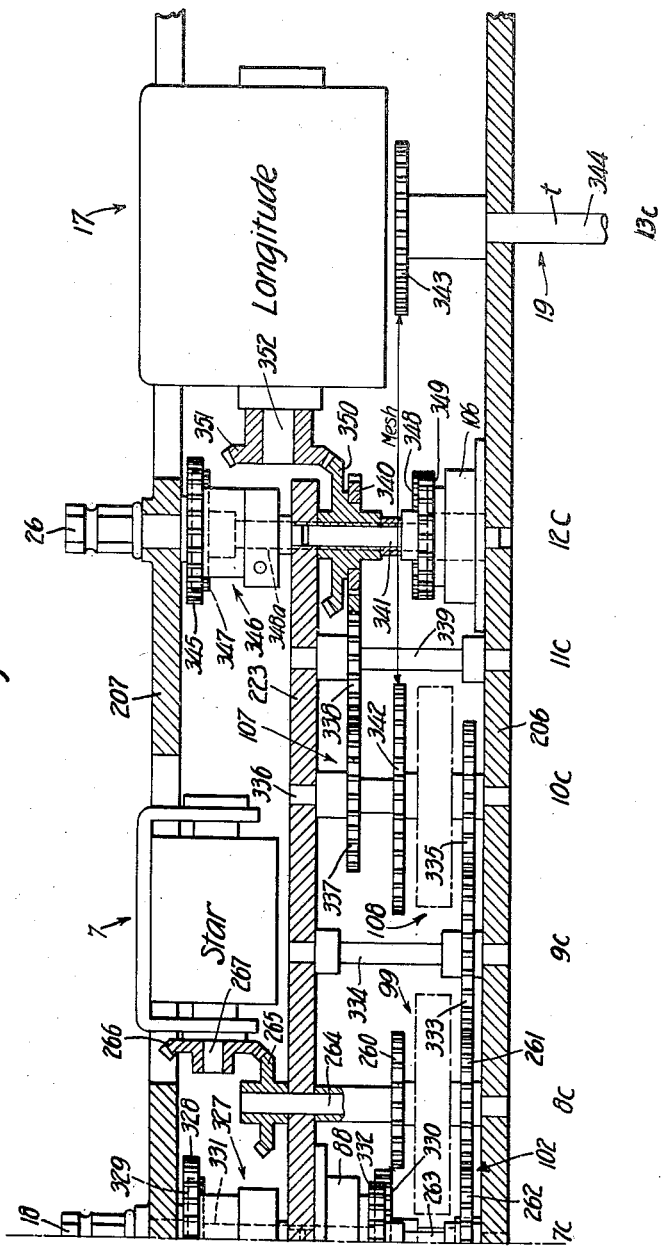

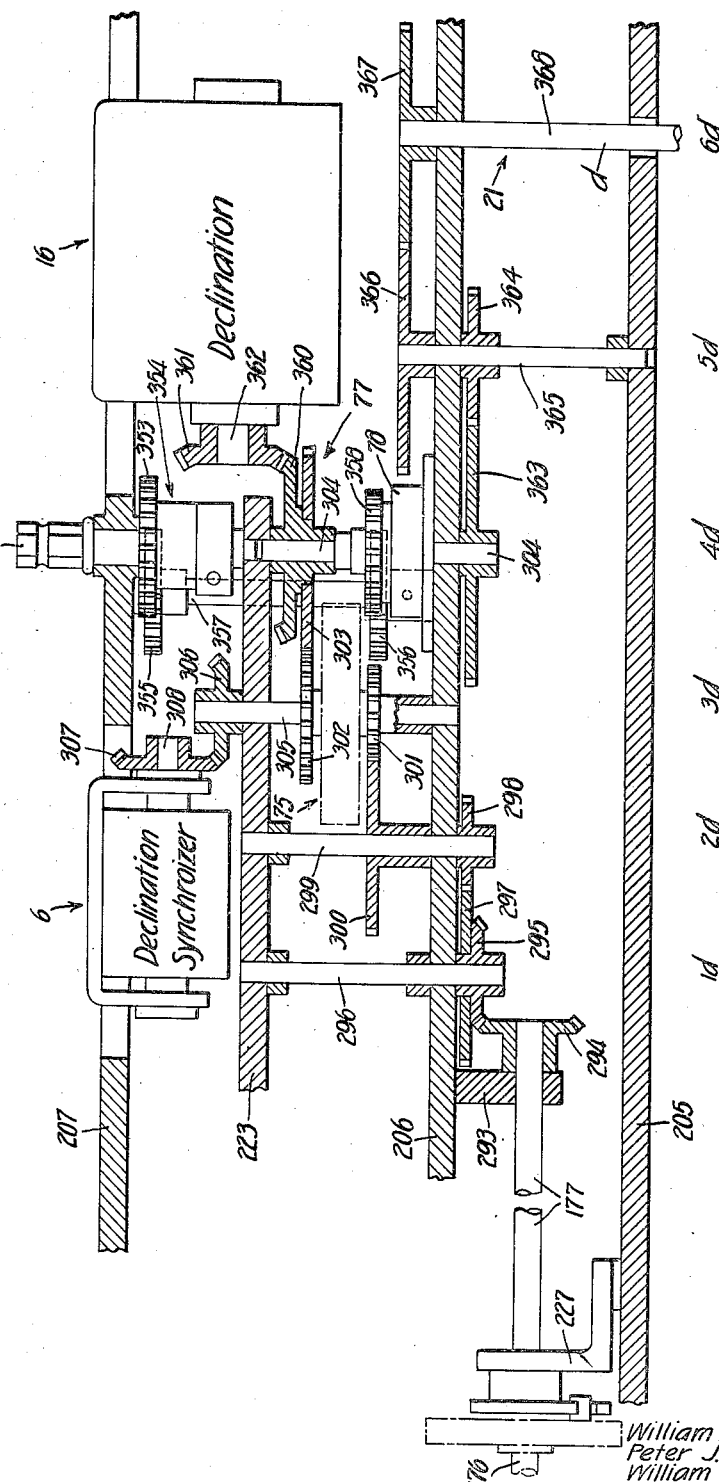

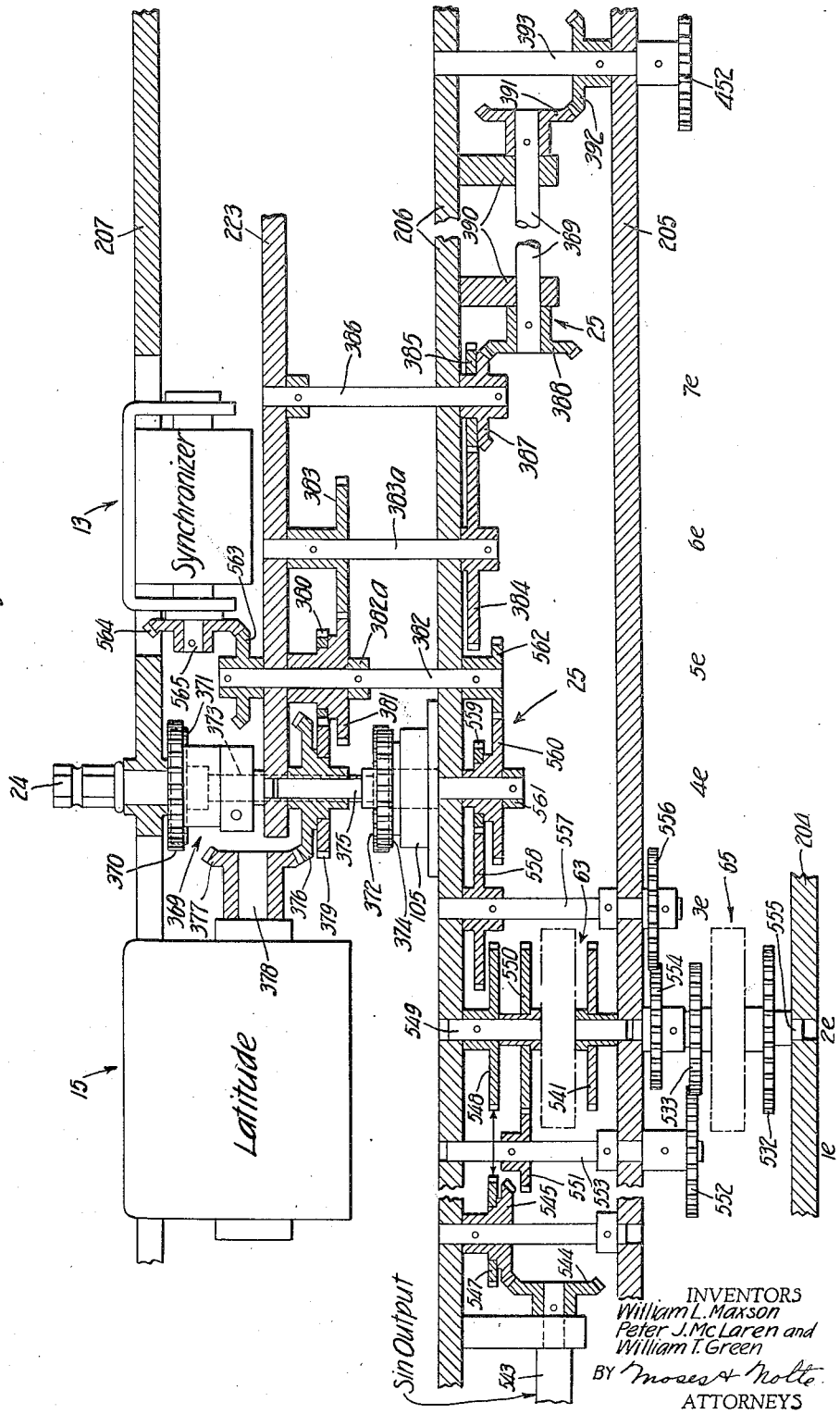

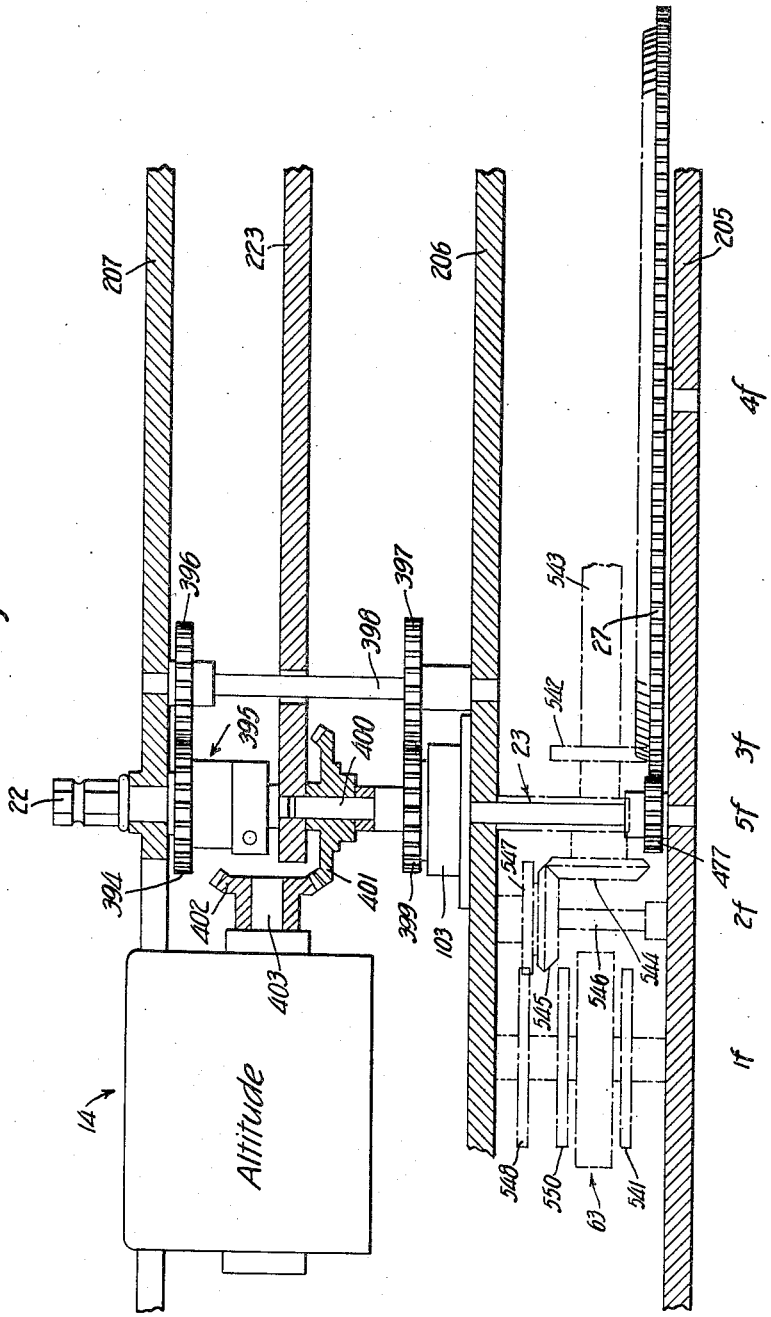

April 17, 1945.  W. L. MAXSON ET AL  2,373,771
MATHEMATICAL APPARATUS
Filed June 24, 1938   32 Sheets-Sheet 23
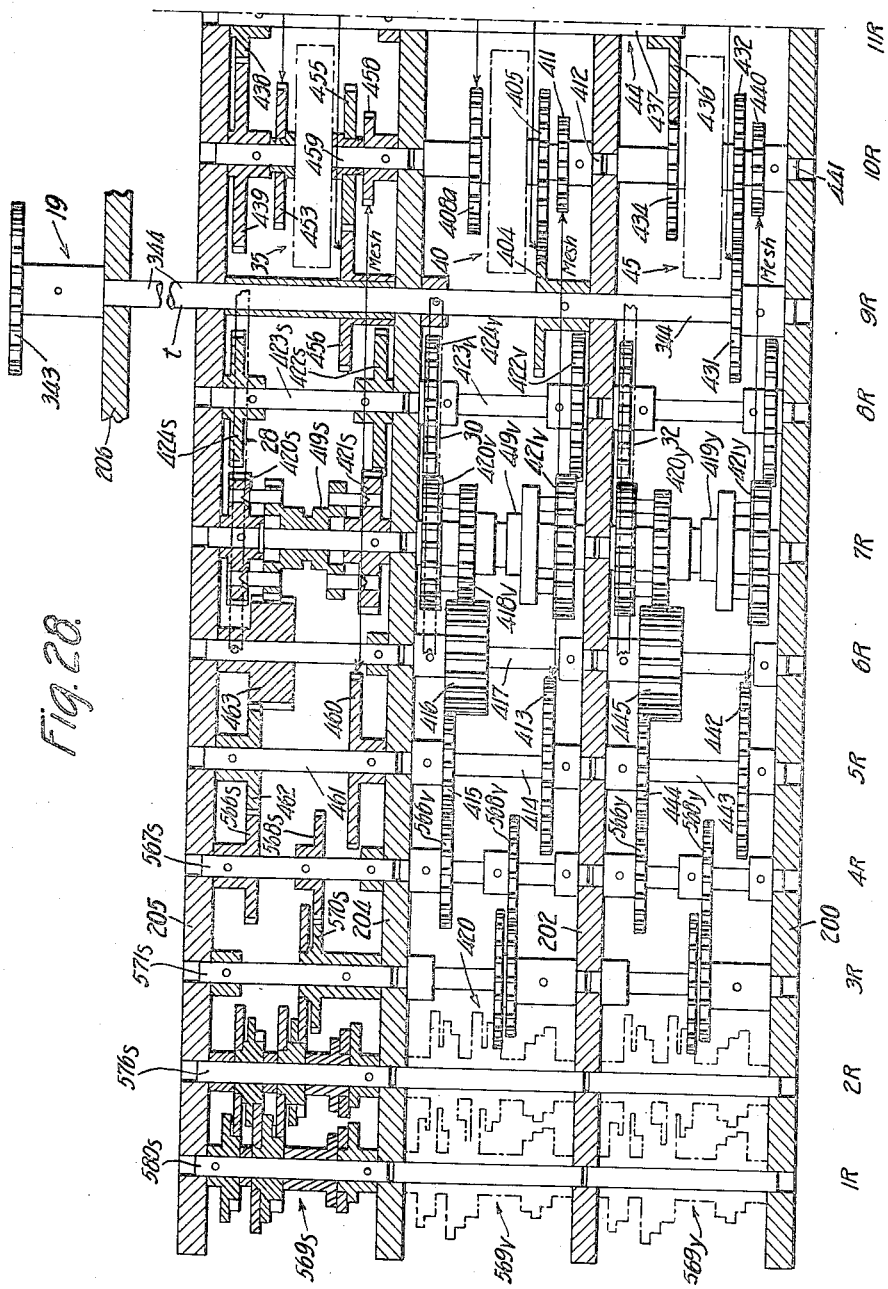
INVENTORS
William L. Maxson
Peter J. McLaren and
William T. Green
BY Moses & Nolte
ATTORNEYS

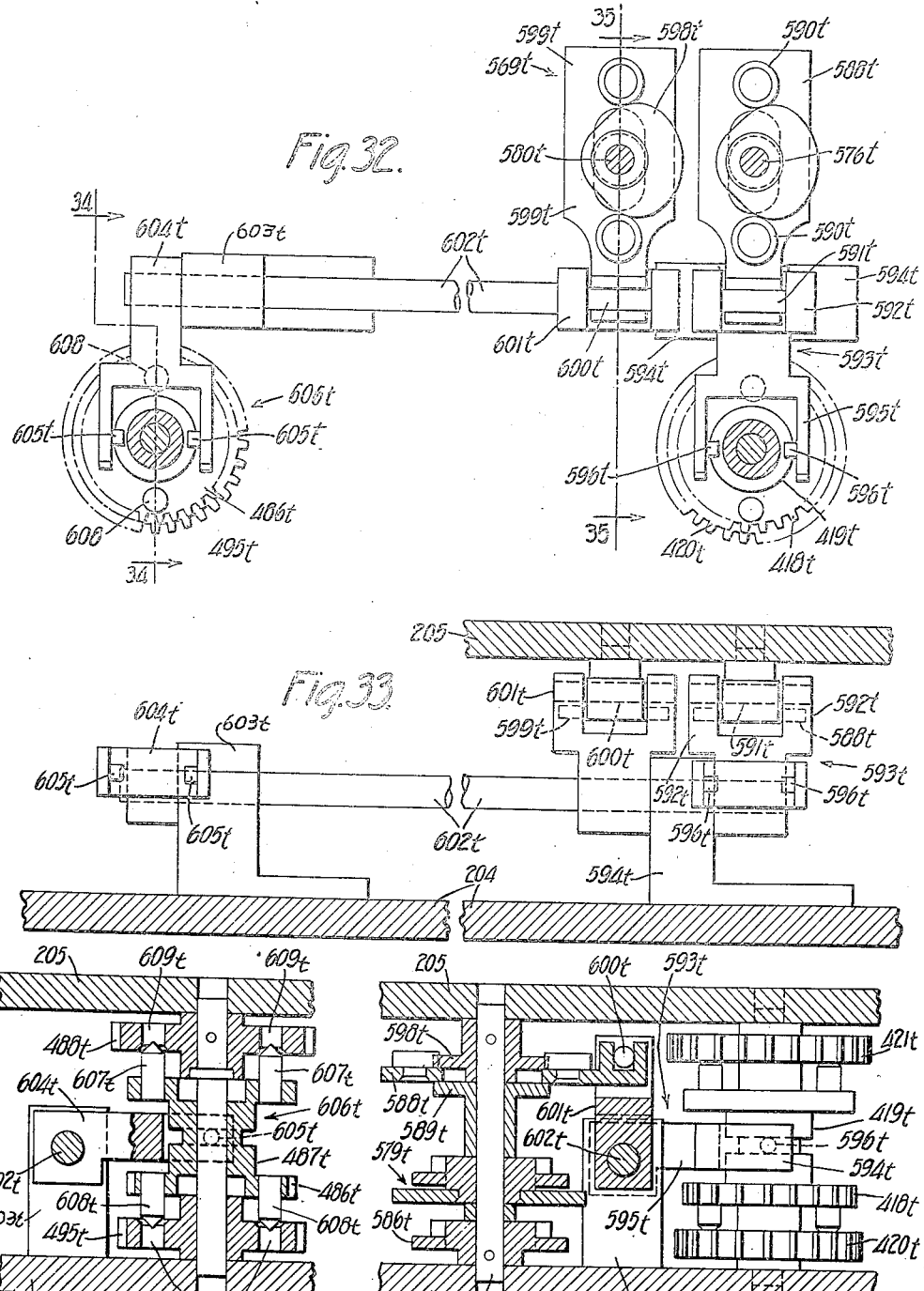

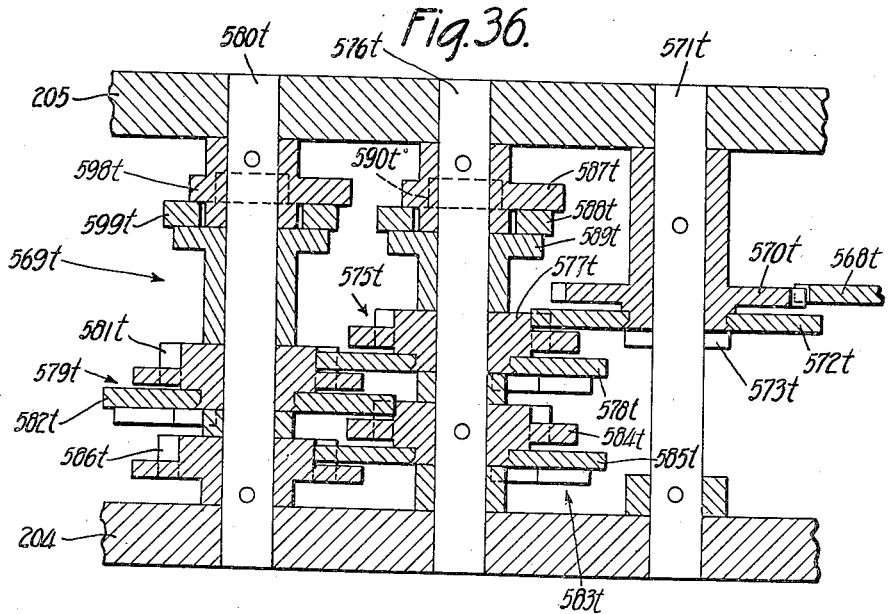
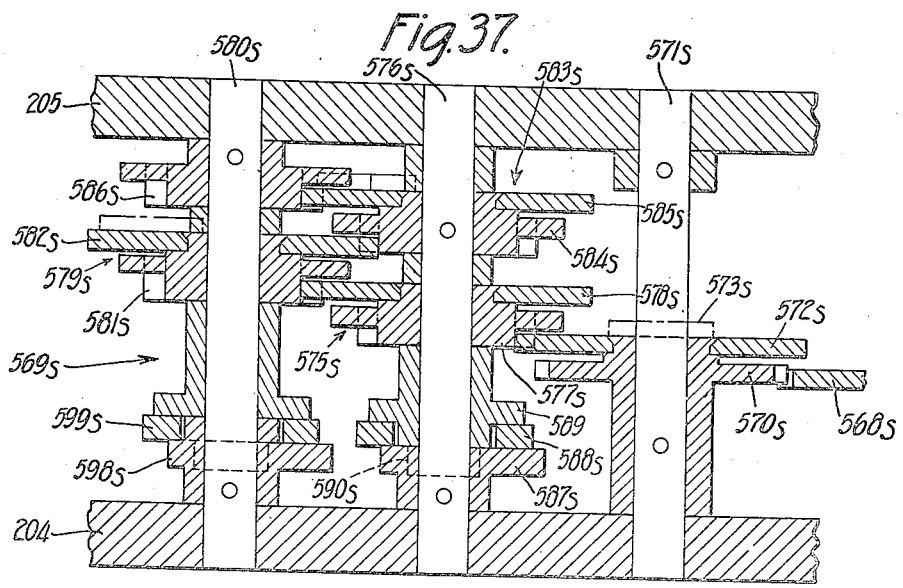

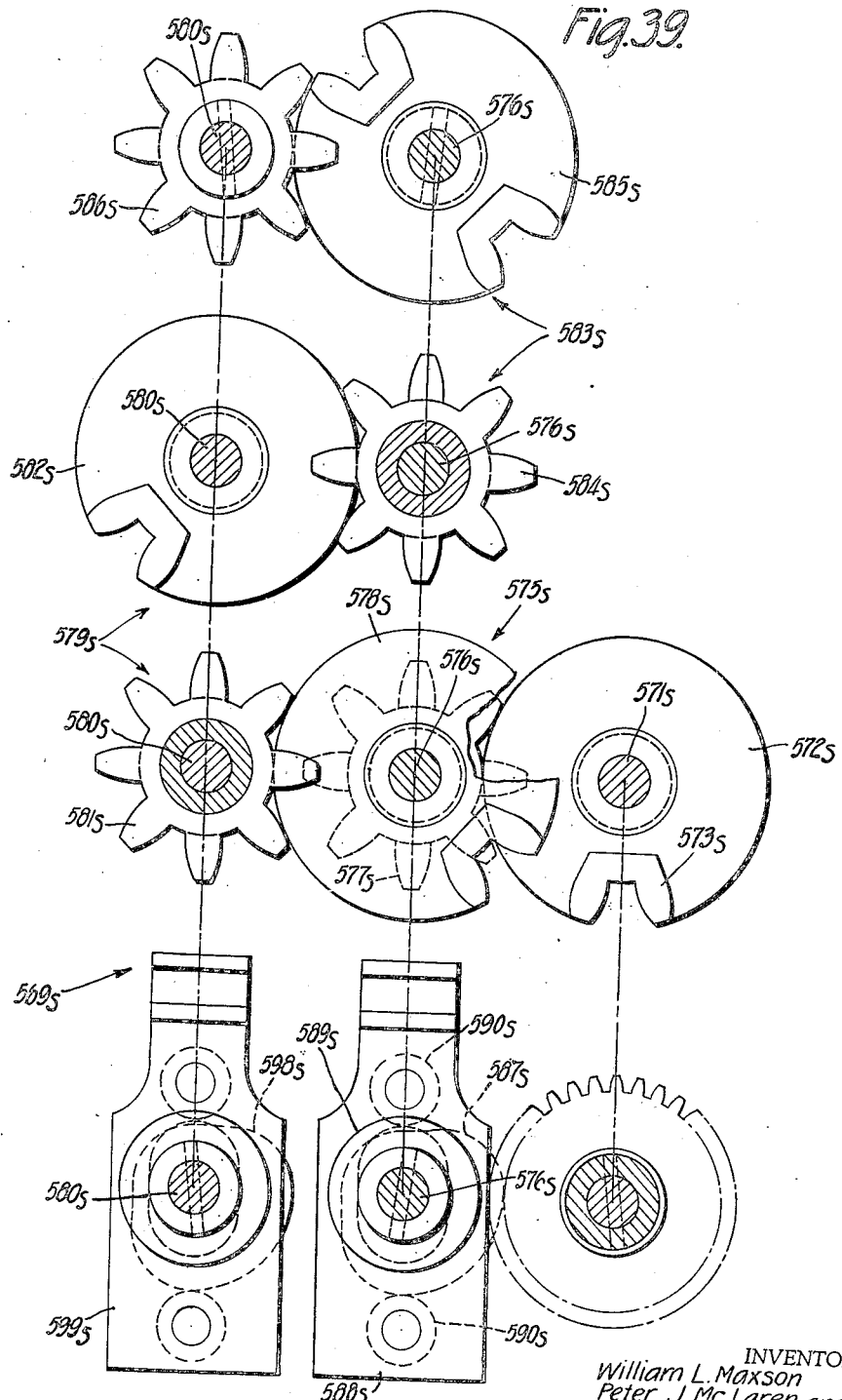

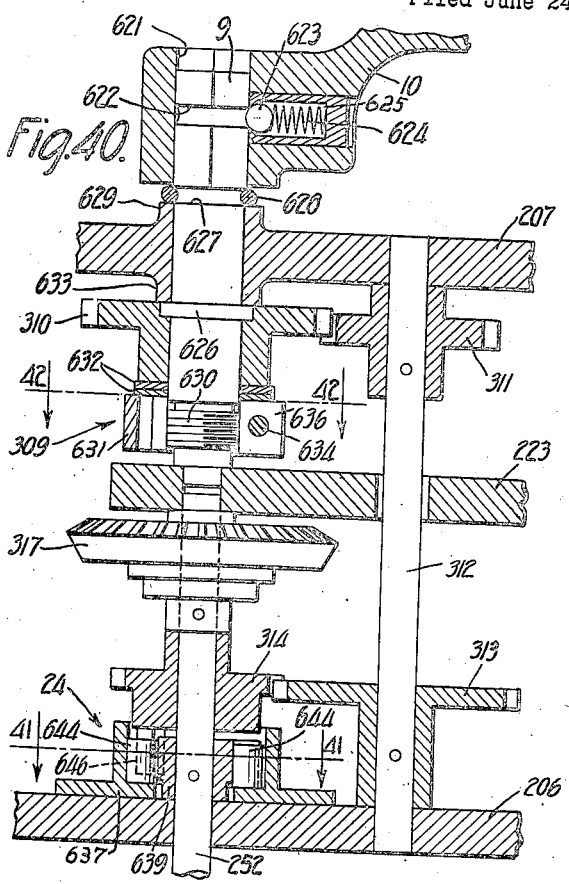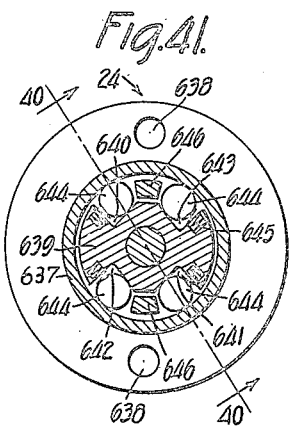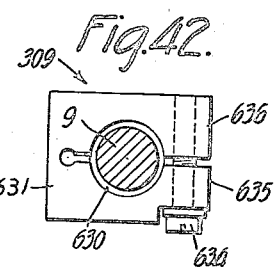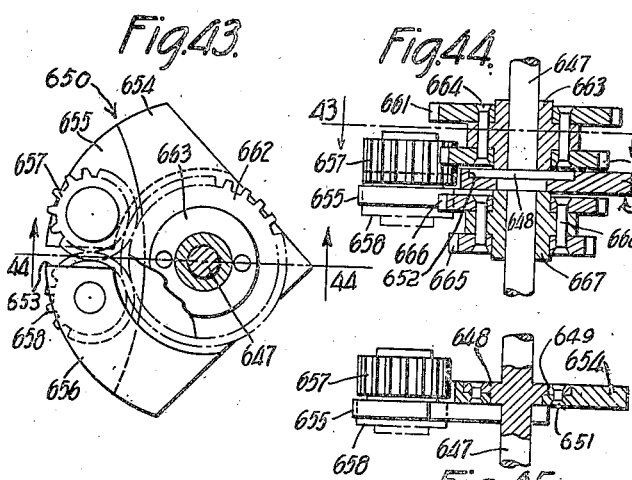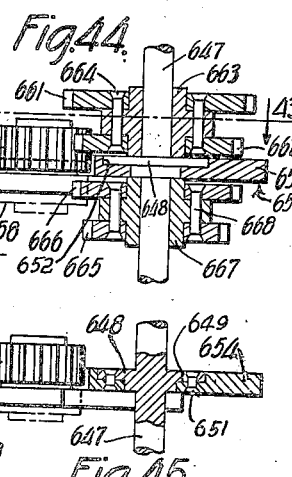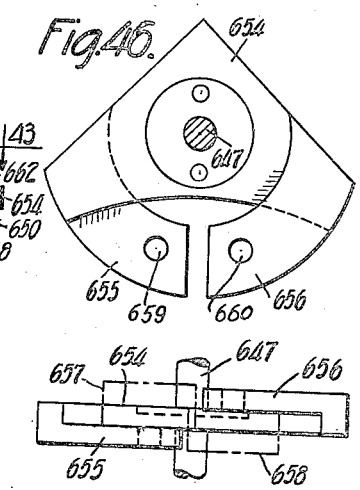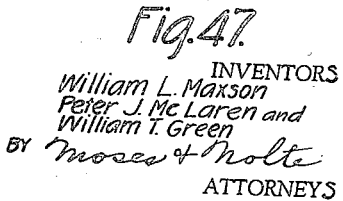

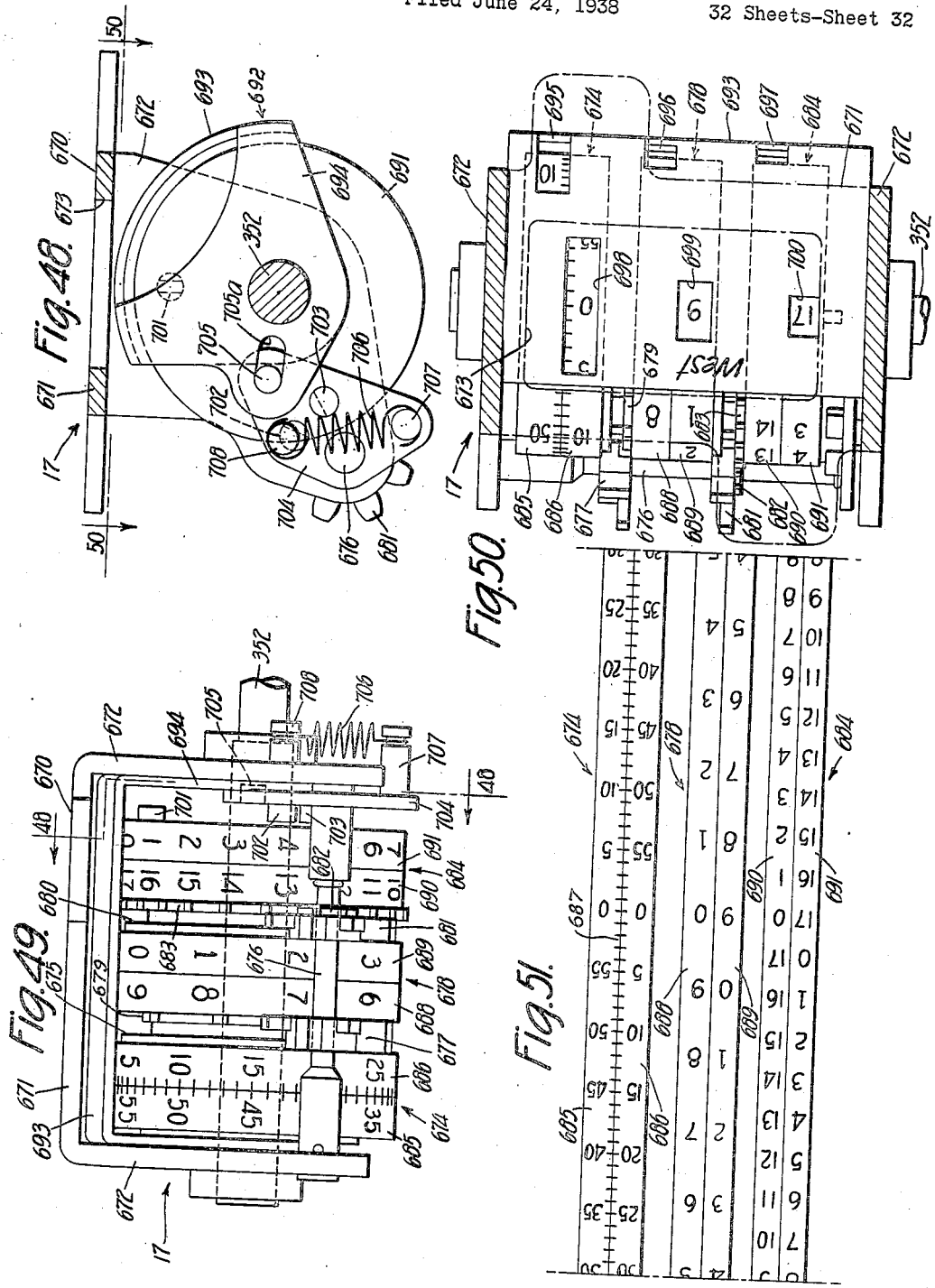

Patented Apr. 17, 1945

2,373,771

UNITED STATES PATENT OFFICE 2,373,771

MATHEMATICAL APPARATUS

William L. Maxson, South Orange, N. J., Peter J. McLaren, New York, N. Y., and William T. Green, Union City, N. J., assignors, by mesne assignments, to The W. L. Maxson Corporation, New York, N. Y., a corporation of New York Application June 24, 1938, Serial No. 215,582

14 Claims. (Cl. 235—61)

This invention relates to mathematical apparatus, and more particularly to apparatus for solving problems which arise in navigation. Various features of the invention can be utilized advantageously apart from navigation, but, for the purpose of illustration, the invention is disclosed herein as embodied in a navigating machine, and will be explained from the standpoint of solving navigation problems.

The navigator is frequently confronted with the problem of ascertaining his longitude. The basic data from which longitude is computed in the case of sun observations are:

1. Greenwich civil time as obtained from the observer's chronometer or from time signals;
2. The declination of the sun for the date and hour of the observation as taken from the Nautical Almanac;
3. The latitude of the observer; and
4. The altitude angle of the sun.

When reference is had to a star or planet rather than to the sun, the navigator requires as basic data:

1. Greenwich civil time;
2. The right ascension of the heavenly body referred to;
3. The declination of the heavenly body at the date and hour of the observation;
4. The latitude of the observer; and
5. The altitude angle of the heavenly body.

In the case of sun work it is necessary to convert Greenwich civil time (G. C. T.) into Greenwich apparent time (G. A. T.), and thence determine the Greenwich hour angle of the apparent sun, so that the local hour angle of the apparent sun, when determined, may be subtracted from the Greenwich hour angle of the apparent sun for the purpose of determining longitude.

The conversion of Greenwich civil time to Greenwich apparent time is commonly performed by reference to the Nautical Almanac which contains tables showing a corrective factor known as the equation of time to be applied positively or negatively to Greenwich civil time, as indicated by the almanac, for the date in question. A further correction is made for the hour by interpolation. The Greenwich hour angle of the apparent sun may be determined by subtracting twelve hours or 180 degrees from Greenwich apparent time.

The local hour angle is determined from observed data through application of the law of cosines of spherical trigonometry. This law is $$\cos a = \cos b \cos c + \sin b \sin c \cos A \quad \text{(Equation 1)}$$

In the spherical triangle having as its vertices the North Pole point of the celestial sphere, the point on the celestial sphere directly over the sun at the instant of observation, and the zenith of the point at which the observation is made, $a = 90 - h$ (When $h$ is the observed altitude angle of the sun.)

$b = 90 - L$ (When $L$ equals the known latitude of the observer.)

$c = 90 - d$ (When $d$ is the known declination of the sun for the particular date and hour of the observation, the declination being taken as positive when north of the equator and negative when south of the equator.)

$A = t$ (When $t$ is the local hour angle; i. e., the hour angle formed at the north point or pole between the meridians of the sun and of the observer.)

Making these substitutions, the law of cosines becomes $$\cos(90-h) = \cos(90-L)\cos(90-d) + \sin(90-L)\sin(90-d)\cos t \quad \text{(Equation 2)}$$

Equation 2 is obviously the equivalent of the following:

$$\sin h = \sin L \sin d + \cos L \cos d \cos t \quad \text{(Equation 3)}$$

Since all of the angles of Equation 3 are known, except the angle $t$, it is obvious that the navigator can determine the angle $t$ by the usual processes of trigonometric computation, and may thence determine his longitude by subtracting the local hour angle $t$, of the apparent sun, from the Greenwich hour angle of the apparent sun. In making this subtraction, Greenwich hour angles measured to the west of Greenwich are positive and those to the east are negative, local hour angles measured to the west of the point of observation are positive and those to the east are negative, and resulting longitudes are west if positive, east if negative.

If the heavenly body observed is not the sun, then the procedure is generally similar to that outlined above, but necessarily involves the use of sidereal sun time as distinguished from apparent time.

The navigator again refers to the Nautical Almanac for transforming Greenwich civil time (G. C. T.) into Greenwich sidereal time (G. S. T.). In this case the correction applied is of much greater magnitude than when apparent time is used, for the reason that there are approximately 366.24 sidereal days in a year as against approximately 365.24 apparent or civil days in a year. Greenwich sidereal time corresponding to zero hours Greenwich civil time is tabulated in the Nautical Almanac for each day of the year, and is equal to the right ascension of the mean sun plus twelve hours (180°). Interpolation tables are also provided to make further correction, equal to the right ascension increment for the hour. This increment is added to the hour expressed in Greenwich civil time, (which is the Greenwich hour angle of the mean sun plus twelve hours) and the sum is added to Greenwich sidereal time for zero hours Greenwich civil time of the date. When the final sum exceeds twenty four hours, twenty four hours is subtracted.

The Greenwich civil day starts at midnight, the lower transit of the prime meridian by the mean sun, whereas the sidereal day starts with the upper transit of the prime meridian by the first point of Aries. This difference of convention accounts for the fact that twelve hours must be added to the right ascension of the mean sun in securing Greenwich sidereal time corresponding to zero hours Greenwich civil time for any selected date.

Greenwich sidereal time is the Greenwich hour angle of the first point of Aries. The Greenwich hour angle of the heavenly body may, therefore, be determined by subtracting the right ascension of the body from Greenwich sidereal time. The right ascension of the body observed is secured from a further table of the Nautical Almanac.

The declination of the heavenly body is found by reference to still another table in the Nautical Almanac.

The local hour angle with reference to the observed heavenly body may be worked out by application of Equation 3, using the known latitude of the observer as L, the known declination of the heavenly body as $d$, and the observed altitude of the heavenly body as $h$. The local hour angle of the observed heavenly body may be subtracted from the Greenwich hour angle of the same body for determining the longitude, the same conventions as to names and signs being observed as before.

As a matter of pure mathematics there are always two possible longitude answers from the basic data, except for observations taken when the local hour angle is zero, but the navigator generally has little difficulty in determining which one of the answers is the correct one. The ambiguity arises from the fact that the local hour angle worked out might be positive or negative, the cosine of the angle being the same in either instance.

Comprehensively stated, an object of the present invention is to provide a machine into which the known data of either of the two problems referred to above may be put, and which will indicate as an answer the correct solution of the problem. In this connection it may be pointed out, however, that the illustrative machine as constructed is not confined to the determination of longitude, but that if the longitude is known and the latitude unknown, the machine will work out and indicate the latitude.

Among the broad objects of the invention the following are included.

It is an object of the invention to provide means for running in the date and the hour in Greenwich civil time, and for mechanically securing from that input an output equivalent to Greenwich apparent time for the given date and hour; also an effective output corresponding to the Greenwich hour angle of the apparent sun.

It is a further object of the invention in connection with sun observations to provide means for running in a definite date and hour in Greenwich civil time and for automatically producing an output equivalent to the declination of the sun for the data and hour.

It is a further object of the invention to provide means for setting up the date and hour in Greenwich civil time and for mechanically securing from that setting an effective output corresponding to the Greenwich sidereal time for the given data and hour; i. e., the Greenwich hour angle of the mean sun plus the right ascension of the mean sun.

It is a further object of the invention to provide means for subtracting the right ascension of an observed heavenly body from the Greenwich sidereal time output just referred to, so as to produce an effective output equivalent to the hour angle of Greenwich with respect to the observed heavenly body.

It is a further object of the invention to provide a machine including date setting mechanism and date and hour controlled driving mechanism in a separate, detachable almanac unit, so that a unit can be readily removed and replaced by a similar unit when the period of the year which it is designed to cover has passed. Each almanac unit is desirably made to cover a period of three months plus a few days overlap at either end. Thus four units are required for any selected year, but each of these units can be used again and again, year after year, by slightly readjusting the driving cams of the unit relative to the date setting knob and the date indicating dial during the period when the unit is out of use.

It is an object of the invention to provide mechanism capable of solving problems involving the application of the law of cosines of spherical trigonometry.

It is a still further object of the invention to provide in connection with time setting and correcting mechanism a series of input members for running in altitude, latitude, declination and longitude, separately, together with a synchronizer or indicator showing when these elements are in balance with one another, or in other words, when they show simultaneous, harmonious values consistent with the date and hour set up on the machine.

The synchronizer or indicator for showing that harmonious, simultaneous values are set up on the various indicators of the machine is under the indirect control of the time train, and under the direct control of the altitude, latitude, declination and longitude input members. If it be assumed, for example, that the time input train has been set and locked and that proper simultaneous values appear in the altitude, latitude, declination and longitude indicator dials, then the letters SYN indicating a balanced or datum condition will appear in the synchronizer dial of the machine. These four elements or components are interdependent. If, therefore, any one of them is altered, the synchronizer will be turned away from the position indicating synchronism or balance, and can be restored to the balanced condition either by returning the operated indicator back to the position which it occupied when the machine was in balance, or by readjustment of one or more of the other indicators. As a result of this inter-relationship, any one of the four elements, altitude, latitude, declination, and longitude, can be taken as the unknown and solved for if the other three elements are known. In practical navigation the altitude and declination are matters of observation. If the longitude is known, the latitude can be determined. If the latitude is known the longitude can be determined.

It is a further feature of the invention that the rotation of each input member affects only a single indicator dial; that is to say, only a single one of the dials which gives a measured indication. Thus any setting run into the machine is preserved, so that at the conclusion of an operation the various dials can be checked to make sure that the machine is actually set up exactly in accordance with all of the known conditions, and that the answer given is with reference to those conditions.

It is a further object of the invention to provide in connection with a plurality of angle input members a plurality of functional cams such that angular inputs result in functional outputs, and to further so combine the angles before they reach the cams, and to so combine the outputs of the cams by simple addition and/or subtraction that the combined cam outputs correspond to a functional expression having terms representing products of certain functions of the input angles.

It is a further important object of the invention to provide a machine of the kind referred to which is so light and compact that it can be carried and used upon aircraft.

Other objects and advantages will hereinafter appear.

An explanation of the principle of operation of the illustrative machine will be given immediately following the brief description of the drawings in connection with a general description of the machine as shown in Fig. 1, and as diagrammatically shown in Figs. 2 and 3.

In the drawings forming part of this specification and illustrating a practical and advantageous embodiment of the invention;

Fig. 1 is a plan view of the complete machine including one of the almanac units;

Fig. 2 is a diagrammatic view illustrating various operating trains and their relationships to one another;

Fig. 3 is a diagrammatic view illustrating the major portion of the functional computing mechanism and the relationship of the input and output trains of the several computing cams to one another, Fig. 3 being a continuation of Fig. 2;

Fig. 4 is a view in front elevation showing the skeleton or framework of the machine;

Fig. 5 is a view in side elevation of the almanac unit as seen from the left in Fig. 1 with the left cover plate removed, parts of the structure being broken away;

Fig. 6 is a horizontal, sectional view of the almanac unit, the section being taken upon the line 6—6 of Fig. 5 looking in the direction of the arrows;

Fig. 7 is a vertical, sectional view of the almanac unit, the section being taken upon the line 7—7 of Fig. 5 looking in the direction of the arrows;

Fig. 8 is a vertical, sectional view of the almanac unit, the section being taken on the line 8—8 of Fig. 5 looking in the direction of the arrows;

Fig. 18 is a sectional, plan view taken on the line 18—18 of Fig. 13 looking in the direction of the arrows;

Fig. 19 represents an imaginary or developed, sectional view of substantially the mechanism shown at the left of Fig. 15 and at the top right hand part of Fig. 12, the view showing various shafts or operating axes laid out sequentially as if they were all in a single plane, the sequence of centers being taken from $1a$ to $5a$ as indicated in Fig. 12;

Fig. 20 is a detail, developed view showing one of the differential gears employed in the machine and associated gearing;

Fig. 21 is a view similar to Fig. 20 showing certain details of the time and latitude input train to the functional computing mechanism;

Fig. 22 is a fragmentary, developed, sectional view showing particularly the Greenwich civil time indicator, the right ascension indicator, the star dial and certain operating parts associated therewith, the section being indicated by the line $1b$ to $4b$ of Fig. 17;

Figure 16:
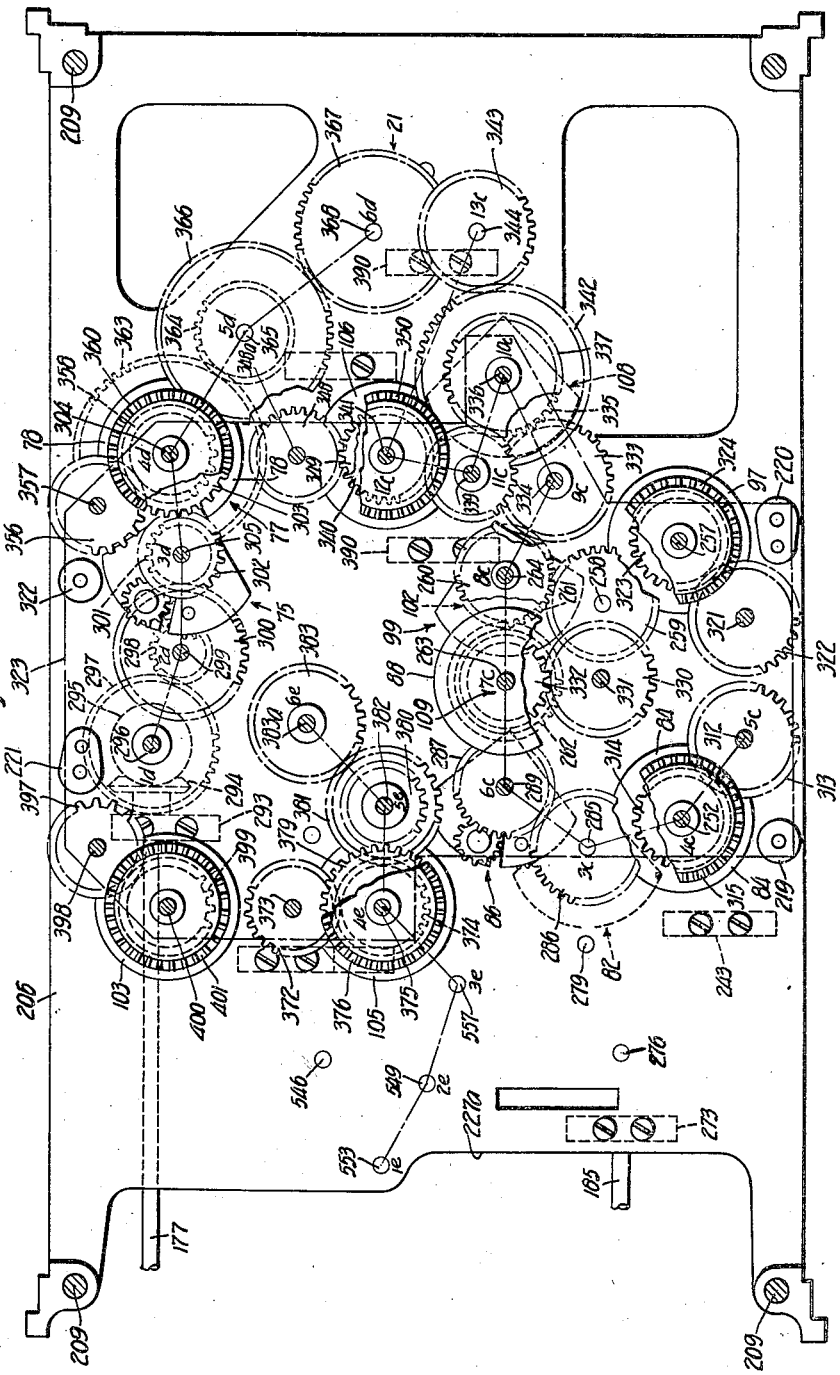
Fig. 16 is a sectional, plan view taken on the section line 16—16 of Fig. 13 looking in the direction of the arrows.
Figure 17:
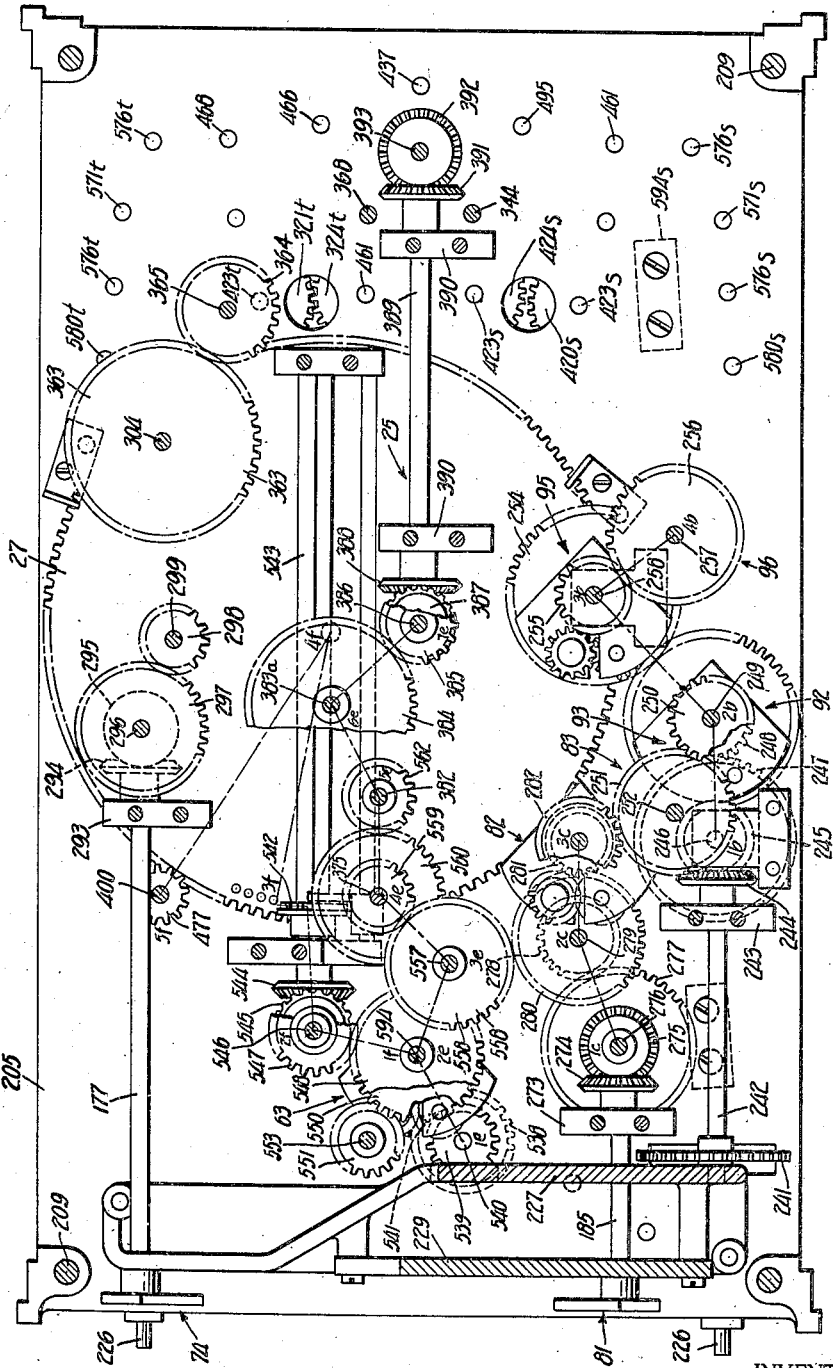
Fig. 17 is a sectional, plan view taken on the line 17—17 of Fig. 13 looking in the direction of the arrows.
Figure 30:
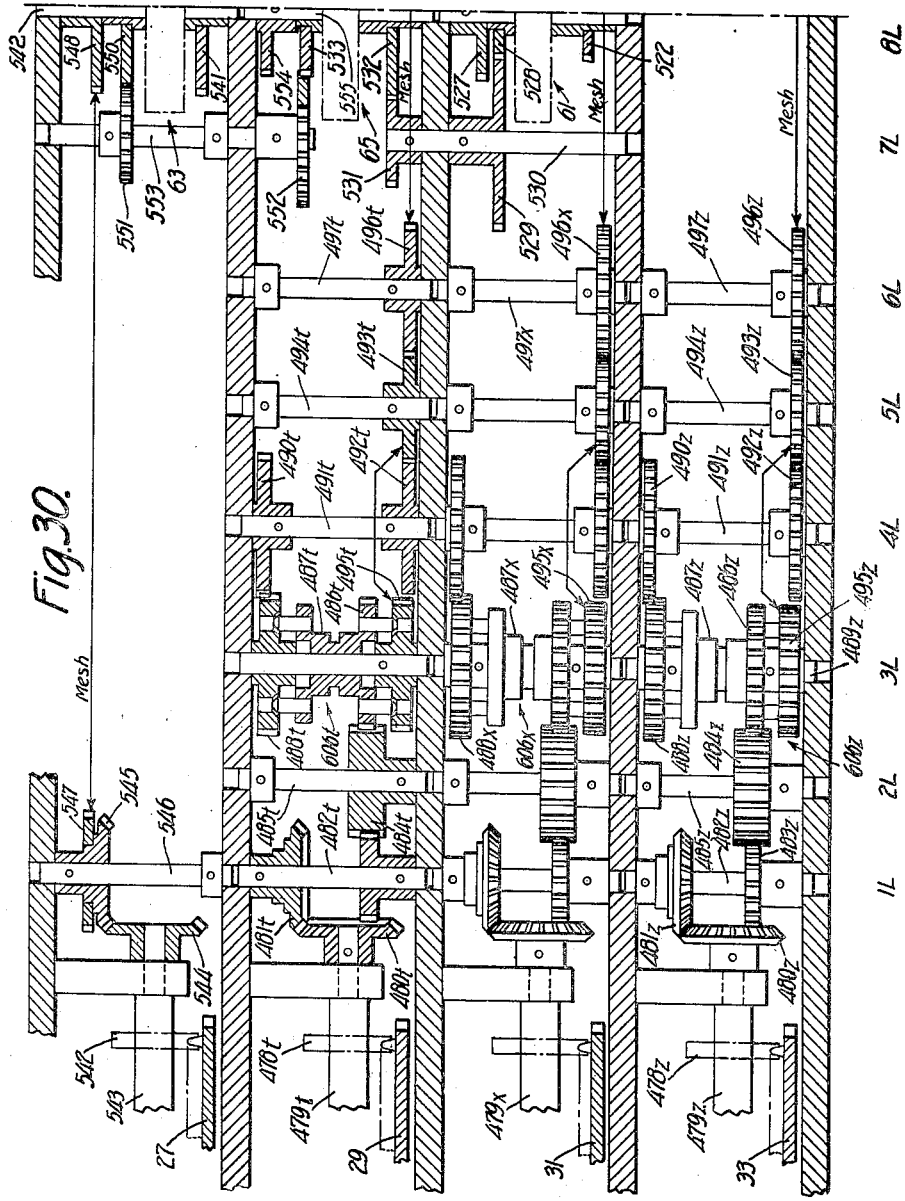
Figure 38:
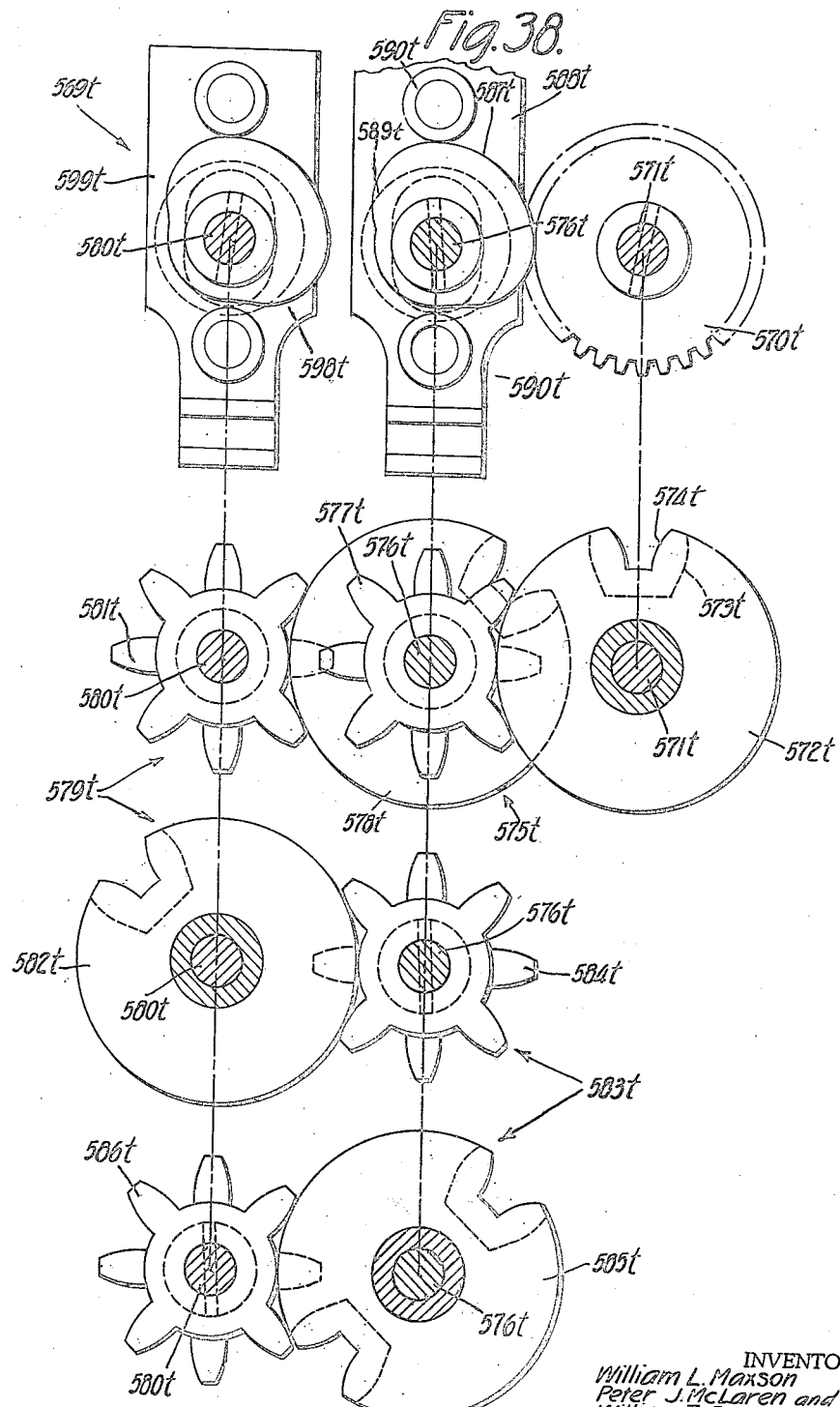

Figs. 23 and 24 taken end to end constitute a developed view having to do particularly with the time and longitude input trains, the section being taken substantially upon the line $1c$ to $12c$ of Fig. 16;

Fig. 25 is a fragmentary, developed, sectional view showing particularly parts of the declination input train, the section being taken on the line $1d$ to $6d$ of Fig. 16;

Fig. 26 is a developed, sectional view showing particularly the latitude input mechanism and a portion of the output train from the functional cams to the synchron'zer, the section being taken on the line $1c$ to $7c$ in Fig. 16;

Fig. 27 is a fragmentary, developed, sectional view showing particularly the altitude input train and the sine cam associated therewith, the section being taken substantially on the line $1f$ to $5f$ of Fig. 17;

Figure 29:
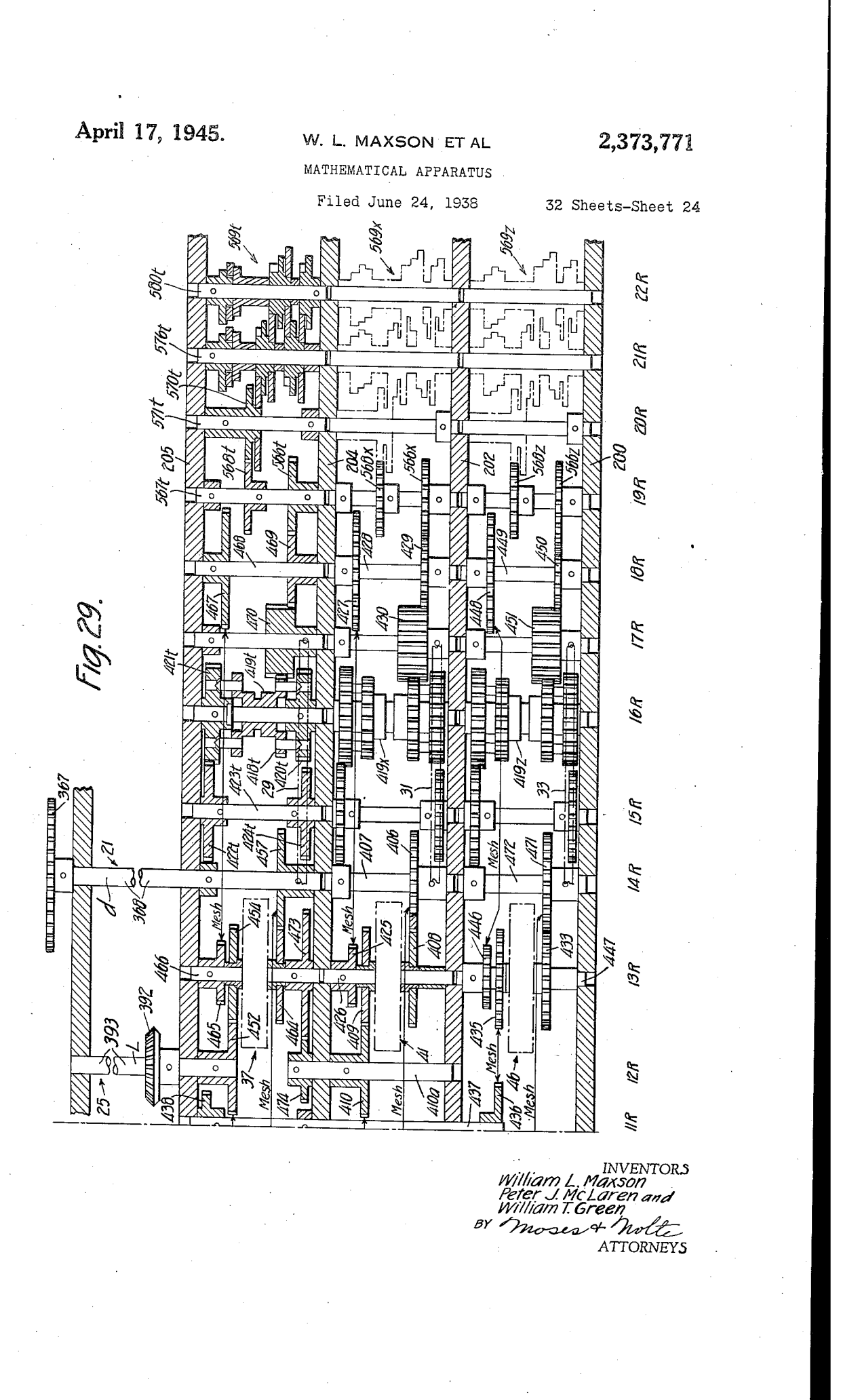

Figs. 28 and 29 taken end to end represent an imaginary or developed, sectional view of substantially the mechanism shown at the right hand side of the functional cams in Fig. 18, the view showing various shafts or operating axes laid out sequentially as if they were all in a single plane, the sequence of centers being taken from 1R to 22R indicated in Fig. 18;

Figure 31:
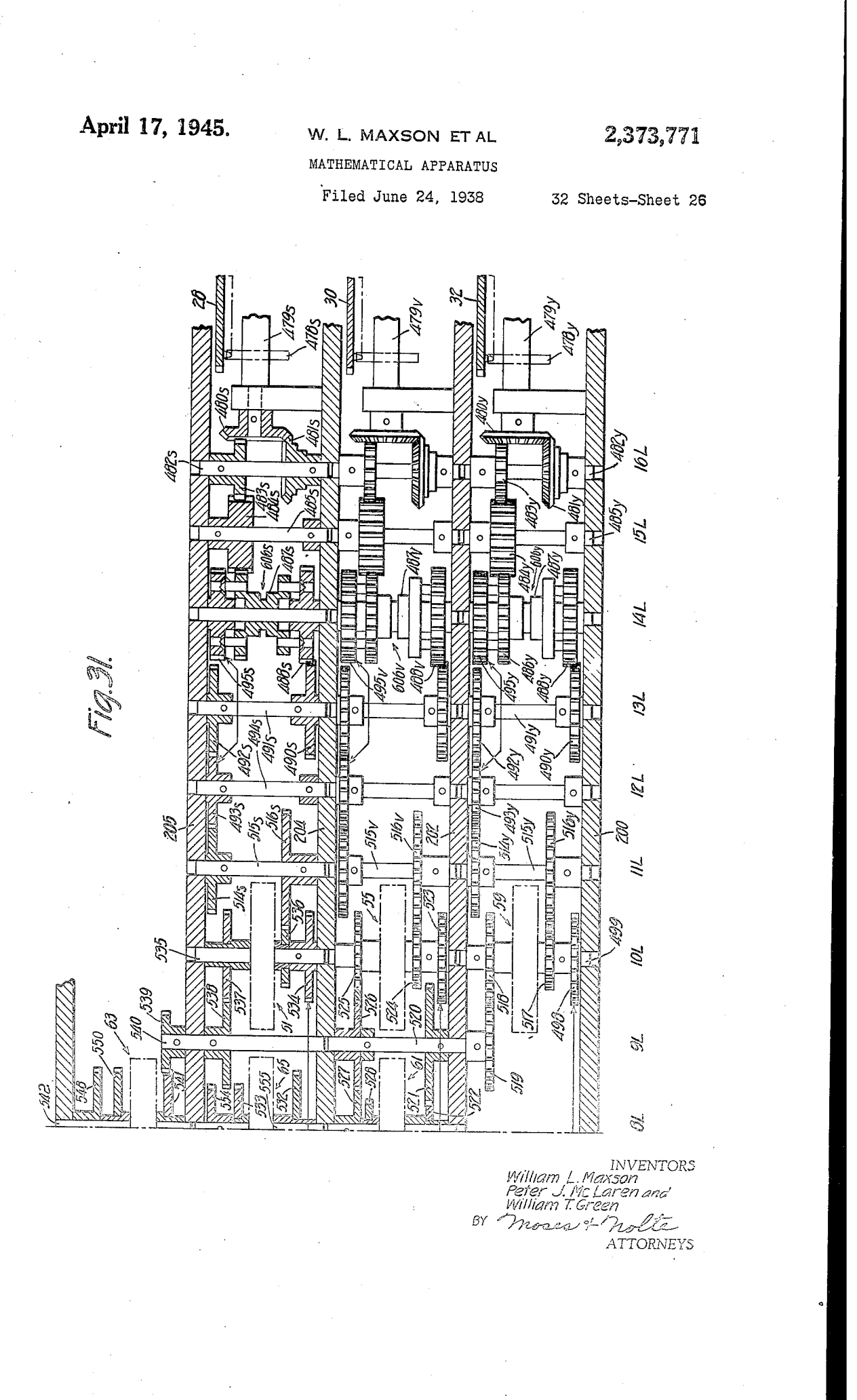

Figs. 30 and 31 taken end to end represent an imaginary or developed, sectional view of substantially the mechanism shown at the left hand side of the functional cams in Fig. 18, the view showing various shafts or operating axes laid out sequentially as if they were all in a single plane, the sequence of centers being taken from 1L to 16L as indicated in Fig. 18;

Fig. 32 is a detail, sectional, plan view, partly broken away, showing particularly the reverser mechanisms illustrated at the upper portion of Fig. 18 at the midpoints of reversing operations;

Fig. 33 is a view in front elevation showing substantially the parts illustrated in Fig. 32 in the same phase of operation;

Fig. 34 is a sectional view taken on the lines 34—34 of Figs. 18 and 32 looking in the direction of the arrows;

Fig. 35 is a fragmentary, vertical, sectional view taken on the lines 35—35 of Figs. 18 and 32 looking in the direction of the arrows;

Fig. 36 is a fragmentary, sectional view in front elevation of the reverser control mechanism shown in the upper right hand part of Fig. 18;

Fig. 37 is a view similar to Fig. 36 of the reverser control mechanism shown in the lower right hand portion of Fig. 18;

Fig. 38 is a disassembled view showing the reverser control elements of Fig. 36 in the same order from the top to the bottom of the sheet as they are assembled from top to bottom in Fig. 36 the Geneva elements, however, being shown in locked condition;

Fig. 39 is a view similar to Fig. 38 bearing the same relation to Fig. 37 that Fig. 38 bears to Fig. 36, the Geneva elements being shown in locked condition;

Fig. 40 is a fragmentary view in sectional elevation showing one of the input keys with the operating handle applied and the associated clutch lock mechanism, together with the associated jack shaft;

Fig. 41 is a horizontal, sectional view taken on the line 41—41 of Fig. 32 and showing particularly details of the clutch lock device;

Fig. 42 is a detail sectional view taken on the line 42—42 of Fig. 40 looking in the direction of the arrows and showing particularly a split nut which forms part of a torque limiting device which is provided for protective purposes;

Fig. 43 is a plan view showing a differential unit as employed at various points in the machine;

Fig. 44 is a section taken on the line 44—44 of Fig. 43 looking in the direction of the arrows;

Fig. 45 is a view similar to Fig. 44 with some of the parts removed and showing particularly the connection between the shaft and the spider;

Fig. 46 is a detail, plan view showing the spider to Fig. 43 with the associated gears removed;

Fig. 47 is an edge view of the spider illustrated in Fig. 46;

Fig. 48 is a view in sectional, side elevation taken on the line 48—48 of Fig. 41 showing the longitude indicator unit;

Fig. 49 is a view in rear elevation of the unit shown in Fig. 48;

Fig. 50 is a sectional, plan view taken on the line 50—50 of Fig. 48; and

Fig. 51 is a developed view showing the faces of the longitude indicator dial wheels.

General Explanation of the Principle of the Illustrative Machine

For the purpose of making clear the principle of operation of the machine, the machine will be described with reference to Fig. 1 and diagrammatic Figs. 2 and 3, and in this connection it will be assumed that the problem is to determine the longitude of the observer.

The machine will first be described primarily with reference to Fig. 1 so as to outline the broad principle, and then the interrelation of the parts as indicated in Figs. 2 and 3 will be pointed out.

Broadly the machine comprises an almanac section 1, and a main section 2. The almanac section is good for a quarter of a year and must then be replaced by a similar section good for a succeeding quarter. The almanac section comprises a date setting knob 3, and a date indicating dial 4. It also includes certain cams operable by the knob 3 for running the equation of time into an indicator dial 5 marked "SUN" and for running an angular value into the declination synchronizer 6 corresponding to the declination of the sun. When the knob 3 is rotated it also acts through suitable gearing to operate an indicator dial 7, marked "STAR". The sun dial 5, the declination synchronizer 6, and the star dial 7 are all constructed as counters each having four denomination dial wheels with step by step carry-over, and each is capable of operation in either direction from its datum setting. The three higher denomination wheels of the sun dial beginning with the highest bear, respectively, the letters S, U and N, and these wheels are otherwise blank. The three higher denomination wheels of the declination synchronizer beginning with the highest bear, respectively, the letters S, Y and N and these wheels are otherwise blank. The four denomination wheels of the star dial 7 beginning with the highest, bear, respectively, the letters S, T, A and R. The lowest denomination wheels of all these dials bear suitable index marks which are useful in accurately determining the datum positions.

When the knob 3 is operated it acts through an operating train to be described, to turn the cam of the almanac unit, and cause it to transmit to the sun dial 5 an output equivalent to the change in the equation of time corresponding to that which the Nautical Almanac would show as occurring between the beginning and the end of the period covered by the operation. If it be assumed that the period began at twelve hours (noon) Greenwich civil time on a date when the equation of time is zero for that hour, and that the sun dial started from its datum position, then the sun dial would be displaced by the described operation an extent equal to the equation of time for twelve hours (noon) Greenwich civil time of the indicated final date.

Similarly, the operation of the knob 3 causes the declination cam of the almanac unit to have an output to the declination synchronizer corresponding to the sun's declination on the indicated date, assuming again that the declination on the starting date was zero.

With respect to the star dial the knob 3 does not act through either of the almanac cams but it does act through direct gearing in such proportion that an input representing the travel of the mean sun produces an output to the star dial corresponding proportionally to the gain in the right ascension of the mean sun for the period covered; Here again it may be assumed that the operation started from twelve hours (noon) Greenwich civil time on a date when the right ascension of the mean sun was zero at that hour.

Operation of the knob 3 affects the four dials 4, 5, 6 and 7, and no others.

The main section of the machine includes a Greenwich civil time dial 8, and an input operating key 9 therefor. The key 9, like various other input operating keys that will be referred to, is in the form of a polygonal shaft end to which an operating crank or handle 10 may be applied. The crank 10 is applied to the key 9 and is turned until the dial 8 shows the Greenwich civil time of an observation. The extent of operation of the key 9 is considered to be the amount that the Greenwich civil time dial 8 is operated away from a setting of twelve hours (noon); i. e., the Greenwich hour angle of the mean sun. The effect of the combined operations of the knob 3 and the key 9 to twelve hours (noon) Greenwich civil time of the selected date, would be to produce an output to the sun dial equal to the equation of time for that date and hour, that is, the Greenwich hour angle of the apparent sun. Any departure of the Greenwich civil time dial from twelve hours produces a further output to the sun dial equal to the Greenwich hour angle of the mean sun together with an interpolative correction of the equation of time. Thus the total input to the sun dial produced by operation of the knob 3 and of the key 9 corresponds to the Greenwich hour angle of the apparent sun for the date and hour set up.

Operation of the key 9 also acts through the declination cam of the almanac unit to apply the necessary interpolative correction to the declination synchronizer 6. The result of the operations of the knob 3 and the key 9 is to produce an output to the declination synchronizer corresponding to the declination of the sun for the date and hour set up.

Operation of the key 9 is also transmitted to the star dial 7 in the proportion of civil to sidereal time. The effect of the combined operations of the knob 3 and key 9 to twelve hours (noon) Greenwich civil time of any selected date would be to produce an output to the star dial 7 equal to the right ascension of the mean sun for that date and hour. Any departure of the Greenwich civil time dial from twelve hours produces a further input to the star dial equal to the Greenwich hour angle of the mean sun, together with an interpolative correction for the right ascension of the mean sun. The total input to the star dial is then the Greenwich hour angle of the first point of Aries (Greenwich sidereal time), for the date and hour set up.

Up to this point the date dial 4, the Greenwich time dial 8, the sun dial 5, the declination synchronizer 6, and the star dial 7 have been affected, but no other parts have been affected.

For sun work nothing further need be done with reference to the time line transmission.

For star work, however, it is not the Greenwich hour angle of the first point of Aries which is of interest, but the Greenwich hour angle of the star which has been observed. There is accordingly provided an operating key 11 which runs into a right ascension indicator dial 12, the right ascension of the star as determined by reference to a Nautical Almanac table. Operation of the key 11 affects only the right ascension indicator dial and the star dial 7, and its effect is such that when combined with the outputs of the knob 3 and the key 9 the total input to the star dial 7 is equivalent to the Greenwich hour angle of the star.

None of the operations thus far referred to affects the computing part of the machine, nor does any of them affect the synchronizer dial 13, the altitude indicator dial 14, the latitude indicator dial 15, the declination indicator dial 16 nor the longitude indicator dial 17.

For sun work no attention is paid to the star dial 7 nor to the right ascension indicator dial 12, nor is the key 11 operated. Immediately following operation of the knob 3 and the key 9, an input key 18 is operated until the sun dial has been restored to its datum position with the letters S, U, N appearing in the center of the sight opening of the sun dial 5. This operation of the member 18 also operates a time input train 19 which goes to the computing mechanism.

It is desirable at this point to establish a datum condition of the train 19 for the purpose of making clear the discussion and description which is to follow. It may be assumed that on some starting date the equation of time involved no correction at twelve hours Greenwich civil time, that the dial 8 was set at twelve hours, and that the sun dial 5 was then set in its datum position. At that point the sun dial 5 had a net output of zero, and the train 19 had a net input of zero if it had no input from any other source. This is the datum condition of the train 19 for sun work.

Operation of the date knob 3 and the Greenwich civil time key 9 to show the date and hour of the observation in Greenwich civil time causes the sun dial 5 to be displaced from its datum position an amount equal to the Greenwich hour angle of the apparent sun at the time of the observation. Operation of the key 18 to run the sun dial 5 back to its datum condition displaces the train 19 from its datum position by an amount equal to the Greenwich hour angle of the apparent sun. Operation of the train 19 is effective through mechanism to be described, to displace the dial wheels of the synchronizer 13 from their datum position. The three higher denomination wheels of the synchronizer dial 13 bear the letters S, Y and N, respectively, and these letters appear in the center of the sight opening when the synchronizer dial is in its datum position. The lowest denomination wheel bears suitable index marks, including particularly a distinctive mark representing the datum point.

An input key 20 is next operated to restore the dial wheels of the declination synchronizer 6 to the datum position, and this runs into the declination indicator dial a reading equal to the declination of the sun as it would be given in the Nautical Almanac for the date and hour of the observation. The operation of the key 20 operates an input train 21, which runs to the computing mechanism, an amount corresponding to the declination which is indicated by the dial 16. The operation of the train 21, acting through the computer mechanism, produces further operation of the synchronizer dial 13.

The operator next turns a key 22 for running into the altitude indicator dial 14 the observed altitude angle of the sun. This transmits an input to a train 23 equivalent to the observed altitude angle, and this input through the computer mechanism further affects the synchronizer dial 13.

The operator next operates an input key 24 for running into the latitude indicator dial 15 the known latitude of the observer. This applies an input corresponding to the latitude angle to a train 25 which runs to the computing mechanism. This input through the computing mechanism further affects the synchronizer dial 13.

Having in mind that the initial input to the train 19 was equivalent to the Greenwich hour angle of the apparent sun, it is evident that the local hour angle will be left set up on the train 19 if the train 19 is readjusted from the Greenwich hour angle by an amount corresponding to the correct longitude of the point of observation. That this is so is evident from the fact that the Greenwich hour angle minus the local hour angle is equal to the longitude; or, the Greenwich hour angle minus the longitude is equal to the local hour angle.

Up to the present point, the longitude indicator dial 17 has not been disturbed, so that it still reads zero or some other value at which it was left following the last previous use of the machine. For the purpose of exposition it may be assumed to read zero. An input key 26 is next operated until the wheels of the synchronizer 13 have been restored to their datum position. At this point the correct longitude, which is the answer to the problem, appears in the longitude indicator dial 17. The reason for this will be made clear presently.

For star work the operations are somewhat different, although in principle they are essentially the same. The datum condition of the train 19 is that which exists when the machine is set for twelve hours (noon) Greenwich civil time, the right ascension of the mean sun is indicated on the right ascension dial 12, and the star dial stands in its datum position. This is the same as the datum position for sun work.

First the date and hour are set up by operation of the knob 3 and the input key 9. This sets up in the star dial a total operation equivalent to the Greenwich hour angle of the mean sun plus the mean sun's right ascension at the time of the observation. The right ascension of the star observed is subtracted from the star dial by operation of the input key 11 and is run into the right ascension dial 12. Thus far only the time dials, the sun dial 5, the declination synchronizer 6, the star dial 7, and the right ascension dial 12 have been affected, the star dial being displaced from its datum position by an amount corresponding to the hour angle of Greenwich with respect to the star. No attention is paid to the sun dial 5, nor to the declination synchronizer dial 6. The input member 18 is next operated to restore the star dial to its datum position and to apply a corresponding input to the time train 19, thus running into the train 19 the Greenwich hour angle of the star. The input key 20 is next operated to set up on the declination indicator dial 16 the known declination of the star for the time of the observation, as taken from the Nautical Almanac. This runs the declination angle into train 21.

The observed altitude of the star and the latitude of the observer are then run in by the input keys 22 and 24, respectively, and the answer to the problem is run in on the longitude indicator dial 17 by operating the input key 26 until the synchronizer dial 13 has been restored to its datum position.

It is not necessary to set the machine back to any prescribed starting condition for a new operation. This is advantageous because the time, latitude, altitude, declination and longitude will all be changed but slightly from one observation to the next, and the necessary resetting of the machine can, therefore, be quickly effected.

The computing mechanism has been assumed up to this point to work in a manner calculated to produce the described result.

The principle upon which this mechanism operates will be best understood from an examination of Figs. 2 and 3.

In these figures a sector shaped symbol is used to designate a differential. It is not desired at this point to go into details as to how certain of the gears are caused to divide an input by a fixed quantity such as the number 2, nor how inputs may be additively or substractively combined through differentials, because the principles of such operations are well known, and also because the general views showing the actual construction of the illustrative machine have been made from an operative machine and show the gears in substantially their true proportions and relations in all instances.

The computing section of the machine comprises a sine cam 27 and six cosine cams 28 to 33, respectively, all constructed and operating in the manner disclosed with reference to Figs. 19 to 22, inclusive, of a co-pending application of William L. Maxson and Peter J. McLaren Serial No. 113,572, now Patent No. 2,273,652.

The sine cam has the characteristic that for a given angular input from the trains 23, starting from zero input, the output to the train 34 will be equal to the sine of the input angle.

Each of the cosine cams has the characteristic that an input of a given angle starting from zero will produce an output equal to the versedsine of the input angle. The cams will be referred to, however, as cosine cams. The only thing of interest with reference to the outputs of the cams is the ultimate effect of the cams upon the synchronizer dial 13. The synchronizer dial 13 is of interest only with reference to its datum position where the letters S Y N appear, and this use of the synchronizer dial is equally available whether synchronism represents zero or a constant value other than zero.

The computing part of the machine is designed to apply Equation 3 by putting the right and left hand sides of the equation into the synchronizer with opposite effect. Equation 3 is here repeated as follows:

$$\sin h = \sin L \sin d + \cos L \cos d \cos t$$
(Equation 3)

This may be transposed to $$\sin h - \sin L \sin d - \cos L \cos d \cos t = 0$$
(Equation 4)

When the total operation of the train 19 is equal to the local hour angle $t$, the operation of the train 21 is equal to the declination angle $d$, the operation of the train 25 is equal to the latitude angle L, and the operation of the train 23 is equal to the altitude angle $h$, the effect will be that there has been no net gain or loss by the synchronizer dial 13 from its datum position. This being the case, the fact that the datum position of the synchronizer dial is reattained during operation of the input key 26 is a definite and accurate guide for assuring that the total or net input to the train 19 is equal to the local hour angle, and that the longitude indicated in the longitude indicator dial 17 is correct for the other conditions of the problem as set up.

In explaining the computing mechanism, it will be assumed for the purpose of demonstrating the principle of operation of the computing mechanism that the time train 19 does have the local hour angle $t$ run into it, as a net result of the entire operation including the ascertainment of longitude.

Looking first at the latitude train 25, it will be noted that the latitude input L is transmitted positively through a differential 37 to the input train 36 of cosine cam 28 and that it is also transmitted positively through a differential 35 to the input train 38 of cosine cam 29. The input L is transmitted from the differential 37 through a $$\frac{2(1-\cos L \cos d \cos t + \sin L \sin d \cos t) + 2(1-\cos L \cos d \cos t - \sin L \sin d \cos t)}{4} = 1 - \cos L \cos d \cos t$$

train 39 to differentials 40 and 41, and thence positively to the input train 42 of cosine cam 30, and positively to the input train 43 of cosine cam 31. From the differential 35 the input L is transmitted through a train 44 to differentials 45 and 46, and thence positively to the input train 47 of cosine gear 32, and positively to the input train 48 of cosine cam 33.

The input $d$ of train 21 is transmitted positively through differential 37 to the input train 36 of cosine gear 28, and negatively through differential 35 to the input train 38 of cosine gear 29. The input $d$ is transmitted from the differential 37 through the train 39 and is thence transmitted positively by the differential 40 to the input train 42 of cosine cam 30, and positively by the differential 41 to the input train 43 of cosine cam 31. The input $d$ is also transmitted negatively from the differential 35 by the train 44, and is thence transmitted negatively by the differential 45 to the input train 47 of the cosine cam 32, and negatively by the differential 46 to the input train 48 of the cosine cam 33.

The input $t$ of the train 19 is transmitted negatively to input train 42 of cosine gear 30 through differential 40, and is transmitted positively to input train 43 of cosine gear 31 through differential 41. The input $t$ is also transmitted negatively to the input train 47 of cosine gear 32 through differential 45, and is transmitted positively to input train 48 of cosine gear 33 through differential 46.

As a result of the described operations the inputs and the outputs of the several gears are as follows:

| Gear | Input | Output |
|---|---|---|
| 27 | $h$ | $\sin h$ |
| 28 | $L+d$ | $1-\cos(L+d)$ |
| 29 | $L-d$ | $1-\cos(L+d)$ |
| 30 | $L+d-t$ | $1-\cos(L+d-t)$ |
| 31 | $L+d+t$ | $1-\cos(L+d+t)$ |
| 32 | $L-d-t$ | $1-\cos(L-d-t)$ |
| 33 | $L-d+t$ | $1-\cos(L-d+t)$ |

The output train 34 from gear 27 transmits $$\sin h$$

positively. This is the first term of Equation 4.

The output trains 49 and 50 of the cosine cams 28 and 29 are subtractively combined through a differential 51 to produce an output to a train 52 of $$\frac{[1-\cos(L-d)]-[1-\cos(L+d)]}{2} = -\sin L \sin d$$

This output is the second term of Equation 4.

The output trains 53 and 54 of cams 30 and 31 are additively combined through a differential 55 to transmit an output to the train 56 of $$[1-\cos(L+d-t)]+[1-\cos(L+d+t)] = 2(1-\cos L \cos d \cos t + \sin L \sin d \cos t)$$

The output trains 57 and 58 of cams 32 and 33 are additively combined through a differential 59 to produce an output to a train 60 of $$[1-\cos(L-d-t)]+[1-\cos(L-d+t)] = 2(1-\cos L \cos d \cos t - \sin L \sin d \cos t)$$

The outputs of trains 56 and 60 are additively combined through a differential 61 to produce an output to a train 62 of which is one minus the third term of Equation 3. The outputs of trains 34 and 52 are combined through a differential 63 to produce an output to a train 64 equal to $$\sin h - \sin L \sin d$$

The outputs of trains 64 and 62 are combined through a differential 65 to produce an output to a train 66 equal to $$\sin h - \sin L \sin d - \cos L \cos d \cos t + 1 = +1$$

(Equation 5)

The train 66 runs to the synchronizer 13 and is the sole means for operating the synchronizer. It is evident that the net output of the train 66 to the synchronizer will always be $+1$ when the net input to the time train 19 is equal to the local hour angle, and hence, that when the input member 26 has been operated to the necessary extent to restore the synchronizer to its datum position, (corresponding to the value $+1$,) that must mean that the input to the train 19 has been so readjusted.

It has been mentioned that a mathematical computation involving Equation 3 always yields two possible results, only one of which is correct. If the machine were capable of yielding only one of these results, it would be vitally defective because the single result shown might be the wrong one. The machine is, however, capable of yielding either of the two results which would be yielded by mathematical computation, and no others. That this is so is evident from a consideration of the fact that during operation of the longitude input member 26 the inputs, $h$, L and $d$ are not affected while the output to the synchronizer is constantly represented by Expression 5. The third term of Expression 5 is the only variable and this negative term increases in absolute value as the angle $t$ approaches zero but again decreases as the angle $t$ departs from zero on the negative side. The zero value of $t$ is therefore a turning point for the output to the synchronizer.

Since $\cos t = \cos(-t)$, it is evident that the net output will be the same for a given absolute value of the angle $t$ whether that angle be positive or negative. A reversal of the direction of operation of the synchronizer dial will occur midway between the two correct readings, that is at the point where the net operation of the time train 19 is precisely equal to zero, and the two longitude readings given as possibly correct will be separated from one another by twice the magnitude of the hour angle. This result is correct and is in accordance with the known principles of navigation.

The theoretical or nominal output value $+1$ will invariably be present on the synchronizer at synchronism, because the functional cams 30 to 33 have versedsine outputs, not direct cosine outputs. This output position is not designated by any numerical value, however, and could just as well be regarded as the zero position, save for theoretical considerations. The signs of Expression 5 could all be considered as reversed, since the sign of the total output is a mere arbitrary selection of one direction of operation as positive and the other as negative. In that case the datum position would represent an output to the synchronizer of minus 1.

Once an operation has been performed and balance secured, the theoretical datum of synchronism becomes unimportant, for then the change in the net output to the synchronizer caused by resetting becomes $$(\sin h' - \sin L' \sin d' - \cos L' \cos d' \cos t' + 1) -$$
$$(\sin h - \sin L \sin d - \cos L \cos d \cos t + 1) = 0$$

(Equation 6)

It is thought that the foregoing description makes clear the broad mathematical principles underlying the machine.

The interrelation of the various input members and indicator dials and of their operating connections is also important and will now be explained by reference to the diagrammatic showing of Fig. 2.

The date setting knob 3 operates a train 67 and this, in turn, operates a train 68 which runs to the date indicating dial 4 and to a differential 69. The train 67 is provided with a detent for making the drive irreversible. That is to say, knob 3 can be turned in either direction to drive the trains 67 and 68, but the detent prevents the train 68 from being turned to drive the knob 3. One output train 70 runs from the differential 69 to the cam gear 71 of the almanac unit. This gear is provided with equation of time cam tracks in one face for driving a gear 72, and with declination cam tracks in the other face for driving a gear 73.

The gear 73 drives a declination train 74 which, in turn, drives a differential 75. One output train 76 from the differential runs to the declination synchronizer 6 and operates it. Another train 77 runs from the differential 75 to a clutch lock unit 78. The train 77 is also connected through 79 with the declination indicator dial 16. The lock 78 is effective during operation of the train 74, so that the train 77 is rendered inoperable and the output of the train 74 is therefore transmitted exclusively through the train 76 to the declination synchronizer 6.

Operation of the declination key 20 is effective both to release the lock 78 and to act through a train 80 to operate the train 77. This causes the declination synchronizer 6 to be run back to its datum position and the declination indicator dial 16 to be operated to show the declination angle run in. Such operation also results in running the declination angle into the train 21 which goes to the computing mechanism. Operation of the train 77 is not transmitted back through the differential 75 to the train 74 for the reason that such operation would necessarily involve operation of the differential 69 by the train 70, and that is precluded by the fact that every possible outlet from the differential 69 is locked as will become apparent from the later description. It has already been pointed out that one possible outlet of the differential 69, namely, the train 68, is locked against operation from the train 70.

The equation of time output of the gear 72 is transmitted through a train 81 to a differential 82. One apparent outlet for this input is a train 83 which runs from the differential 82 to the Greenwich civil time indicator dial 8. This train 83, however, includes a clutch lock 84 which precludes operation of the train 83 otherwise than by rotation of the key 9. The output of the train 81 through the differential 82 all goes, therefore, to a train 85 which feeds into a differential 86. Here again one output train 87 of the differential 86 is locked by a clutch lock device 88 so that the entire output from the train 81 is fed into the sun dial 5 through a train 89. The equation of time input is thus confined to the sun dial.

Still referring to the effect of the operation of the date setting knob 3, it will be observed that the differential 69 is connected to the Greenwich civil time indicator dial 8 through a train 90. This train, however, is locked against operation by the clutch lock device 84 during operation of the date setting knob 3. A further outlet train 91 from the differential 69 runs to a differential 92. One possible outlet 93 of the differential 92 runs to the locked train 83 and is, therefore, inoperable. A second outlet train 94 from the differential 92 runs to a differential 95 which has two possible outlets. One of these outlets, a train 96, runs to the right ascension indicator dial 12 but is held against operation from the differential 95, by means of a clutch lock device 97. The output of the differential 95 is transmitted by a train 98 to a differential 99. One outlet train 100 of the differential 99 runs to the star indicator dial 7 and operates it. The other apparent outlet train 102 is geared to the locked train 87 and is, therefore, maintained inoperable at this time. This input to the star dial is the right ascension of the mean sun for twelve hours Greenwich civil time of the date set up.

The key 9 for running in Greenwich civil time renders the locking means of the device 84 ineffective. Operation of the key 9 is transmitted to the Greenwich civil time indicator and thence through the line 90 to the differential 69. This provides an output from the differential 69 through the train 70 to the cam gear 71 whereby the appropriate and desired effects are produced through the equation of time train 81 upon the sun dial 5 and through the declination train 74 upon the declination synchronizer 6 in a manner similar to that already described with reference to the operation of the date setting knob 3. An output from the differential 69 is also through the train 91 to the star dial 7 as traced out in connection with the input from date setting knob 3. This constitutes an interpolative correction for the right ascention of the mean sun.

Rotation of the key 9 is also directly transmitted to the trains 83 and 93. The train 83 acts to operate the differential 82. The entire output of differential 82 is transmitted through the train 85 and differential 86 to the sun dial 5, being combined with the equation of time input which is simultaneously being run in through the train 81.

The operation of the train 93 by the key 9 is transmitted through the differential 92, train 94, differential 95, train 98, differential 99 and train 100 directly to the star dial 7, thereby running in the Greenwich hour angle of the mean sun. This input combined with the input from differential 69 makes the total input to the star dial 7 equal to the Greenwich hour angle of the first point of Aries.

Operation of the key 11 releases the locking means of the device 97 and operates the right ascension indicator dial. It also acts through the train 96, differential 95, train 98, differential 99 and train 100 to operate the star dial. This operation subtracts the right ascension of the star from the previous input to the star dial, making the net input equal to the Greenwich hour angle of the star. Train 102 is held against operation by the lock 88 at this time. The differential 95 cannot operate the train 94 at this time because all possible outlets of the train 94 are locked.

Operation of the key 22 for running in the altitude angle unlocks a clutch lock device 103 and runs the altitude angle into the altitude indicator. It acts through the train 23 to drive the sine gear 27 directly. The locking device 103 precludes any possibility of a reverse drive from the gear 27 to the train 23.

Operation of the key 24 for running in the latitude angle unlocks a locking device 105, and runs the latitude angle into the latitude indicating dial 15. It also runs the altitude angle into the train 25. The locking device 105 is effective to prevent any possible feed back from the train 25 to the latitude indicator dial.

Operation of the key 26 for running in the longitude serves to unlock the clutch lock device 106 and to run the longitude into the longitude indicator dial 17 through train 107a. It also serves to run the longitude into a train 107 which operates a differential 108. The train 102, which is an apparent outlet for the differential 108, is geared to the locked train 87 and is therefore, held inoperable. The entire output of key 26 is, therefore, transmitted to the train 19 which runs to the computing mechanism. The locking device 106 is effective to prevent any possible feed back from the computing mechanism or from the time input key to the longitude indicator dial.

Operation of the key 18 is used in sun work for restoring the sun dial to its datum position and in star work for restoring the star dial 7 to its datum position. The operation of the key 18 unlocks the locking device 88, and, through a train 109, operates the train 87. This train feeds into the sun dial 5 through the differential 86 and train 89. The train 85 is held inoperable by the differential 86 because all of its possible outlets are locked. The train 87 also acts through the train 102, the differential 99, and the train 100 to operate the star dial 7. The differential 99 cannot operate the train 98 because all possible outlets of the train 98 are locked. The train 102 when operated by the train 87 also acts through the differential 108 to operate the train 19 to the computing mechanism. The differential 108 is incapable of operating the train 107 at this time because of the action of the lock 106.

To recapitulate briefly, it will be seen that the date setting knob affects the date dial 4. It also affects the sun dial 5 through the equation of time cam, and the star dial 7 through gearing. The date setting knob affects the declination synchronizer through the declination cam. All other indicators, and the computing cams, are unaffected by the operation of the date setting knob.

Operation of the Greenwich civil time key 9 affects the Greenwich civil time dial 8. It affects the sun dial 5 directly, and also through the equation of time train. It also affects the star dial 7 directly and through differential 69. It also affects the declination synchronizer 6 through the declination cam 73. All other indicators, and the computing cams are unaffected by the operation of the key 9.

Operation of the right ascension key 11 affects the right ascension indicator dial 12 and the star dial 7.

None of the operations thus far referred to in this recapitulation has any direct effect upon the functional computing mechanism nor upon the latitude, altitude, declination and longitude dials.

Neither does any of the them have any direct effect upon the synchronizer dial 13 which is under the exclusive control of the functional computing mechanism.

Operation of the key 18 affects the sun dial and the star dial, and is used to run either of them back to its datum position depending upon whether sun work or star work is in progress. Operation of the key 18 also serves to run the Greenwich hour angle into the train 19 and, through the computing mechanism, to displace the synchronizer dial 13 from its datum position.

Operation of the key 20 runs in the declination on the dial 16, and in the case of sun work is used to restore the declination synchronizer to its datum position. This operation also runs in the declination angle on the train 21 of the computing mechanism and serves, through the computing mechanism, to affect the synchronizer dial 13.

Each of the keys 22, 24 and 26 for running in the altitude, latitude, and longitude respectively, affects the individual associated indicator and, through the computing mechanism, affects the synchronizer 13.

At the conclusion of the operation every element of known basic data which has been used stands exhibited by its appropriate indicator, and the reading of the synchronizer and the star dial in the case of star work, or of the synchronizer, the sun dial, and the declination synchronizer in the case of sun work, shows that the indicated answer is a correct one.

THE ALMANAC SECTION (See particularly Figs. 5 to 11)

The almanac section 1 comprises a thin box-like casing body 111 and an end plate 112 which is detachably secured to the body 111 by screws 113. The almanac unit is detachably secured to the frame portion of the main section 2 of the machine by means of screws 114, Figs. 4, 5 and 7, which pass through the fixed end wall 115 of the casing body 111 and which are threaded into the frame portions of the main section.

The almanac section comprises a date setting knob 3 which is made fast to a vertical shaft 116, Figs. 5 and 7, by means of a pin 117. The knob 3 is hollow and has bearing upon a hollow cup shaped bearing member 118 which is set in the upper wall 119 of the casing body 111. The shaft 116 passes through the center of the bearing 118, being journalled in the bearing and in a further bearing extension or bracket 120 which extends inward from the end wall 115 of the casing body 111. Just above the bearing bracket 120, a detent disc 121 is mounted fast upon the shaft 116. This disc has a single notch in it which coacts with a detent ball 122, the ball being urged against the periphery of the disc by a compression spring 123 which is seated in a bore 124 of the wall 115. This detent serves to determine a fixed rotative positions for the date input train corresponding precisely to twenty four hour intervals, and also to prevent feed back operation to the date setting train from independently operated parts.

The shaft 116 has fast upon it a bevel pinion 125 which drives a bevel pinion 126 fast upon a horizontal shaft 127. The shaft 127 at the left side of the pinion 126, Fig. 7, has fast upon it a worm 128 which drives a worm wheel 129 fast upon a horizontal shaft 130. The shaft 130 is supported in bearing bars or brackets 131 carried by a supporting frame plate 132. The frame plate 132 is, in turn, secured by screws 133 to posts 134 that are integral with the wall 115 and that extend toward the left from the wall.

The shaft 130 has fast upon it a worm 135, Figs. 5, 6 and 8, which meshes with a worm wheel 136 fast upon a horizontal shaft 137. The shaft 137 has bearing in the plate 132 and in the wall 115. A date indicator dial 4, having the dates for a little more than a quarter of the year arranged successively upon its periphery, is fast on the shaft 137 and is driven one date step by each complete turn of the knob 3. The date dial operates at its upper side in a recess 138, Figs. 5 and 8, formed in the lower side of the wall 119. A cover plate 139 is set over this recess, the cover plate having a narrow slot 140 formed in it through which a single date appearing on the dial may be seen. A magnifying lens 141, having a substantially square flange or base, is set upon the cover plate, and the lens and cover plate are secured to the top wall 119 by means of screws 142.

The date indicating dial 4 comprises a date bearing drum portion 143 and a hub plate 144. It is the hub plate 144 that is fast upon the shaft 137. The inner margin of the drum flange is provided with arcuate slots 145 which overlie screw holes formed in the outer margin of the hub plate 144 (see particularly Figs. 5 and 8.) Headed screws 146 have their shanks passed through the slots 145, and are threaded into the screw holes of the hub plate 144. The slots make possible an adjustment of the drum 143 relative to the knob 3, a point which is important in enabling the almanac unit to be used year after year.

The date setting train described does not have direct connection to any mechanism included in the almanac unit other than the dial 4, but it does communicate with the other operating parts to be described through the main section 2 of the machine.

The shaft 127 at the right hand side of the wall 115 has fast upon it a disc 147, Figs. 5, 6 and 7, which, in turn, has fast upon it a crank pin 148. The crank pin 148, fast upon disc 147, is adapted to cooperate with a crank fork 152 fast upon a shaft 153 which forms a part of the main section of the machine.

Figure 15:
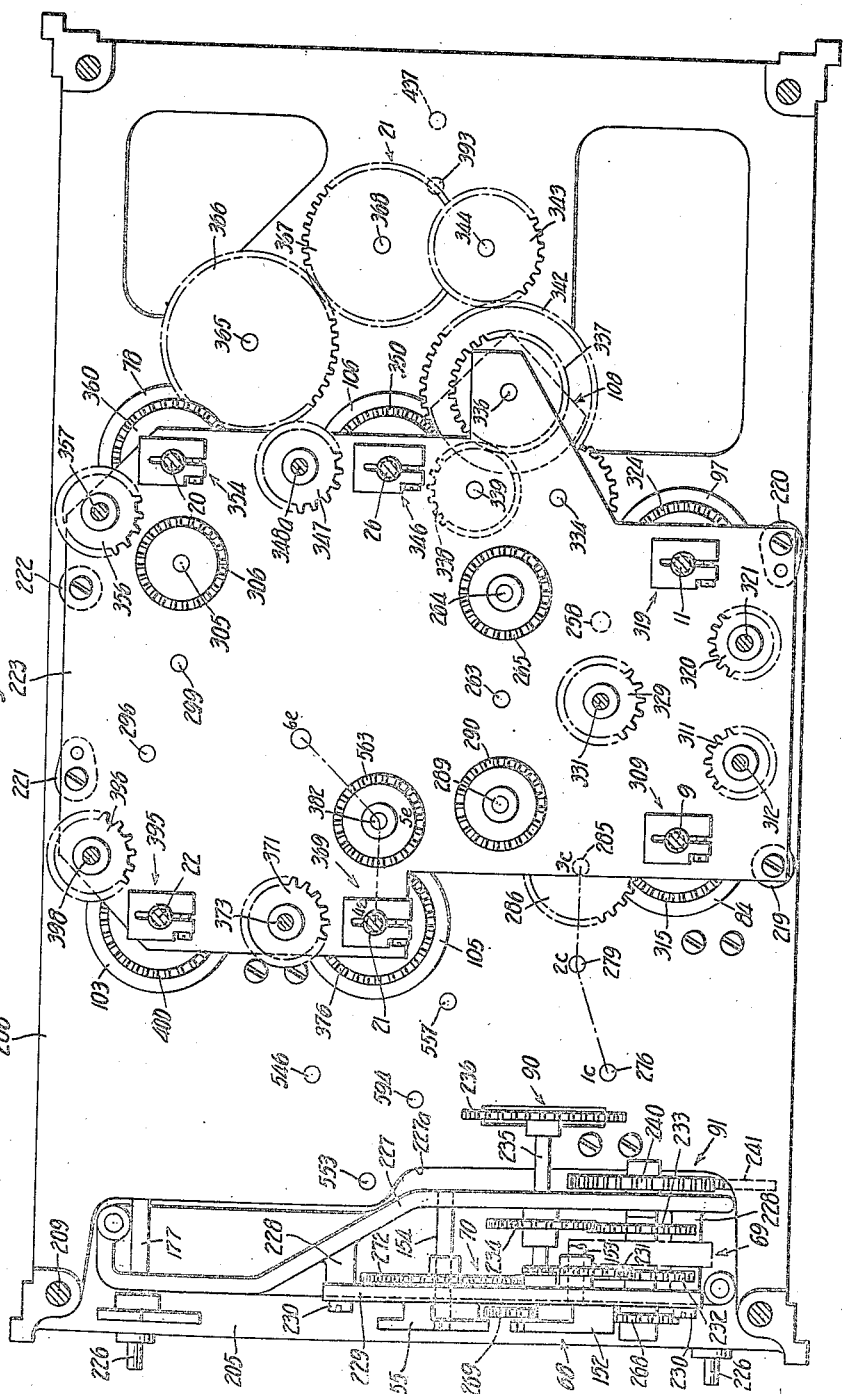
Fig. 15 is a sectional, plan view, taken on the line 15—15 of Fig. 13 in the direction indicated by the arrows.

The shafts 127 and 153 form elements of the train 68 of Fig. 2, which runs to the differential 69, (see Figs. 15 and 19). From the differential 69 the train 70 of Fig. 2 comprises a shaft 154 having a crank fork 155 fast upon it at its left hand end. The shaft 154 is aligned with a shaft 156, Figs. 7 and 9, mounted in the plate 132 and the wall 115 of the almanac section. The shaft 156 at the right hand side of the wall 115 has fast upon it a disc 157. A further disc 158 having arcuate slots 160 formed through it is secured to the disc 157 with capacity for rotative adjustment by means of screws 159 which are passed through the slots 160 and threaded into the disc 157. The disc 158 has fast upon it a crank pin 161 which is embraced by the crank fork 155. The crank fork 155 and the crank disc 158 form a separable driving connection from the shaft 154 to the shaft 156. The shafts 154 and 156 constitute elements of the train 70 of Fig. 2. The shaft 156, as here shown, has fast upon it a driving pinion 162, Figs. 5 and 7, which meshes with and drives the cam gear 71 which is fast upon a hub or sleeve 164.

Figure 9:
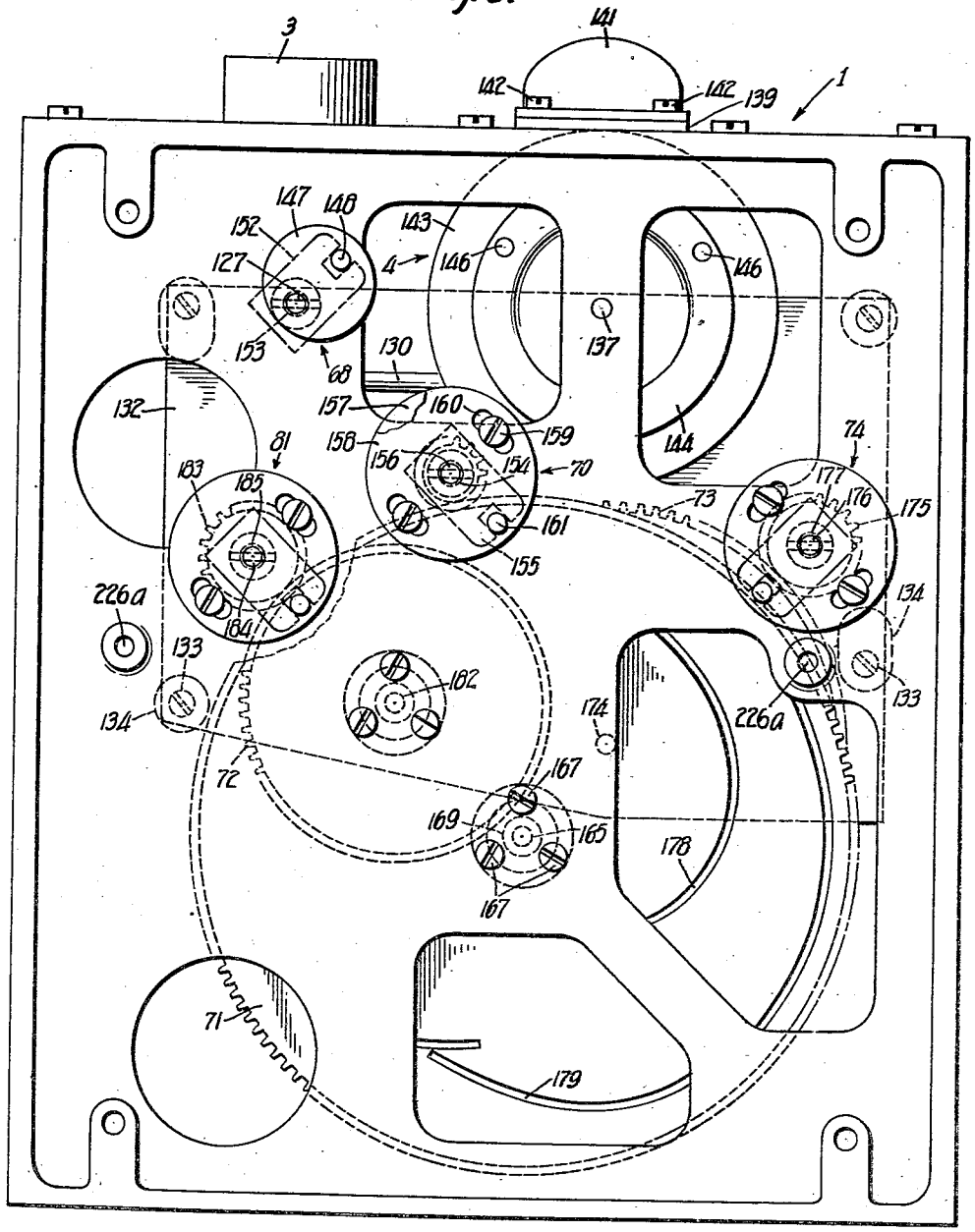
Fig. 9 is a view in side elevation of the detached almanac unit of Fig. 1 as seen from the right.

The hub or sleeve 164 has bearing upon a stub shaft 165, Figs. 8 and 9, which is integral with a disc or plate 166, said disc being set in a recess of the wall 115 and made fast in its place by screws 167. A washer 168 is impaled upon the shaft 165 adjacent the gear 164, and the parts assembled on the shaft 165 are held snugly in their assembled positions by means of a collar 169 which is pinned on the shaft.

The cam 71 has formed in its left hand face two declination cam tracks 170 and 171 which act through followers 172 to drive a declination output gear 73. There are two of the followers 172, Fig. 5, and these are mounted in quadrangular relation to one another upon the gear 73, one being adapted to cooperate with the cam track 170 and the other with the cam track 171. The purpose of providing a plurality of cam tracks and a plurality of followers is to avoid occurrence of a dead center condition where the mechanism might stall. Each follower 172 is in the form of a stud rotatably mounted in the body of the gear 73 and having a boat shaped extension for riding in the associated cam track of the cam gear 71.

It is rather futile to go into the details of the shape or design of the cam tracks 170 and 171 other than to say that they are worked out by reference to the Nautical Almanac and that they are designed to produce as an output the proper amount of declination of the sun for each day and hour represented by the operation of the cam 71.

The gear 73 is mounted in the same manner described with reference to the cam 71 but upon a shaft 174 carried by the plate 132. The gear 73 drives a pinion 175 which is fast upon a horizontal shaft 176, which shaft is journalled in the plate 132 and the wall 115. The shaft 176 extends through the wall and is separably and adjustably connected to drive an aligned shaft 177 of the main section of the machine through parts which are the same as the parts 155 and 157 to 161 that connect the shafts 154 and 156. The shafts 176 and 177 form elements of the declination train 74 of Fig. 2 which runs to the differential 75.

The right hand face of the cam 71 is formed with two equation of time tracks 178 and 179. These tracks cooperate with a pair of followers 180, Figs. 7 and 11, which are similar to the followers 172 and which are carried in quadrangular relation to one another by the equation of time output gear 72. The equation of time cam tracks 178 and 179 are designed to produce the proper output, positive or negative, corresponding to the equation of time for the date and hour of any setting of the cam 71a. The equation of time output gear 72 is mounted in the same manner already described for the mounting of the gear 71 upon a shaft 182 carried by the wall 115.

The gear 72 is shown as meshing with a gear 183, Figs. 7 and 9, fast upon a horizontal shaft 184 which is mounted in the plate 132 and in the wall 115 and which extends through to the right hand side of the wall. The shaft 184 is adjustably and separably connected to drive an aligned shaft 185 in the same manner and by the same kind of parts as already described with reference to the transmission of drive between the shafts 154 and 156. The shafts 184 and 185 form elements of the train 81 of Fig. 2 which runs to the differential 82.

Figure 11:
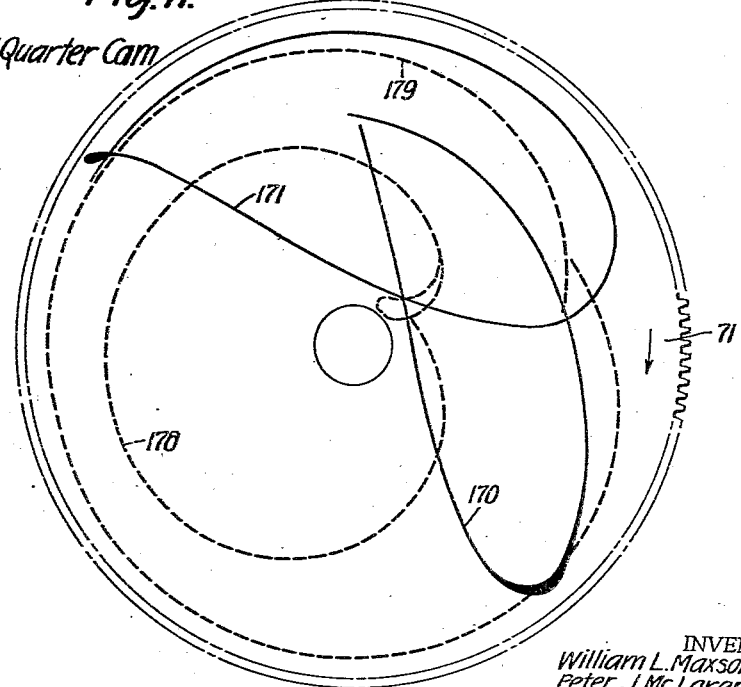
Fig. 11 is a view similar to Fig. 10 showing an almanac cam as used in the second quarter of a year.

In Fig. 11 a second quarter cam is illustrated, the declination tracks 170 and 171 being shown in full lines and the equation of time tracks 178 and 179 being shown in broken lines.

Figure 10:
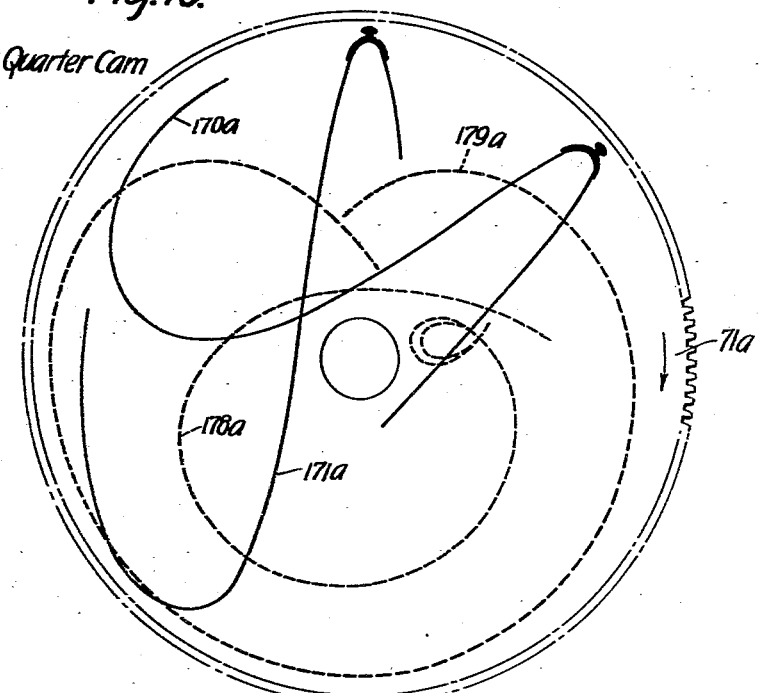
Fig. 10 is a diagrammatic view in side elevation of a cam used in the almanac unit during the first quarter of a year other than a leap year, the declination tracks being shown in full lines and the equation of time tracks in broken lines.

In Fig. 10 a cam gear 71a is shown such as would be used in the first quarter of any year other than a leap year. This gear includes declination tracks 170a and 171a, and equation of time tracks 178a and 179a. A special first quarter cam is provided for leap years, while distinct second, third and fourth quarter cams may be used in the second, third and fourth quarters, respectively, of any year.

It is desirable from the standpoint of cam track design that the gear 71 be rotated in the direction and by the means shown and described, namely, by a direct drive from shaft 184, during the first and second quarters of the year, but that provision be made for reversing the direction of drive of the gear 71 by the interposition of an extra gear between the shaft 156 and the cam gear 71, for the third and fourth quarters. This provides for reversal of the declination output, and also affects the input to the equation of time gear in the third and fourth quarters as compared with the first and second quarters.

The drive from the gear 72 to the shaft 185 is also desirably as illustrated and described in the first, second, and third quarters, but in the fourth quarter it is desirable to interpose an extra gear between the gear 72 and the shaft 184 so as to produce a reversal of output from the equation of time gear.

Provision is made for these adjustments by providing for the mounting of an additional shaft in parallelism to the shaft 156, one of the bearings 186 for such additional or counter shaft being shown in the plate 132 in Fig. 5. The counter shaft to be mounted in the bearing 186 and in an aligned bearing of the wall 132 has fast upon it a broad pinion which meshes with the gear 71 and which also meshes with a narrow pinion substituted for the gear 162 upon the shaft 156 in position to escape engagement with the gear 71.

Similar provision is made for mounting an additional or counter shaft parallel to the shaft 184 in bearings 186a to carry a broad pinion in mesh with the gear 72 and also in mesh with a gear substituted on the shaft 184 in position to escape engagement with the gear 72.

As seen in Figs. 1 and 5, the top plate 119 of the casing body 111 is formed with a recess in which a cover plate 187 is fitted and secured by screws 188. The cover plate has two sight openings 189 and 190 through which the year and the quarter appear, respectively. The year and quarter may be printed upon any suitable card or cards 191 which are secured beneath the cover plate 187 in positions to exhibit the printing which they bear. These cards are replaced from time to time to cause the year and the quarter for which the almanac unit is set to be correctly exhibited.

GENERAL ARRANGEMENT AND FRAMEWORK OF THE MAIN SECTION

Figure 12:
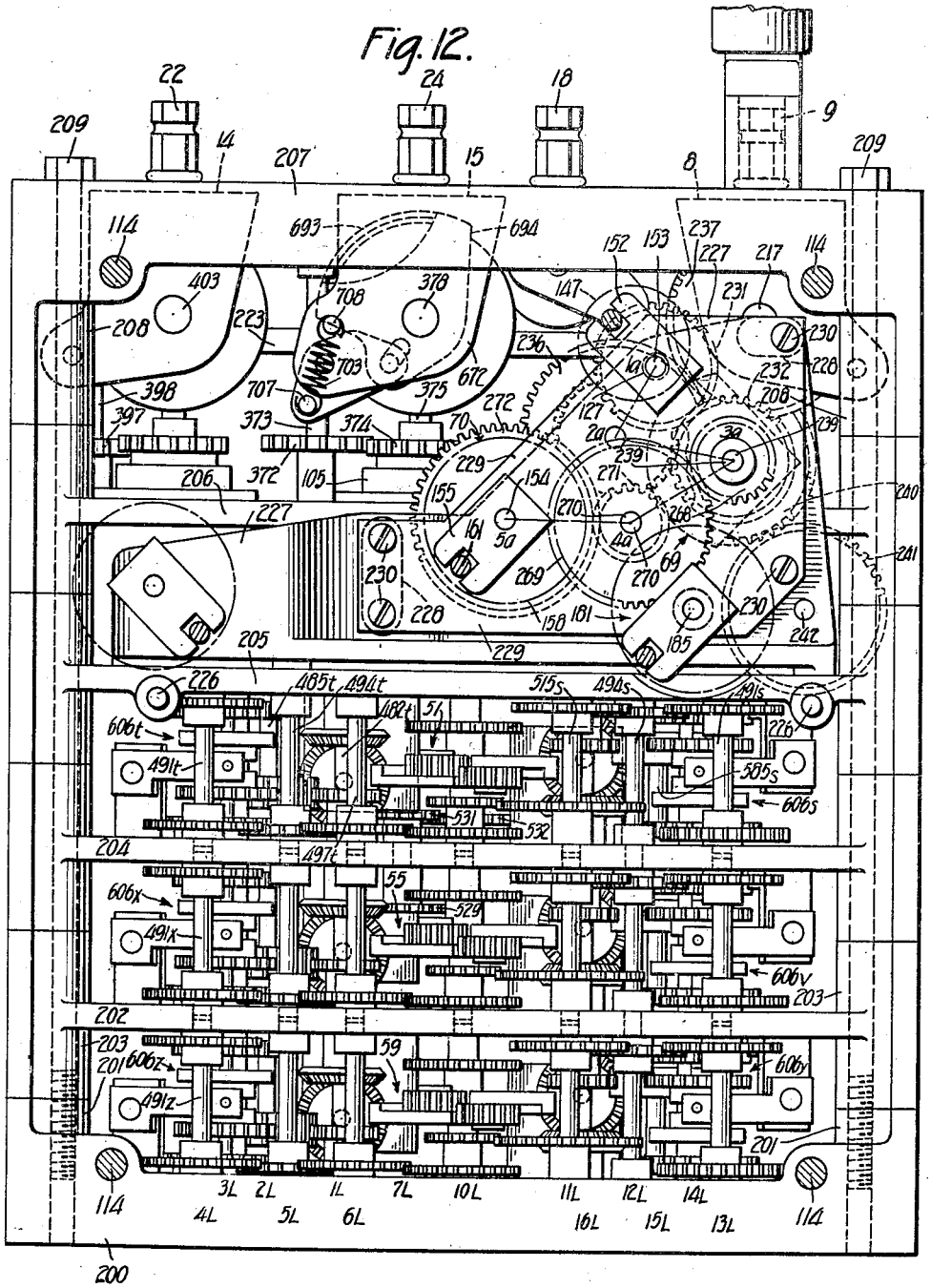
Fig. 12 is a view in sectional elevation taken upon the line 12—12 of Fig. 4 looking in the direction of the arrows.

The general arrangement of the framework of the machine is best seen in Figs. 4 and 12. The main section is built up by stories, each story being bounded by lower and upper panels which are separated from one another by corner post projections formed integral with the panels. The lowermost panel 200 has four upstanding corner posts 201. The next panel 202 which forms the upper boundary of the first story and the lower boundary of the second has four corner posts 203 which project both above and below the main body of the panel 202. The third, four and fifth panels 204, 205 and 206 are constructed similarly to the panel 202 and are similarly equipped with corner posts which extend both above and below the main body of the panel. The top panel 207 is provided with four downwardly extending corner posts 208.

All of the corner posts are provided with vertical bores which are adapted to be aligned with one another when the corner posts of the panels are superposed in the manner illustrated in Fig. 4. The bores in the posts 201 of the bottom panel 200 are threaded, and four headed tie bolts 209 are provided. Each of the tie bolts is passed through one of the aligned sets of bores and threaded at its lower end into the corner post 201 of its column of corner posts.

A front cover plate 210 is provided, and this cover plate is secured to the bottom panel 200 by screws 211, to the panel 205 by screws 212, and to the top panel 207 by screws 213. The panel 205 is provided with ears 214 for receiving certain of the screws 212 and the panel 207 is provided with ears 215 for receiving certain of the screws 213.

A back plate and a right end plate are similarly secured to the panels, screws 216, 217 and 218 employed for securing the right end plate in place, being shown in Fig. 4. A bottom plate is secured to the panel 200.

Figure 13:
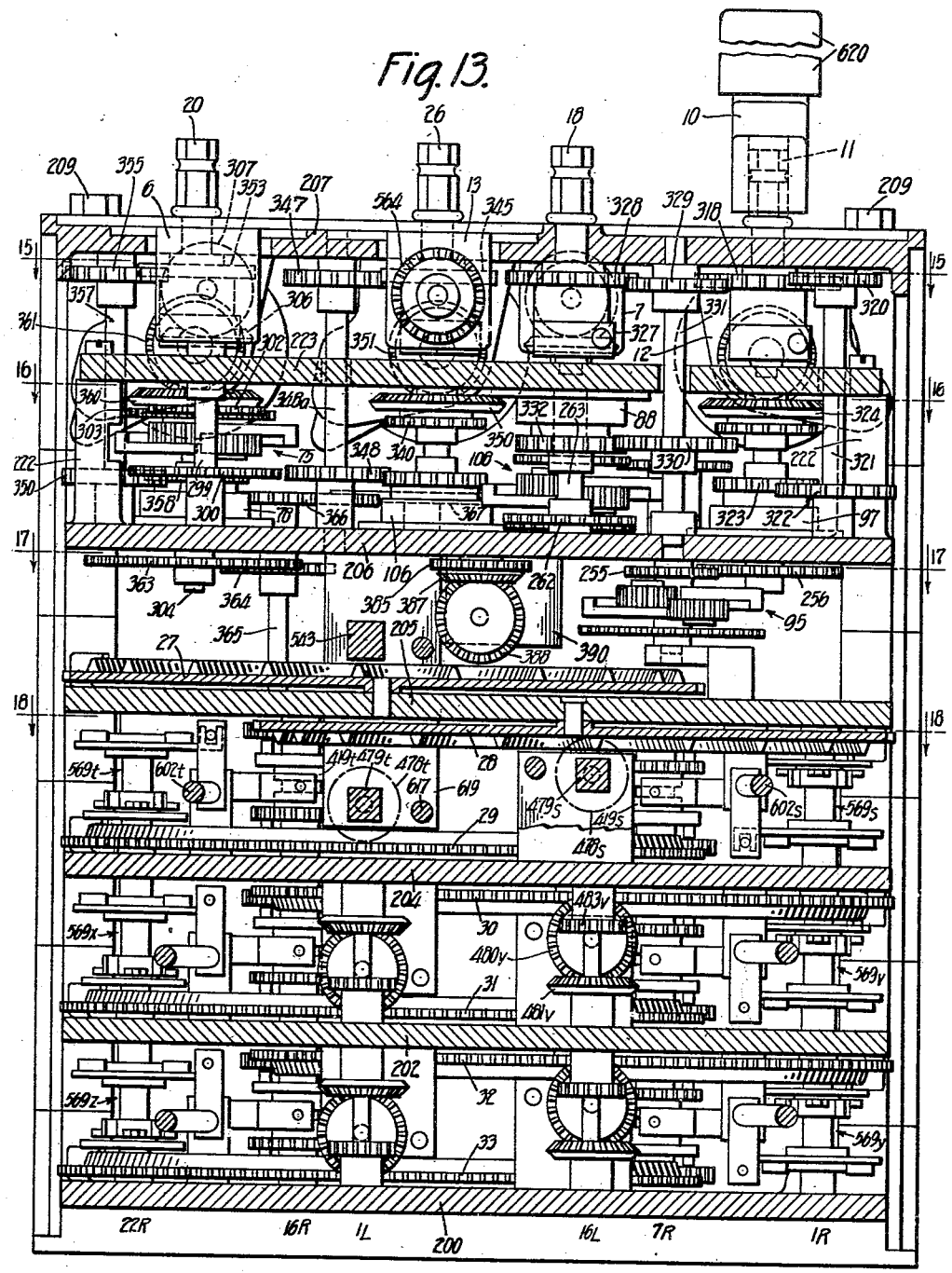
Fig. 13 is a view in sectional, side elevation taken upon the line 13—13 of Fig. 4 looking in the direction of the arrows, the upper portion being taken on the line $13x$—$13x$ of Fig. 18, and the lower portion being taken on the line $13y$—$13y$ of Fig. 18.

While the panel 206 has been referred to as similar to panel 202, it differs from the panel 202 in the fact that it has four upstanding posts formed integral with it, the two posts 219 and 220, Figs. 4, 13 and 15, being located at the forward edge of the panel 206, and the posts 221 and 222 being located at the rear edge of the panel 206. These posts support a shelf 223 which is secured to them by screws.

A top cover plate 224, Fig. 1, is secured on top of the top panel 207 by means of screws 225. This cover plate is provided with windows through which the various indicators and synchronizers may be seen, and with various circular openings through which the input keys extend.

The left hand ends of the panels 200 and 207, Figs. 4 and 12, of the main section 2 are provided with threaded bores for receiving the headed screws 114 see Fig. 5 also, whereby the almanac section 1 is attached to the main section 2. The left hand end of the panel 205, Figs. 4 and 12, is provided with jig pins 226, cooperative with jig holes 226a, Fig. 9, formed in the wall 115 of the almanac casing body 111 for facilitating the accurate juxtaposition of the sections in advance of the application of the screws 114.

All of the input operating members of the machine are accessible from the top of the machine above the cover plate, and all of the indicator dials except the date indicator dial of the almanac section are located in the top story of the main section immediately beneath the cover plate. The operating trains to the various indicators, other than the synchronizer, are all confined to the two upper stories of the machine.

All of the input trains which are directly affected by the date setting knob 3, the Greenwich civil time key 9 and the right ascension key 11 are confined to the two upper stories and have no effect upon any of the functional cam gears. The sine cam gear 27 is mounted just above the panel 205. Operation of the altitude input key 22, Fig. 2, affects this gear but does not extend to any mechanism located in the three lower stories.

The cosine cam gears 28 and 29, Figs. 3 and 12, which are affected only by the latitude and declination inputs from the keys 24 and 20, and not by the time or longitude input from the keys 18 and 26, are mounted in the third story of the machine, the former adjacent the under side of the panel 205 and the latter adjacent the upper side of the panel 204.

The cosine cam gears 30 and 31 which are affected by the latitude, declination, time and longitude inputs from the keys 24, 20, 18 and 26, are similarly mounted in the second story, the former adjacent the lower side of the panel 204 and the latter adjacent the upper side of the panel 202.

The cosine gears 32 and 33 which are affected by the latitude, declination, time and longitude inputs from the keys 24, 20, 18 and 26, are similarly mounted in the first story, the former adjacent the lower side of the panel 202, and the latter adjacent the upper side of the panel 200. All six of the cosine gears are affected by the latitude and the declination inputs, but only the gears 30, 31, 32 and 33 are affected by the time or longitude input.

Finally the combined outputs of all of the functional cams is carried up and fed into the sychronizer dial 13, which is mounted just below the top panel 207, and substantially at the center thereof, Fig. 1.

THE TIME INPUT MECHANISM WHICH DOES NOT ACT DIRECTLY UPON THE COMPUTING MECHANISM

Before taking up the input trains one by one, the point should be noted that of the eight possible input members, namely, 3, 9, 11, 18, 20, 22, 24 and 26, every one is locked against operation by every one of the others. If, therefore, in tracing out the input from any one of these members, an apparent outlet can be traced to any other of these members, that apparent outlet may be at once recognized as a locked train.

It should also be noted that where an apparent outlet train leads to one of the three elements of a differential, both of the other elements of which connect directly with locked trains, then the apparent outlet train leading to the differential is itself a locked train.

A. *The date input*

(See particularly Figs. 12, 15 and 23)

The first operation of the machine is the adjustment of the date setting knob which is transmitted into the main section through the shaft 153 (see Fig. 7), which shaft forms a part of the train 68 of Fig. 2.

The shaft 153 is journalled in a bracket 227, Figs. 15 and 23, which is secured upon the left hand margin of the panel 205 and which extends substantially through the two upper stories of the machine, see Fig. 12 also passing through a cut-out 227a formed in the panel 206 at its left hand margin, Fig. 15. The bracket 227 is formed with leftwardly extending posts 228 to which a bearing plate 229 is affixed by means of screws 230. The shaft 153 also has bearing in the plate 229. Just to the right of the plate 229 Figs. 12 and 15, the shaft has affixed to it a gear 231 which meshes with and drives a gear 232 forming one element of the differential 69.

It is not desired to go into the details of the differential construction at this point, since a separate brief chapter on the subject will be included when details are taken up at the end of the specification.

Briefly, however, it may be mentioned that in the case of the differential 69, as of other differentials that will be referred to, the construction involves a spider shaft having a spider fixed to it and carrying two broad planetary pinions which are in mesh with one another but which are disposed in staggered relation to one another. Gears of equal diameter are provided, loose on the spider shaft at opposite sides of the spider, one meshing with one of the broad planetary pinions but escaping engagement with the second, and the other meshing with the second broad planetary pinion but escaping engagement with the first. Each of the gears loose on the spider shaft is commonly made fast upon a sleeve, and each sleeve has fast upon it a second gear for input or output transmission. The gear ratios may be varied as desired.

The general principle of the differential may be stated to be that when one of the loose gears is utilized as an input gear and driven in one direction while the spider shaft is locked against rotation, the other loose gear on the spider shaft is driven at the same speed as the input gear but in the opposite direction. When, however, one of the loose gears is utilized as an input gear and driven, and the other loose gear is locked against rotation, the spider shaft will be driven in the same direction as the input gear, but at half the speed. When the spider shaft is driven and one of the loose gears is locked, the other loose gear is driven in the same direction as the spider shaft but at double the speed.

Figure 14:
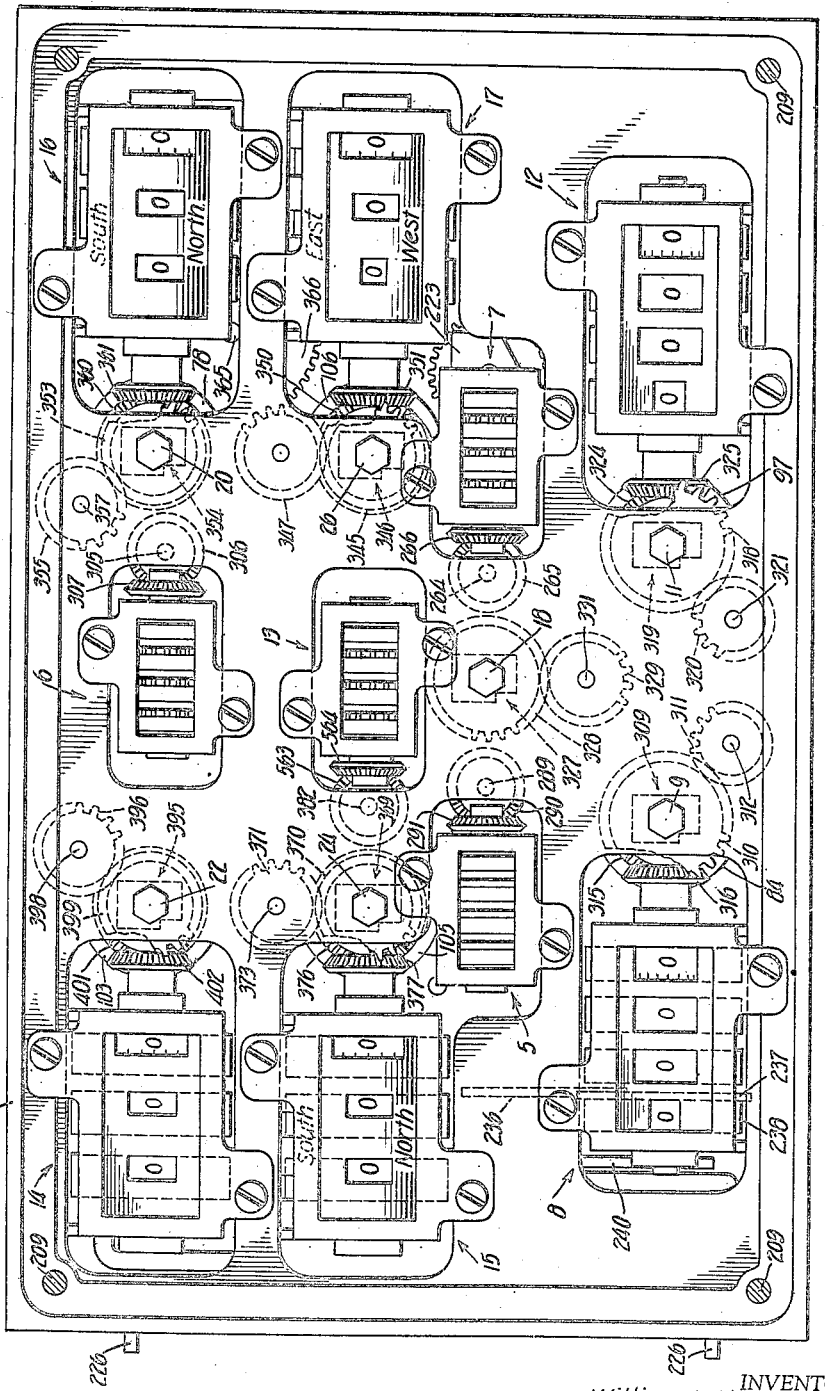
Fig. 14 is a top, plan view of the main section of the machine with the cover plate removed, the corner tie bolts being shown in section.

The gear 232 is part of one of the loose gear units of the differential 69, the other loose gear unit comprising a gear 233, Figs. 15 and 19. The gear 233 is in mesh with a gear 234 which forms an element of the train 90 of Fig. 2. The gear 234 is fast upon a shaft 235 which is journalled in the bracket 227 and in the plate 229. The shaft 235 has fast upon it a gear 236, Figs. 14 and 22, which meshes with a gear 237 fast with the hours wheel 238 of the Greenwich civil time indicator 8.

As will be clear when the counter mechanism is described in detail in a subsequent chapter, the wheel 238 is operated step by step for carry over purposes through Geneva gearing and is locked at all other times. Also, as indicated in Figs. 2 and 22, the Greenwich civil time indicator 8 is locked by the clutch lock 84 during operation of the date setting knob 3. It follows that the loose gear 233 of the differential 69 is locked at this time. The input to the gear 232 is, therefore, all transmitted to the spider shaft 239, Fig. 23, of the differential 69. This spider shaft 239 forms a part of both the trains 70 and 91 of Fig. 2. It feeds back into the cam 71 of the almanac section and also into the star dial 7 of the main section. The transmission to the star dial will be traced out first.

The spider shaft 239 has fast upon it a gear 240, Figs. 15 and 19, which forms an element of the train 91 of Fig. 2. The gear 240 meshes with and drives a gear 241, Figs. 17 and 22, fast on a shaft 242. The shaft 242 extends horizontally and is journalled in the bracket 227 and in a bracket 243 which depends from the panel 206. The shaft 242 acts through a bevel gear 244 to drive a bevel gear 245 upon a vertical shaft 246. A horizontal gear 247 fast with the gear 245 drives a gear 248 which is fast upon the vertical spider shaft 249 of differential 92. One of the loose gears 250 of the differential 92 forms an element of the train 93 of Fig. 2. The gear 250 is in mesh with a gear 251 fast on a shaft 252 which the clutch lock device 84 holds against operation at this time.

The input to the spider shaft 249 of differential 93 is, therefore, all transmitted through the loose gear 253 of the differential 92 to a loose gear 254 of differential 95. The other loose gear 255 of the differential 95 is in mesh with a gear 256 which forms an element of the train 96 of Fig. 2. The gear 256 is fast upon a shaft 257 which is at this time locked against rotation from the gear 256 by the clutch lock device 87.

The output from the spider shaft 258 of differential 95 goes through a gear 259, Figs. 16 and 22, fast on the spider shaft 258 to one of the loose gears 260 of differential 99. The other loose gear 261 of the differential 99 of Fig. 2 forms a part of the train 102 of Fig. 2. It is in mesh with a gear 262, Figs. 16, 23 and 24, which is fast on a shaft 263. The shaft 263 forms an element of the train 109 of Fig. 2 and is locked against operation from the differential 99 by the clutch lock device 88. The input to the differential 99 is, therefore, transmitted by the spider shaft 264, Fig. 24, of the differential through a bevel gear 265, see Fig. 14 also, fast on the shaft to a bevel gear 266 fast on the input shaft 267 of the star dial 7. This transmits the input to the star dial equivalent to the change in the right ascension of the mean sun corresponding to the change of date run in.

Returning now to the spider shaft 239, Figs. 12 and 19, of the differential 69 which was said to feed back into the almanac unit to drive the cam 71, it will be observed that the shaft 239 has mounted upon its left hand end just to the left of the plate 229 a gear 268. The gear 268 drives a gear 269 fast upon a horizontal shaft 270. The shaft 270 also has fast upon it a gear 271 which drives a gear 272 fast upon the shaft 154. As already described the shaft 154 operates the cam gear 71 of the almanac unit and causes an equation of time output to the shaft 185, and a declination output to the shaft 177, Figs. 7 and 8. The equation of time output from the shaft 185 to the sun dial will be first described and then the declination output from the shaft 177 to the declination synchronizer will be described.

The shaft 185, which forms an element of the train 81 of Fig. 2, extends freely through the bracket 227, Figs. 17 and 23, being journalled in the plate 229 and in a bracket 273 which depends from the panel 206. The shaft 185 has fast upon it a bevel gear 274 which drives a bevel gear 275 upon a vertical shaft 276. The gear 275 is fast with a horizontal gear 277 and the latter gear drives a gear 278 fast upon a vertical shaft 279. The shaft 279 has fast upon it a further horizontal gear 280 which meshes with one of the loose gears 281 of differential 82. The other loose gear 282 of the differential 82 meshes with the gear 251 which forms an element of the train 83 of Fig. 2. The gear 251 is fast on the shaft 252 which is locked against rotation from the gear 251 by the clutch lock 84.

The output of the differential 82 is, therefore, through the spider shaft 285, Figs. 16 and 23, of the differential through a gear 286 fast on the spider shaft. The gear 286 meshes with one of the loose gears 287 of differential 86. The other loose gear 288 of the differential 86 is in mesh with the gear 262 fast on the shaft 263. As has already been pointed out, the clutch lock device 88 locks the shaft 263 against rotation by the gear 262. The output of the differential 86 is, therefore, through the spider shaft 289 of the differential to a bevel gear 290 fast on the shaft. The bevel gear 290, see Figs. 14 and 15 also, drives a bevel gear 291 on the input shaft 292 of the sun dial 5.

The input to the sun dial thus traced out is the change in the equation of time for the change of date setting, and is either positive or negative according to whether the equation of time is increasing or diminishing between the starting and final dates covered by the operation of the date setting knob 3.

The declination input from the shaft 177 to the declination synchronizer 6 will now be traced, see Figs. 16, 17 and 25.

The declination input shaft 177 which forms an element of the train 74 of Fig. 2, extends horizontally, and is journalled in the bracket 227 mounted on the panel 205, and in a bracket 293 which depends from the panel 206. Just to the right of the bracket 293, the shaft 177 has fast upon it a bevel gear 294 which meshes with a bevel gear 295 mounted on a vertical shaft 296. The gear 295 has fast with it a horizontal gear 297 which drives a gear 298 fast on a vertical shaft 299.

The shaft 299 has fast upon it a gear 300, which drives one of the loose gears 301 of differential 75. The other loose gear 302 of the differential 75 meshes with a gear 303 which forms an element of the train 77 of Fig. 2. The gear 303 is fast upon a shaft 304 which is locked by the clutch lock 78 against rotation from the gear 303. The output of the differential 75 is, therefore, through the spider shaft 305 of the differential to a bevel gear 306 fast on the shaft. The bevel gear 306, see Figs. 14 and 15 also, drives a bevel gear 307 fast on the input shaft 308 of the declination synchronizer 6.

The input to the declination synchronizer is the change in declination of the sun in the period between the starting and final dates covered by the operation of the date setting knob 3 and is either positive or negative depending upon the direction of change of the declination.

B. *The Greenwich time input*

(See particularly Figs. 1, 14, 15, 16 and 22)

The Greenwich civil time is run in by operation of the time key 9. This input is transmitted to the star dial 7 and to the sun dial 5, and it also acts back through the almanac unit to effect a corrective transmission for the hour from the equation of time track of the cam 71 to the sun dial 5 and from the declination track of the cam 71 to the declination synchronizer 6.

The train to the star dial will be traced first. The arrangement is such that the input to the star dial through one path is equal to the hours actually run into the Greenwich civil time indicator dial, (starting from noon) and the input through another path or train is an interpolative correction for the right ascension of the mean sun.

Operation of the key shaft 9 is effective through a torque limiting clutch device 309 to drive a gear 310. The clutch device is designed to prevent any possible damage to the mathematical gears and trains of the machine by causing the key 9 to slip relative to the gear 310 in the event that any of the gears operated by the key 9 tends to stick, so that it is impossible for an operator through ignorance to damage the mechanism by applying an excessive force to the key 9.

Torque limiting clutch devices like 309 are provided in conjunction with all of the input keys. A detailed disclosure and description of the torque limiting clutch will be given in a separate chapter at the end of this specification.

The gear 310 operates a gear 311 fast on a jack shaft 312. The jack shaft 312 has fast upon it a further gear 313 which meshes with a gear 314 mounted upon the shaft 252. It will be remembered that the shaft 252 was locked by the clutch lock device 84 against rotation transmitted from the gear 251. The clutch lock device 84, however, does not hold the shaft 252 against rotation by the gear 314.

The clutch lock device is a duplicate of the various other clutch lock devices employed in conjunction with other input keys. It will be described in detail in a separate chapter at the end of this specification where details of construction of devices used throughout the machine are taken up.

The shaft 252 has fast upon it a bevel gear 315 for operating a bevel gear 316 fast on the input shaft 317 of the Greenwich civil time indicator dial 8. The output of the shaft 252 is transmitted through the gear 251 forming part of the train 93 of Fig. 2, to the loose gear 250 of differential 92. The spider shaft 249 is locked against rotation by the gear 250 because the only possible outlets for the spider shaft 91 are through the differential 69. The possible outlets for the differential 69 are the trains 68 and 90. The train 68 is locked by the detent mechanism 121, 122 associated with the date input knob 3, while the train 90 is locked by the Geneva mechanism of the Greenwich civil time indicator except to the extent which will be described presently. The output through the differential 92 is, therefore, through the gear 256 to the loose gear 254 of differential 95. The other loose gear 255 of differential 95 is locked against operation from the gear 254 by means of the clutch lock 97. The output of differential 95 is, therefore, through the spider shaft 258, Fig. 22, the gear 259 and the train, which has already been described, from the gear 259 to the star dial input shaft 267.

The transmission from the key 9 to differential 69 is effected by steps, one step being produced at the end of each hour run into the Greenwich civil time indicator. The gear 237, Fig. 22, which is on the hours wheels 238, the wheel of highest denomination of the Greenwich civil time indicator 8, drives the gear 236 one step each time that an hour is carried over into the wheel 238. The gear 236, Fig. 23, in turn, drives the shaft 235 (Fig. 19) which through the gear 234 fast upon it drives the loose gear 233 of the differential 69. The loose gear 232 of the differential 69 is directly connected through gear 231 to the date input train 68 which is locked at this time by the detent mechanism associated with the date setting knob 3. The output, therefore, is through the spider shaft 239 to the trains 70 and 91. The shaft 239 is an element of both trains 70 and 91.

The train 91 acts through differential 92 to operate the star dial 7, as has already been described. This input from key 9 to the star dial through differential 69 is an interpolative correction of the right ascension of the mean sun. The shaft 239 of differential 69 drives the almanac cam 71 through the train 70, including the gears 269, 271, 272 and the shafts 154 and 156, Figs. 7, 9, 12 and 19. It is not necessary to again trace the connections from the cam 71 to the sun dial 5 and to the declination synchronizer 6, since those connections were traced out in describing the date input mechanism.

C. *The right ascension input*

(See particularly Figs. 1, 14, 15, 16 and 22)

In star work the right ascension input of the heavenly body observed as taken from the Nautical Almanac, is run in by the key 11. This input goes to the right ascension indicator 12, and it also goes subtractively to the star dial 7.

The key 11 has loose upon it a gear 318, Fig. 22, which is driven from the key through a torque limiting clutch 319. The gear 318 drives a gear 320 fast upon a jack shaft 321. The jack shaft also has fast upon it a gear 322 which drives a gear 323. Although the clutch lock device 97 locks the shaft 257 against operation from the gear 256, it does not prevent operation of the shaft from the gear 323.

The shaft 257 has fast upon it a bevel gear 324 which drives a bevel gear 325 fast on the input shaft 326 of the right ascension indicator dial 12.

The gear 256 fast on the shaft 257, drives loose gear 255 of differential 95. The other loose gear 254 of differential 95 meshes with loose gear 253 of differential 92 which is at this time locked against operation from the gear 254. The output of differential 95 is, therefore, through the spider shaft 258 and the gear 259 fast on the shaft 258.

The gear 259 drives a loose gear 260 of differential 99. The other loose gear 261, Figs. 16 and 24, of differential 99 is in mesh with gear 262 fast on a shaft 263 which at this time is locked against operation from the differential 99 by clutch lock 88. The output of differential 99, Figs. 22 and 24, is, therefore, through its spider shaft 264 to the bevel gear 265 fast on the shaft 264 As already pointed out, the gear 265 drives a bevel gear 266 fast on the input shaft 267 of the star dial 7.

This completes the trains which put in time angles without affecting the computing mechanism.

The sun dial 5 has now had put into it the Greenwich hour angle of the mean sun, plus the equation of time (positive or negative) for the date and hour. The sun dial has, therefore, been turned away from its datum position by an amount equal to the Greenwich hour angle of the apparent sun.

The star dial has had put into it the Greenwich hour angle of the mean sun, plus the right ascension of the mean sun for the date and hour of the setting, less the right ascension of the observed star. The net input is, therefore, the Greenwich hour angle of the observed star.

THE ANGLE INPUTS OF THE COMPUTING MECHANISM

A. *The time input*

(See particularly Figs. 1, 13, 16, 23 and 24)

The time inputs to the sun and star dials are run selectively into the train 19 of the functional computing mechanism by operation of the key 18. If sun work is being done, the key 18 is operated until the sun dial has been run back to its datum position so that the input to the train 19 will be the Greenwich hour angle of the apparent sun.

If star work is being done the star dial is run back to its datum position by operation of the key 18 so that the input to the train 19 will be the Greenwich hour angle of the observed star.

Operation of the key 18, therefore, affects the sun dial, the star dial, and the train 19.

The key 18 acts through a torque limiting clutch 327 to drive a gear 328. The gear 328 acts through gears 329 and 330 fast on a jack shaft 331 to drive a gear 332 on the shaft 263. While the shaft 263 is locked by the clutch lock 88 against operation from the gear 262, the lock 88 does not prevent rotation of the shaft 263 by the gear 332. The gear 262 is in mesh, on the one hand, with the loose gear 261, Fig. 24, of differential 99 and causes an output from shaft 263 through the spider shaft 264 to the star dial 7.

The gear 262 is also in mesh with the loose gear 288, Fig. 23, of differential 86 and causes an output through the spider shaft 289 to the sun dial 5.

The loose gear 261 of differential 99, which is directly driven by the gear 262, is in mesh with a gear 333, Fig. 24, upon a shaft 334. The gear 333, in turn, drives a loose gear 335 of differential 108. The spider shaft 336 of differential 108 has fast upon it a gear 337 which is connected through a gear 338 on a shaft 339 to a gear 340 fast on a shaft 341. The train comprising the gear 338, is the train 107 of Fig. 2. The shaft 341 is locked against operation from this train by the clutch lock 106. The output of the differential 108 is, therefore, through its second loose gear 342. The gear 342 meshes with a gear 343 fast on a shaft 344, which forms an element of the train 19 of Fig. 2.

B. *The longitude input to the time train*

(See particularly Figs 1, 13, 14, 15, 16 and 24)

Although the longitude input is ordinarily the last one run in, it will be described at this point because it feeds into the same train 19 as the time input key 18, and because most of its parts have been referred to in the description just given of the time input train to the functional computer.

The longitude input key 26 drives a gear 346, Figs. 13 and 24, through a torque limiting clutch 345. The gear 346, through gears 347 and 348, see Fig. 13 also, fast on a jack shaft 348a, drives a gear 349. While the clutch lock 106 prevents rotation of the shaft 341 from the gear 349, it permits rotation of the shaft 341 by the gear 349. Rotation of the shaft 341 is transmitted through a bevel gear 350, Fig. 24, fast on the shaft, to a bevel gear 351 fast on the input shaft 352 of the longitude indicator dial 17. Rotation of the shaft 341 is also transmitted through the gears 340 and 338 to the spider shaft gear 337 of differential 108. During operation of the key 26 the loose gear 335 of differential 108 is held against rotation, so that the output of the differential is through its other loose gear 342 to the gear 343 of train 19.

C. *The declination input to the functional computer*

(See particularly Figs. 1, 13, 15, 16 and 25)

As a result of the operation of the date setting knob 3 and the hour input key 9, the declination synchronizer 6 is operated away from its datum position by an amount corresponding to the declination angle of the sun for the date and hour run in. For sun work, the declination synchronizer is run back to its datum position and this displacement is simultaneously run into the declination train 21 to the functional computer by operation of the key 20.

The key 20 operates a gear 353, Figs. 13 and 25 through a torque limiting clutch 354. The gear 353 acts through gears 355 and 356, fast on a jack shaft 357, to drive a gear 358. While the clutch lock 78 prevents rotation of the shaft 304 by the gear 358 fast upon it, it does not prevent rotation of the shaft by the gear 358. Rotation of the shaft 304 drives a bevel gear 360 fast upon said shaft, and this bevel gear, in turn, drives a bevel gear 361 fast upon an input shaft 362 of the declination indicator.

The gear 308 is fast with the gear 360 and drives the loose gear 302 of differential 75. The other loose gear 301 of the differential 75 is held against rotation by a gear 360 forming part of the train 76 of Fig. 2, so that the output of the differential 75 from the gear 302 is through the spider shaft 305, and the bevel gears 306 and 307 to the input shaft 308 of the declination synchronizer 6.

The shaft 304 also has fast upon it a gear 363 which drives a gear 364 fast upon a vertical shaft 365. The shaft 365 also has fast upon it a gear 366 which drives a gear 367 fast on a shaft 368. The shaft 368 is an element of the declination train 21 which runs to the functional computing mechanism.

When star work is in progress, the declination synchronizer 6 is incidentally operated the same as for sun work, but no attention is paid to it. The angle run into the declination dial 16 and, therefore, run up on the shaft 368, is the declination angle of the observed star as taken from the Nautical Almanac.

D. *The latitude input to the functional computing mechanism*

(See particularly Figs. 1, 12, 14, 15, 16, 17 and 26)

Assuming that the unknown element of the problem is longitude, the latitude has presumably been previously worked out from observation and is known. This is run into the train 25 of Figs. 2 and 26 by operation of the key 24.

The latitude input key is connected through a torque limiting clutch 369 to drive a gear 370. The gear 370 acts through gears 371 and 372, fast on a jack shaft 373, to drive a gear 374. The clutch lock 105 locks a shaft 375 against operation save by the gear 374, but permits the shaft to be operated by the gear. The shaft 375 has fast upon it a bevel gear 376 which drives a bevel gear 377 fast on the input shaft 378 of the latitude indicator dial 15.

The gear 376 also has fast with it a gear 379 which meshes with a gear 380. The gear 380 is fast with a gear 381. Both the gears 380 and 381 are mounted upon a vertical shaft 382 with freedom to rotate relative to the shaft, so that they have no effect upon the operation of the shaft 382. The unit formed by the gears 380 and 381 is supported beneath the shelf or plate 223 and upon a collar 382a affixed to the shaft.

The gear 381 drives a gear 383 fast upon a vertical shaft 383a. The shaft 383a also has fast upon it a gear 384, see Fig. 17 also, which drives a gear 385 mounted on a shaft 386. The gear 385 has fast with it a bevel gear 387 which drives a bevel gear 388 fast upon a horizontal shaft 389.

The horizontal shaft 389 is journalled in brackets 390 which depend from the panel 206. The shaft 389 also has fast upon it a bevel gear 391 which drives a bevel gear 392 fast on a vertical shaft 393. The shaft 393 runs down to the functional computing mechanism. The described train of connections from the gear 379 through the shaft 393 all constitutes part of the train 25 of Fig. 2.

E. *The altitude input to the functional computing mechanism*

(See particularly Figs. 1, 12, 14, 16, 17 and 27)

The altitude of the apparent sun or of any selected star is a matter of observation. The altitude is run into the altitude indicator dial 14 and into the train 23 that leads to the functional computing mechanism by operation of the key 22. The key 22 operates a gear 394, Fig. 27, through a torque limiting clutch 395. The gear 394 acts through gears 396 and 397, fast on a jack shaft 398, to drive a gear 399. The gear 399 is capable of driving a shaft 400 although the shaft 400 is locked against operation originating from any other source than the gear 399 by means of the clutch lock 103. The shaft 400 has fast upon it a bevel gear 401 which drives a bevel gear 402 fast upon the input shaft 403 of the altitude indicator dial 14.

The shaft 400 is an element of the altitude input train 23 of Fig. 2. It runs only to the sine cam 27, its output not being combined with the output of any other input member to the functional computer.

THE FUNCTIONAL COMPUTER (See particularly Figs. 2, 3, 13, 17 and 18)

Although the functional cams and their associated parts, including the input and output reverser mechanisms, are quite fully disclosed in the drawings and will be described in some detail hereafter, they are in general principle like the sine and cosine cams disclosed in Patent No. 2,273,652, hereinabove referred to. For the purpose of the present description, it is not desired to go specifically into details of the functional cam gear mechanism nor of the reverser controls associated therewith, but only such details will be referred to as may be necessary or convenient for giving a clear understanding of the operations here to be described.

In general it may be observed, however, that the six cosine cams are identical with one another. Each comprises a disc arranged to be run through a plurality of revolutions (approximately five as illustrated) when the input to the cam corresponds to a basic angle of 90°. In other words, the actual rotation of the cam is through approximately twenty times the extent of the basic input angle. Each cam is formed with a spiral toothed track for driving a follower gear which is both rotated by the cam gear teeth and caused to travel toward or from the center of the cam gear as it progresses along the toothed track in one direction or the other.

The toothed track is so chosen in shape that the extent of output operation of any cosine cam will be constantly proportional to the versedsine of the input basic angle when the follower starts at the center of the cam and progresses outward. This takes care of the first quadrant. As fully pointed out in Patent No. 2,273,652, the cam is made to cover other quadrants by causing the input to the cam to be reversed at the end of every 90° of basic angle, and by causing the output to be reversed at 90° and at 270°.

The sine cam differs from the cosine cam only in the fact that the starting position for zero input is with the follower at the extreme outer tooth of the spiral track. There is no need for any reverser mechanism because the altitude angle is always an angle of the first quadrant. The extent of operation of the output train is constantly proportional to the sine of the basic angle.

The reversal of both the input and the output of the cosine cam gears is accomplished through Geneva gearing which counts input revolutions of the cosine cam driving train, and operates clutch mechanism to throw an odd gear into and out of the train to be reversed at each reversal point of that train.

The purpose of the present chapter is first to trace out the trains which feed into the several functional gears, then to trace out the trains which receive the outputs of the functional gears and combine them to carry the combined output back to the synchronizer 13, and finally to described the parts of the reverser mechanisms and the operation of such parts, and to touch briefly upon the cosine cams and their followers.

It will be remembered that the time input as taken from the sun dial 5 or from the star dial 7 by the key 18 has been traced to the shaft 344 of train 19, that the longitude input from the key 26 has also been traced to the shaft 344 of train 19, that the latitude input has been traced to the shaft 393 of train 25, and that the declination input has been traced to the shaft 368 of train 21. In reading the description which is to follow it will be helpful to bear in mind that when any one of the three shafts 344, 393 and 368 is being operated, the other two are locked.

A. *The time and longitude input train to the cosine cams*

(See particularly Figs. 2, 3, 18, 24, 28 and 29)

The shaft 344, Figs. 24 and 28, of the time input train 19 extends completely through the three lower stories of the machine, Fig. 28, being journalled at its lower end in the panel 200. The shaft 344 has fast upon it a gear 404 which meshes with a loose gear 405 of differential 40, and also with a gear 406, Fig. 29, mounted on a shaft 407, which latter gear meshes with a loose gear 408 of differential 41. The second loose gear 408a, Fig. 28, of differential 40, and the second loose gear 409 of differential 41 are both in mesh with a gear 410 fast on a shaft 410a which is at this time locked against rotation by the differential 35, the loose gears of which are gear connected to the declination input shaft 368 and the latitude input shaft 393.

The output of the differential 40 is through a gear 411 fast on the spider shaft 412 of the differential 40 to a gear 413 fast on a shaft 414. A further gear 415 fast on the shaft 414 drives a broad pinion 416 mounted on a shaft 417. The pinion 416 is the primary input member to cosine cam 30, a portion of which is shown in dot and dash lines in Fig. 28. The pinion 416 meshes with a gear 418v fast upon a vertically shiftable clutch sleeve 419v. The sleeve, when in its raised position, drives a gear 420v which is in mesh with the cosine cam 30. When the sleeve is in its lower position it releases the gear 420v and drives a gear 421v which is in mesh with a gear 422v fast on a shaft 423v. The shaft 423v has fast upon it a further gear 424v which is in mesh with the cosine gear. When the clutch is in its up position, clockwise rotation of the pinion 416 produces clockwise rotation of the cosine gear 30. When the clutch is in its down position the reverse is true.

The gear 415 also drives the reverser control mechanism, designated generally by the numeral 569v, Fig. 28, for shifting the sleeve 419v but in order to avoid too great a digression this part will be described in a separate section at the end of this chapter.

The output of differential 41 is through a gear 425, Fig. 29, fast on the spider shaft 426 of the differential. The gear 425 is in mesh with a gear 427 fast on a shaft 428. The shaft 428 also has fast upon it a gear 429 which drives the broad input pinion 430 to cosine cam 31.

The shaft 344 extends on down into the bottom story of the machine and there has fast upon it a gear 431 which is in mesh with a loose gear 432 of differential 45, and is also connected through gearing with a loose gear 433 of differential 46. The other loose gears 434 of differential 45 and 435 of differential 46 are both in mesh with a gear 436 fast on a shaft 437. The shaft 437 constitutes an element of the train 44 of Fig. 2. The shaft 437 is locked against rotation at this time by reason of the fact that it has fast upon it a gear 438 which is in mesh with a gear 439 on the spider shaft of the differential 35. The loose gears of the differential 35 are connected, respectively, to the locked shaft 393, Fig. 29, of the latitude input train and to the locked shaft 368 of the declination input train, so that the differential 35 is itself locked with the result that the shaft 437 is locked.

The output of the differential 45, Fig. 28, is through the gear 440 fast on the spider shaft 441. The gear 440 is in mesh with a gear 442 fast on a shaft 443. The shaft 443 has fast upon it a second gear 444 which drives the broad primary input pinion 445 of cosine cam 32.

The output of differential 46, Fig. 29, is through a gear 446 fast on the spider shaft 447 of the differential. The gear 446 meshes with a gear 448 fast on a shaft 449. The shaft 449 also has fast upon it a gear 450 which drives the broad primary input pinion 451 of cosine gear 33.

B. *The latitude input to the cosine cams*

(See particularly Figs. 2, 3, 18, 26, 28 and 29)

The latitude input shaft 393 has fast upon it a gear 452 which meshes with loose gears 453 and 454 of differentials 35 and 37. The second loose gear 455 of differential 35 is in mesh with a gear 456 loose on shaft 344. The gear 456 is, in turn, in mesh with a gear 457 fast on the shaft 368 of the declination input train 21. The output of differential 35 is, therefore, through a gear 458 fast on the spider shaft 459 of the differential. The gear 458 is in mesh with a gear 460 fast on a shaft 461. The shaft 461 has fast upon it a further gear 462 which drives the broad primary input pinion 463 of cosine gear 28.

The loose gear 464 of differential 37 is also in mesh with gear 457 fast on the declination input shaft 368. The output of differential 37 is, therefore, through a gear 465 fast on the spider shaft 466 of differential 37. The gear 465 is in mesh with a gear 467 fast on a shaft 468. The shaft 468 also has fast upon it a gear 469 which drives the broad primary input pinion 470 of cosine gear 29.

The spider shaft 459 of differential 35 also has fast upon it the gear 439 so that the output of the differential 35 is transmitted through gear 438 and shaft 437 down through gear 436 to the loose gear 434 of differential 45, and to the loose gear 435 of differential 46. It will be remembered that the other loose gear 432 of differential 45 is in mesh with the gear 431 fast on the time input shaft 344. The output of the differential 45 is, therefore, through the spider shaft gear 440 to the gear 442 for driving cosine cam 32 as already described in connection with the time input train.

The locked gear 431 is also in mesh with a gear 471 mounted upon a shaft 472. The gear 471, in turn, is in mesh with the loose gear 433 of differential 46. The output of differential 46 is, therefore, through the spider shaft gear 446 which drives cosine gear 33 in the manner already described with reference to the time input.

The spider shaft 466, Fig. 29, of differential 37 has fast upon it a gear 473 which meshes with a gear 474 fast upon the shaft 410a. The shaft 410a has fast upon it the gear 410 which drives loose gear 409 of differential 41. The other loose gear 408 of differential 41 is in mesh with the gear 406 upon the shaft 407, and this latter gear is in mesh with the gear 404 fixed on the time input shaft 344. The loose gear 408 is, therefore, held against rotation so that the output of differential 41 is through the spider shaft gear 425 to the gear 427 which drives cosine cam 31.

The gear 410 is also in mesh with loose gear 408a of differential 40. The other loose gear 405 of differential 40 is in mesh with the gear 404 fast on the time input shaft 344 and is, therefore, locked against rotation. The output of differential 40 is therefore through the spider shaft gear 411 of the differential to the gear 413, the same as described for the time input train.

C. *The declination input to the cosine gears*

(See particularly Figs. 2, 3, 18, 24, 25 and 29)

The declination input shaft 368, Fig. 29, has fast upon it the gear 457 which drives the loose gear 464 of differential 37 and also drives the loose gear 455 of differential 35 through the gear 456 loose on the shaft 344.

The second loose gear 454 of the differential 37 is in mesh with the gear 452 fast on the latitude input shaft 393 and is, therefore, locked against rotation. The output of differential 37 is, therefore, through the spider shaft gear 465 to gear 467 for driving cosine cam 29 in the same manner described with reference to the latitude input train.

The loose gear 453 of differential 35 is in mesh with the gear 452 fast on shaft 393 of the latitude input train and is, therefore, locked against rotation. The output of differential 35 is, therefore, through the spider shaft gear 458 of the differential to the gear 460 for driving cosine cam 28 in the same manner already described with reference to the latitude input train.

As already pointed out, the spider shaft 466 of differential 37 also has fast upon it a gear 473. The declination output from the differential 37 is, therefore, transmitted to cosine gears 30 and 31, Figs. 28 and 29, in the manner already described with reference to the transmission of the latitude input from the shaft 410a to these gears.

The declination input is also transmitted from the spider shaft 459 of differential 35, Fig. 28, through gear 439 to cosine gears 32 and 33 in the same manner already described with reference to the transmission of the latitude input from shaft 459 to these gears.

D. The altitude input to the sine gear (See particularly Figs. 17 and 27)

The altitude input to the shaft 400, Fig. 27, has already been described. The altitude angle is not combined with any other angle and it is always an angle of the first quadrant. No reversing mechanism is, therefore, required for operating the sine cam. The shaft 400 simply has fast upon its lower end a gear 477 which meshes directly with the gear 27 and drives it.

E. The outputs from the functional gears to the synchronizer (See particularly Figs. 2, 3, 18, 29, 30 and 31)

The development of Equation 5 requires that the combined outputs of gears 28 and 29 be divided by 2 before being combined with the output from 27, and that the combined output from gears 30 to 33 be divided by 4 before being combined with the combined output from 27 to 29. Gears for performing these divisions are provided and their purpose will be mentioned, but certain multiplications occur in the transmission from the functional gears to the synchronizer which will be ignored until the end of this section, where they will be especially referred to.

The output from the cosine gear 33 is through a follower gear 478z mounted on a horizontal shaft 479z. The gear 478z is driven rotatively by the cosine gear 33 to transmit rotation to the shaft 479z. The shaft 479z has fast upon it a bevel gear 480z which drives a bevel gear 481z fast on a shaft 482z. The shaft 482z has fast upon it a gear 483z which drives a broad pinion 484z mounted on a shaft 485z. The pinion 484z meshes with a gear 486z fixed on a clutch shifting collar 487z. The collar 487z and associated parts constitute the reverser for the output train of the cosine gear 33. When the clutch collar 487z is up, the drive is transmitted through an upper gear 488z, loose on a shaft 489z to a gear 490z fast on a shaft 491z. The shaft 491z has fast upon it a gear 492z which drives a gear 493z fast on a shaft 494z. When the clutch collar 487z is in its down position, the drive is through a gear 495z loose on the shaft 489z, which gear meshes directly with the gear 493z of shaft 494z.

For a given direction of rotation of the pinion 484z, the gear 493z is driven in one direction when the clutch collar 487z is up, and in the opposite direction when the clutch collar 487z is down. The gear 493z drives a gear 496z fast on a shaft 497z, and the gear 496z, in turn, meshes with a gear 498, Fig. 31, fast on the spider shaft 499 of differential 59.

The output of the cosine gear 32, Figs. 28 and 31, is transmitted from a follower gear 478y through a gear train including a shaft 479y, bevel pinions 480y and 481y, a gear 483y, a broad pinion 484y, a gear 486y, on a shiftable clutch collar 487y, and thence either through an upper gear 495y directly to a gear 496y, or through a lower gear 493y and gears 490y and 492y to the gear 493y. The gear 493y drives a gear 514y fast on a shaft 515y. The shaft 515y has fast upon it a gear 516y which drives one of the loose gears 517 of the differential 59. The inputs to the differential 59 from the cosine gears 32 and 33, are additively combined by the differential 59, and are transmitted through the second loose gear 518 of the differential to a gear 519 fast on a shaft 520. The combined output is transmitted from the shaft 520 through a gear 521 fast on the shaft to one of the loose gears 522 of differential 61.

Before proceeding further with the description of how the outputs of the other functional cam gears are combined with one another and with the combined outputs of cosine gears 33 and 32, it will be helpful to analyze a little further the trains which have already been described from the gears 33 and 32 through the differential 59.

In order for the inputs to differential 59 to be combined in the described manner, it is necessary to take into account the law of operation of the differential, both as to ratio of inputs to outputs, and as to relative directions of inputs to outputs. Clockwise input through spider shaft gear 498, with loose gear 517 locked, would produce clockwise rotation of the loose output gear 518 twice as great as the input rotation of gear 498. Counterclockwise input of loose gear 517, with spider gear 498 locked, would produce clockwise rotation of the loose output gear 518 equal in magnitude to the counterclockwise input rotation of the loose input gear 517. While the two inputs are run in simultaneously their combined effects are the same as if they were run in successively. The additive combination of the outputs of cosine cams 32 and 33 requires, therefore, that the former shall be run into loose gear 517 in one direction and the latter into spider gear 498 in the opposite direction, also that the rotation imparted to the gear 517 for a given input shall be twice as great as the rotation imparted to gear 498 for an input of the same magnitude. The outputs from the two sources through gear 518 will then be in the same direction and in the same proportion as the source inputs.

The cosine cams are all exact duplicates of one another. Three of them, 29, 31 and 33 are faced upward, however, while the other three, 28, 30 and 32 are faced downward. Looking down on all the cosine cams, see particularly Fig. 18, it will be seen that in running through the first quadrant from 0° to 90° the cams which face up must turn counterclockwise, while those which face down must turn clockwise because of the direction in which the spirals are laid out. The input trains to the cosine gears produce these results.

When the clutch sleeve 487z, Fig. 30, is in its direct driving position, which is the lower position, the counterclockwise rotation of gear 33 is transmitted to drive gears 498, Fig. 31, and 518 of the differential 59 clockwise. When the clutch sleeve 487y, Fig. 31, is in its direct driving position, which is the raised position, the clockwise rotation of the gear 32 is transmitted counterclockwise to gear 517 and clockwise to gear 518 of the differential 59.

The first quadrant conditions of the clutch sleeves 487y and 487z are as described above, and the directions of drive are as described. The simultaneous conditions of the output reverser sleeves for all of the cosine cams can be very readily compared by setting the time and declination inputs at zero and then turning the latitude input shaft. The angle L is then sure to be on all six of the cosine cams simultaneously. This phase of the subject is emphasized at this point because it has an important bearing upon the description which is immediately to follow.

The outputs of cosine gears 31 and 30 are transmitted, respectively, to spider shaft gear 523, Fig. 31, and to loose gear 524 of differential 55, through trains which are identical, respectively with the trains that connect cosine gears 33 and 32 to differential 59. The outputs from the cosine gears 31 and 30 are additively combined through the differential 55 and the combined output is transmitted from the second loose gear 525 of differential 55, through a gear 526 loose on the shaft 520 to the spider shaft gear 527 of differential 61. The purpose of the differential 61 is to additively combine the outputs from cosine gears 32 and 33 on the one hand with the outputs from gears 30 and 31 on the other.

Since the train from cosine gear 31 to differential 55 is an exact duplicate of the train from cosine gear 33 to differential 59, and the train from cosine gear 30 to differential 55 is an exact duplicate of the train from cosine gear 32 to differential 59, it is evident that the outputs of the gears 518 and 525 would be in the same direction, and hence that rotation of input spider gear 527 of differential 61 would be in the same direction as the rotation of input loose gear 522 of the differential 61, if some provision were not made to avoid that result. Since the differential is intended to add the inputs it is evident from what has been said concerning differential 59 that the loose gear input must be in the opposite direction to the spider gear input and of twice the relative magnitude. The gears 521 and 522 take care of the magnitude factor.

The reversal of direction of the output from cosine gears 30 and 31 relative to the output from cosine gears 32 and 33 is taken care of by causing the output reverser sleeve 487v in the train from cosine gear 30 to act in a manner which is precisely the reverse of that described for sleeve 487y of the train from cosine gear 32. Similarly, the action of the sleeve 487x in the train from 31 is the reverse of that described for sleeve 487z in the train from 33. The law of reversal is the same in all of the output trains, but whereas the sleeve 487z from cosine gear 33 starts in its down position, the sleeve 487x from cosine gear 31 starts in its up position, and whereas the sleeve 487y from cosine gear 32 starts in its up position, the sleeve 487v from cosine gear 30 starts in its down position.

The effect of differential 61 may be regarded with equal validity as amounting to subtraction of a negative output of differential 55 (negative because of the reversed condition of reversers 606v and 606x) from the positive output of differential 59, or to addition of positive outputs from both sources. In either case the resulting output is the sum of the absolute values of the combined outputs from cosine gears 33 and 32 received through the loose gear 522, and the combined outputs from cosine gears 31 and 30 received through the spider shaft gear 527 of the differential 61. This output is always positive in value and is represented by counterclockwise rotation of output gear 528. The output of the differential 61 is transmitted from loose gear 528 of the differential to a gear 529 fast on a shaft 530. The shaft 530 has fast upon it a gear 531 which drives a loose gear 532 of differential 65. The gears 528, 529, 531 and 532 divide the output of differential 61 by four. The net input to the gear 532 is always counterclockwise (positive).

The other input to differential 65 is through the other loose gear 533 of the differential, and is a combination of the output of sine gear 27 with the combined output of cosine gears 28 and 29.

The outputs of cosine gears 29 and 28 are transmitted, respectively, to a gear 534 fast on spider shaft 535 of differential 51, and to a gear 536 loose on the shaft. The sleeve 487t of the train from gear 29 starts in its up (reversed) position so that its output to spider shaft gear 534 and thence to loose gear 537 of differential 51 is counterclockwise (negative). The sleeve 487s of the train from gear 28 starts in its up (direct driving) position so that its output to loose gear 537 is clockwise (positive). The combined outputs is, therefore, the difference of the two inputs. If the input angles to the gears 29 and 30 are both angles of the first quadrant the net output to loose gear 537 will be negative and the rotation will be counter-clockwise. This output is transmitted through gears 538 and 539 fast on a shaft 540 to an input gear 541 loose on spider shaft 542 of differential 63. The input of gear 541 is counterclockwise (negative) when the output of gear 537 is counterclockwise (negative).

The gears 537—541 divide the output of 537 by 2.

The sine gear 27 in running from 0° to 90° turns clockwise and acts through its follower gear 542 to drive a horizontal shaft 543. This shaft acts through a bevel gear 544 to drive a bevel gear 545, mounted on a vertical shaft 546, in a clockwise direction. The gear 545 has fast with it a further gear 547 which drives an input gear 548 fast on spider shaft 549 of differential 63 counterclockwise (positive).

The output of differential 63 is through its second loose gear 550 and is double the rotation of input gear 548. The output of gear 550 produced by the counter-clockwise (negative) input of gear 541 is of the same value as the rotation of gear 548 but in the opposite direction, i. e., clockwise, which is negative for the gear 550. The output of gear 550 is, therefore, the difference of the absolute values of the inputs to the gear when the net input from 28 and 29 is negative in value. The combined output is transmitted from the gear 550 through gears 551 and 552 fast on a shaft 553, to loose gear 533 of differential 65, producing counter-clockwise (positive) rotation of gear 533.

Counter-clockwise rotation of loose gear 533, produces counter-clockwise (positive) rotation of gear 554 (Figs. 30 and 31), fast on spider shaft 555 of differential 65. Counter-clockwise (positive) rotation of loose gear 532 produces counterclockwise (positive) rotation of spider shaft gear 554. The sum of these outputs, which is always equal to plus 1 when simultaneous values of $h$, $L$, $d$ and $t$ have been run in, is transmitted to the synchronizer 13.

The gear 554 drives a gear 556 fast on a shaft 557. A further gear 558, fast on the shaft 557, drives a gear 59 loose on shaft 375. A gear 560, fast with the gear 559, is supported on shaft 375, with freedom to rotate relative to the shaft by means of a collar 561. The gear 560 drives a gear 562 fast on the shaft 382. The shaft 382 has fast upon it a bevel gear 563 which drives a bevel gear 564 fast on the input shaft 565 of the synchronizer 13.

It has been mentioned that the gears 537—541 divide the combined output of cosine gears 28 and 29 by 2, and that the gears 528—532 divide the combined outputs of cosine gears 30—33 by 4. These divisions are to take care of the requirements of the mathematical formula, (Equation 5).

Since certain other multiplications occur in the trains of mechanism which have just been described which might possibly lead to confusion, it is thought best to point out briefly certain of the relations which are maintained.

The shaft 542 of sine gear 27 drives the spider shaft 549 of differential 63 in the same proportion that the shafts 479t, 479x and 479z of cosine gears 29, 31 and 33 drive the shafts 497t, 497x and 497z, respectively, and in the same proportion that the shafts 479s, 479v and 479y of cosine gears 28, 30 and 32 drive the shafts 515s, 515v and 515y, respectively. The shafts 549, 497t, 497x, 497z, 515s, 515v and 515y should all, therefore, have the same relative weight in the combinations of their outputs with one another except for the divisions effected by the gears 537—541 and 528—532.

It will be remembered that rotation of the spider shaft 549 produces a doubled rotation of output gear 550 of differential 63. Balance, therefore, requires that rotation of the shaft 515s or 497t shall produce a doubled rotation of the output gear 550 of differential 63. This is the fact. Gear 496t drives gear 534 of differential 51 in unison with itself, and hence produces a doubled rotation of gear 537. Gear 516s drives loose gear 536 of differential 51 at twice its own rotational speed, and hence produces a doubled rotation of gear 537.

Having in mind that the division by 2 effected by the gears 537—541 is for the purpose of eliminating the coefficient 2 which appears in the formula representing the simple combination of the outputs of the gears 28 and 29, it will be seen that rotation of the shaft 497t or of the shaft 515s is transmitted as a doubled rotation to the loose gear 541 of differential 63, and hence as a doubled rotation to the output gear 550 of differential 63. The inputs to the differential 63 from the sine gear 27 and from the cosine gears 28 and 29 are, therefore, in proper balance with one another.

The transmission of the output of gear 550 to input gears 533 of differential 65 again produces a doubled rotation because of the relative diameters of the gears in the train 550, 551, 552, 533, making a four-fold rotation of the loose gear 533 of differential 65.

The combined output from the cosine gears 30 to 33 should be correspondingly multiplied since this combined output is also put into the differential 65 through a loose gear, namely, the gear 532. Here again the division effected by the train of gears 528—532 must be ignored. It will be seen that rotation of either of the shafts 497z or 515y is transmitted as a doubled rotation to output loose gear 518 of differential 59 in the same manner already described with reference to shafts 497t, 515s and loose gear 537 of differential 51. The same thing is true of the inputs from shafts 497x and 515v to loose gear 525 of differential 55. Thus the inputs from gears 518 and 525 to differential 61 are doubled inputs. These inputs are again doubled in the same manner already described with reference to differential 51 by their transmission through the differential 61, the rotational output of gear 528 of differential 61 being twice as great as the rotational input derived from either of the gears 518 and 525. Since the division performed by the gears 528—532 is explained by the formula and is to be ignored for the present purpose, it is evident that the input to gear 532 of differential 65 is in proper balance with the input to gear 533 of differential 65. Since both of the input gears 532 and 533 of differential 65 are loose gears, they have equal effects upon the spider shaft output gear 554 of differential 65. This effect amounts to a division by 2, but that fact is unimportant since the transmission line from the gear 554 to the synchronizer 13 may be selected to produce any operating ratio desired.

The Reverser Mechanisms and the Reverser Controls (See particularly Figs. 12, 13, 18, 32, 33, 34, 35, 36 and 39)

As has been stated, the input train to each cosine cam includes reverser mechanism for reversing the direction of rotation of the cosine cam at the conclusion of each 90° of basic angle input, and reverser mechanism for reversing the output train of each cosine cam at 90° and at 270° of basic angle input.

Reverser control mechanism is provided for these trains and, although the input and output reversers of a single cam are rather widely separated in the machine, the controls for both reversers are closely associated and include elements in common.

The reversers and the reverser controls for the cosine cams 28, 30 and 32 which face downward, are located at the front of the machine, while the reversers and the reverser controls for the cosine cams 29, 31 and 33 which face upward are located at the back of the machine. The first three reverser and reverser control units are duplicates of one another, and the last three reverser and reverser control units are duplicates of one another. The last three units are substantial duplicates of the first three units, the principal difference being that the units of the two sets are in inverted relation to one another. One reverser unit, that related to cosine cam 29, has, therefore, been chosen for illustration, although the description would apply equally to the reversers of cosine cams 31 and 33. The parts which are duplicated in other like units are designated by numerals with the subscript t added. The reverser mechanisms of cosine cams 28, 30, 31, 32 and 33 will not be described in detail, but corresponding reference numerals have been applied to corresponding parts associated with the respective gears, the subscripts s, v, x, y, and z being substituted, respectively, for the subscript t.

It will be remembered that the output from differential 37, Fig. 29, is transmitted to the broad primary driving gear 470 of cosine gear 29 through a shaft 468 and a gear 469.

The gear 469 also drives a gear 566t fast on a shaft 567t, which shaft also has fast upon it a gear 568t for driving the reverser control unit 569t. The gear 568t drives a gear 570t, see Figs. 36 and 38 also, fast on a shaft 571t. The gear 570t also has fast with it a notched disc 572t which has a two-toothed lug 573t on one of its faces. The notch of the lug coincides with the notch 574t of the disc 572t. The disc 572t and its lug form a unit of a train of Geneva gearing. This unit cooperates with a further Geneva unit 575t, loose on the shaft 576t.

The unit 575t comprises an upper gear 577t having eight equally spaced teeth, four alternate teeth being broad to extend into the plane of the disc 572t, and all of the teeth being disposed in the plane of the toothed lug 573t. The disc 572t coacts with the broad teeth only, and the lug coacts with all of the teeth of the gear 577t to drive the gear 577t a quarter turn for each complete revolution of the shaft 571t. The unit 575t also includes a disc 578t which is similar to the disc 572t. The disc 578t cooperates with a further Geneva unit 579t loose on a shaft 580t.

The Geneva unit 579t is similar to the Geneva unit 575t including a gear 581t like the gear 577t, and a disc 582t like the disc 572t.

The unit 579t drives a further similar unit 583t fast on the shaft 576t, the unit 583t including a gear 584t but differing, however, in the fact that its disc 585t has two diametrically opposed notches, and two-toothed lugs associated with the two notches. The unit 583t, in turn, drives a gear 586t which is like the gear 577t and which is fast upon the shaft 580t.

The result of the described train of gearing is that the gear 586t is given a quarter turn in unison with alternate quarter turns of the unit 583t. The unit 583t is given a quarter turn in unison with the unit 579t at every fourth quarter turn of the latter. The unit 579t is given a quarter turn in unison with the unit 575t at every fourth quarter turn of the latter. The unit 575t is given a quarter turn in unison with the shaft 571t at every fourth quarter turn, that is to say, once in each revolution of the shaft 571t. It will be seen, therefore, that the shaft 580t is given a quarter turn for each thirty-two revolutions of the shaft 571t, and that the shaft 576t is given a quarter turn for each sixteen revolutions of the shaft 571t. The shaft 576t controls the input reverser and the shaft 580t controls the output reverser.

A cam 587t, Figs. 36 and 38, is fast upon the upper end of the shaft 576t. A slotted reverser slide 588t receives a cylindrical boss portion of the cam 587t and travels between the cam proper and the upper end of a spacing and supporting sleeve 589t. The reverser slide 588t carries follower rollers 590t which extend upward in positions to be engaged by the cam 587t so that as the cam is rotated it is caused to thrust the slide forward and rearward. Alternate quarter turns of the cam are idle. One of the remaining quarter turns serves to thrust the slide 588t forward, and the other remaining quarter turn serves to thrust the slide 588t rearward. A reversal of the input train is, therefore, effected once in thirty-two revolutions of the shaft 571t. This occurs after each 90° of basic angle input.

The forward end of the slide 588t is connected to a pin 591t, Figs. 32 and 33, carried by an upwardly extending arm 592t of a bell crank 593t, see Fig. 35, also, pivotally supported in brackets 594t. The forward arm 595t of the bell crank 593t is in the form of a clutch shifting fork and is provided with pins 596t for engaging a circumferential groove in the clutch shifting sleeve 419t.

The input gear ratio is so chosen that the shaft 576t is caused to be given exactly two quarter turns (one reversing operation) for every 90° of basic angle input to the cosine cam 29.

The shaft 580t, Figs. 32, 33 and 34, similarly has fast upon it a cam 598t for operating a reverser slide 599t which is connected at its forward end to a pin 600t carried by an arm 601t fast on a shaft 602t, the bell crank 593t being loose on the end of the shaft 602t. The shaft 602t is supported in the bearing bracket 594t and in a bearing 603t, and has fast upon it a clutch shifting fork 604t, Figs. 32, 33 and 34, which is provided with pins 605t for cooperating with a circumferential groove formed in the output clutch shifting sleeve 487t. Since the slide 599t is operated at alternate operations of the slide 588t, it is evident that the output train will be reversed at alternate reversals of the input train, that is to say, after every 180° of basic angle input. The timing is so chosen, however, that reversals of the output train occur after 90° and 270°.

The output reverser unit proper 606t comprises a clutch shifting sleeve 487t having a gear 486t thereon which is driven by the broad primary input gear 484t. The sleeve 487t is provided with upper, cone-tipped pins 607t and with lower cone-tipped pins 608t. The pins 607t are adapted to enter cone-mouthed bores 609t formed in an upper gear 488t, while the pins 608t are adapted to enter cone-mouthed bores 610t formed in the lower gear 495t.

The lower gear 495t has direct driving engagement with gear 493t. When the clutch sleeve 487t is down, the gear 493t is driven directly from the broad gear 484t through the clutch sleeve 487t and the gear 495t. When the clutch sleeve 487t is up, the drive is through the gear 488t to gear 490t and thence through gear 492t to gear 493t.

The input reverser is constructed in precisely the same way and operates in precisely the same manner, save that the ultimate drive is to peripheral teeth 611 of cosine gear 29, rather than to the gear 493t.

D. *The functional cams and their followers*

(See particularly Figs. 13 and 18)

In order that there may be no hiatus, the functional cams and their followers will be briefly described. For this purpose the description will be applied to cam gear 29, but the description is to be understood to describe the construction of any one of the cosine gears or of the sine gear. The gear 29 is provided with equally spaced teeth 612 arranged along a spiral path of approximately five turns. The innermost tooth is offset somewhat from the center or axis of the gear, and a square shaft 479t is disposed to extend across the functional gear in such relation to it that the axis of the square shaft misses the axis of the functional gear by the same amount that the innermost tooth 612 of the functional gear is displaced from the center.

The square shaft has mounted upon it a follower, crown gear 478t provided with a sloping flange 615 for engaging the outer sides of the teeth 612 of the functional gear. A follower 616 is mounted upon a shaft 617 which extends parallel to the shaft 479t. The follower engages the back of the flange 615 of the gear 478t and is provided with a finger 618 which extends down in vertical alignment with the axis of the shaft 479t to travel along the inner side of the track defined by the teeth 612. Brackets 619 provide bearings for cylindrical portions of the square shaft 479t and supports for the follower supporting shaft 617.

Every point on the spiral track along which the teeth 612 are arranged, has a radius proportional, substantially, to the sine of its basic angle, that is to say, if five turns of the functional gear represent one quadrant of the basic angle, then the radius of each tooth is proportional to the sine of one twentieth of the angle through which the functional gear would have to be rotated to carry the follower gear 478t outward from the center and make that tooth engage the follower gear and have its radius extend parallel to the shaft 613.

The sine gear, which produces a sine output, operates to carry the associated follower gear from the outermost tooth to the center in running the input from 0° to 90°, the radius of each tooth being proportional, substantially, to the cosine of the basic output angle.

THE INPUT HANDLE, THE TORQUE LIMITING CLUTCHES AND THE CLUTCH LOCKS (See particularly Figs. 40 and 42)

The same handle 10 is used alternatively in conjunction with all of the input keys 9, 11, 16, 18, 20, 22, 24, and 26. These keys are all of identical construction. The same type of torque limiting clutch is employed for transmitting the input of every one of these keys. The same type of clutch lock is employed in conjunction with every one of them. For the purpose of the present description, however, these parts will be described specifically with reference to the Greenwich civil time input key 9, but the description is to be understood as generally applicable to the various input keys.

The handle 10 is formed like a wrench, being provided with a rotatable sleeve or finger piece 620 upon its handle portion and with a polygonal socket 621 which is adapted to fit the polygonal key 9. The key 9 is formed with a circumferential groove 622, and the handle is provided with a detent ball 623 for cooperating with the groove 622 to retain the handle against accidental dislodgement or shifting longitudinally of the key 9 when it has been applied to the key. The ball 623 is thrust toward the bore 621 by a coil spring 624 lodged in a bore 625 formed in the handle. The mouth of the bore 625 is made smaller than the diameter of the ball 623 to prevent escape of the ball when the handle is taken off the key. The pressure of spring 624 is light enough so that the ball does not interfere with the ready application of the handle to the key 9 or with its removal therefrom at the will of the operator.

The key 9 is formed with a collar 626 for bearing against the under face of the top panel 207, and is formed with a groove 627 just above the level of the top panel. A resilient split ring 628 fits into groove 627 and bears against the upper face of a boss 629 formed on the panel 207 around the key. The key 9 has its lower end portion 630 threaded to receive a split clamping nut 631. A pair of friction discs 632 surround the key just above the nut 631, and the gear 314 surrounds the key just above the discs 632. The gear 310 bears at its upper side against a boss 633 formed at the lower side of the panel 207 around the key 9. The nut 631 is turned on the threaded end 630 of the key 9 until the friction between the nut 631 and the gear 314 has been adjusted to just the value desired. A screw 634 which passes freely through one arm 635 of the nut 631, but which is threaded into the other arm 636 of the nut is then turned to clamp the nut firmly and immovably in its adjusted position. It will be seen that if the machine parts oppose a resistance to rotation of the gear 314 sufficient to overcome the frictional force transmitted from the nut 631 to the gear 314, the clutch formed by the discs 632 will yield permitting the key 9 to rotate independently of the gear 314. This will in no way disturb the relations of any of the parts of the machine since all parts operated by the key 9 are operated through the gear 314.

The gear 310 acts through the gear 311, the jack shaft 312 and the gear 313 to drive the gear 314. The gear 314 acts through the clutch lock 24 to drive the shaft 232.

The clutch lock comprises a flanged, cup-like member 637 which is secured upon the panel 206 by means of screws (not shown) which pass through screw holes 638. Within the cylindrical drum portion of the member 637, the shaft 232 has fast upon it a block 639 which forms a ball clutch element. The block 639 is shaped as illustrated in Fig. 41, being provided with four ball receiving notches 640, 641, 642 and 643. Rollers 644 are received in the notches but are thrust outward in each instance from the notch base by a spring 645. Each notch is shallower at its mouth than at its base. The notches 640 and 641 face clockwise while the notches 642 and 643 face counter-clockwise.

When a force is applied to rotate the block 639 by the shaft 252, tending to rotate it in a clockwise direction, the balls in the notches 642 and 643 wedge more firmly against the inner cylindrical wall of the member 637 and, therefore, lock the block 639 against rotation. It will be observed, however, that the balls seated in the notches 640 and 641 have no tendency to oppose such clockwise movement of the block 639.

When force is applied to the block 639 by the shaft 252, tending to rotate it in a counter-clockwise direction, however, the rollers seated in the notches 640 and 641, Fig. 41, wedge more firmly against the cylindrical wall of the member 637 and lock the block 639 against counter-clockwise rotation. The rollers seated in the notches 642 and 643 have no tendency to oppose counter-clockwise rotation of the block 639.

From the above it will be seen that any attempt to rotate the block 639 from the shaft 232 will be firmly opposed in one direction by one pair of balls and will be firmly opposed in the other direction by the other pair of balls.

The gear 314, however, has two fingers 646 extending downward from it, one extending between the rollers seated in the notches 640 and 643 and the other extending between the balls seated in the notches 641 and 642. When clockwise movement is applied to the gear 314, the rollers in the notches 642 and 643 are thrust against the bases of their notches by the fingers 646, so that they no longer oppose clockwise movement of the block, but permit the block 639 to be driven in a clockwise direction by the fingers 646 acting through the rollers. Similarly, when the gear 314 is turned counter-clockwise, the fingers 646 force the balls in the notches 640 and 641 to their seats, so that these rollers no longer oppose counter-clockwise movement of the block 639. The block 639 is, therefore, driven counter-clockwise through the fingers 646 and the seated balls.

As a result of the described arrangement, the block 639 cannot be driven in either direction by the shaft 252, but it can be driven in either direction by operation of the gear 314.

THE DIFFERENTIALS (See particularly Figs. 43 and 47)

All of the differentials employed in the machine are alike in every particular, save as to the relative sizes of the input and output gears. The following description, therefore, may be taken as generally applicable to any of them, subject only to the qualification that the input and output gears of various specific differentials may be of different sizes from those disclosed in Fig. 44, to which reference is had in the present description.

The differential disclosed in Figs. 43 to 47 comprises a spider shaft 647 having a collar 648 formed integrally with it. The collar is formed with an external annular rabbet 649 in its lower face. A spider 650 is attached to the collar 648 by means of rivets 651, the spider being formed with a central bore and with a surrounding internal annular rabbet 652, so that the collar and the spider interfit with one another as seen best in Fig. 45.

The spider is a metallic plate in the form of a sector having a vertex angle which is substantially a right angle as shown. It is formed with a radial slot 653 in its marginal portion, the slot extending substantially along the bisector of the vertex angle. The inner portion 654 of the spider is relatively thin and lies in a median plane with respect to the thickness of the spider.

At the outer portion of the left hand side of the sector extends downward from the median plane of the portion 654, and the upper part of the left hand side adjacent the slot is cut away to provide a lower shelf 655 which lies below the plane of the portion 654.

Similarly, the outer portion of the sector at the right hand side of the slot 653 extends upward from the median plane of 654 and that portion adjacent the slot 653 is cut away at the lower side to provide an upper shelf 656 which lies above the median plane of 654.

Two planetary pinions 657 and 658, of equal diameters, are rotatively mounted mounted on the spider to mesh with one another. The pinion 657 is rotatively supported by the shelf 655 at the upper side thereof, and pinion 658 is rotatively supported by the shelf 656 at the lower side thereof. Holes 659 and 660 through which the bearing shafts for the pinions 657 and 658 extend, are shown in Fig. 46.

Two loose gear units are mounted upon the spider shaft 647, one at either side of the central portion 654 of the spider 650. The upper unit comprises gears 661 and 662, both of which are secured to a hub or sleeve 663 by means of rivets 664. The lower unit comprises two gears 665 and 666, both of which are secured to a hub or sleeve 667 by means of rivets 668. The gears 662 and 666 are of equal diameters. One of them, the gear 662 is constantly in mesh with the pinion 657 while the other gear 666 is constantly in mesh with the pinion 658. The diameters of gears 661 and 665 may be independently varied at will. The spider shaft 647 has fast upon it one or more gears as previously described.

THE INDICATOR DIALS OR COUNTERS (See particularly Figs. 48 to 51)

The counters or indicator dials are all generally similar to one another. They differ in that some of them indicate hours, minutes and seconds, others degrees and minutes, and still others, such as the sun and star wheels, the declination synchronizer, and the synchronizer are without graduations.

A further difference distinguishing the counters one from another lies in the fact that whereas the latitude and declination counters are arranged to indicate either positive or negative angles (north and south respectively), and the longitude counter is arranged to indicate either positive or negative angles (west and east respectively), the altitude counter is arranged only to indicate positive angles of the first quadrant.

The declination synchronizer 6, the sun dial 5, the star dial 7, and the synchronizer dial 13 are all simply decimal counters without numerals, capable of operation in either direction by a rotary input member. The carry-over in these counters is through Geneva gearing which causes every tenth step of a decimal wheel to produce a single step of next higher denomination wheel, equal to one-tenth of a revolution.

The longitude dial 17, which involves practically every feature present in any other dial or counter, has been selected for specific illustration and description. After it has been described, the points of difference of the other individual counters will be mentioned.

The longitude indicating dial or counter 17 comprises a yoke 670 which comprises a plate 671 secured to the under side of the panel 207, and downwardly extending parallel arms 672 in which the counter shaft 352 is journalled. The plate 671 is formed with a sight opening 673 through which the dial wheels can be seen. The shaft 352 has fast upon it a wheel 674 which is the dial wheel of lowest denomination, that is to say, it is the minutes wheel of the counter.

The wheel 674 has fast with it a Geneva disc 675 which is formed with a single notch and with a two toothed lug bordering the notch, the same as the disc 572t of the reverser control mechanism already described. The arms 672 also form bearings for a carry-over shaft 676. A Geneva gear 677 is mounted loose on the shaft 676, but is held against longitudinal movement by reason of the fact that it extends between the minutes wheel 674 and the degree units wheel 678. The gear 677 has eight teeth. Four of these teeth extend the full width of the wheel to cooperate with the disc 675. The other four teeth are narrow enough to escape engagement with the disc but they are, in common with the broad teeth, acted upon by the two toothed lug carried on the disc 675. At each full revolution of the wheel 674, the gear 677 is rotated two tooth spaces; that is, a quarter turn. All of the teeth of the gear 677 coact with a gear 679 fast on the wheel 678. The gear ratios are such that a quarter turn of the gear 677 turns the gear 679, and consequently the wheel 678, through one-tenth of a revolution. The wheel 678 has fast with it a Geneva disc 680 which is similar to the disc 675 and which is similarly equipped with a single notch and with a two toothed lug. The shaft 676 has loose upon it an eight toothed gear 681, four of whose teeth are narrow and are located to escape engagement with the disc 680 but to be acted upon by its two toothed lug. At the end of each complete revolution of the wheel 678 the gear 681 is given a quarter turn. The gear 681 has fast with it a pinion 682 for driving a gear 683 fast with the highest denomination wheel 684 of the indicator. The ratios of the gears 682 and 683 are such that a quarter turn of the gear 682 drives the gear 683, and consequently the wheel 684, through one-eighteenth of a revolution.

For indicating west and east longitude, respectively, the dial wheel 674 is divided into two circumferentially extending stripes or zones 685 and 686. Starting from the same zero position, the zone 685 bears every fifth number from "0" to "55," the numbers being arranged so that they come up in ascending order as the dial wheel is rotated away from the operator. The numbers are similarly arranged but in the reverse order along the zone 686 of the wheel 674. The numbers of each series are arranged at equal intervals, and each space between successive numbers is divided into five equal space intervals by an index scale 687. The "0" of one series coincides with the "0" of the other series.

The dial wheel 678 is similarly divided into two circumferential zones 688 and 689. Zone 688 is for indicating west longitude and has the numbers from "0" to "9" arranged at equal intervals around the wheel. The numbers are arranged to come up in ascending order as the wheel is rotated away from the operator. The numbers from "0" to "9" are arranged at equal intervals but in reverse order upon the zone 689, which is for indicating east longitude. The "0" of the zone 689 coincides with the "9" of zone 688, and vice versa.

The number wheel 684 is similarly divided into a zone 690 for indicating west longitude and a zone 691 for indicating east longitude. The zone 690 has the numbers from "0" to "17" arranged on it at equal intervals and so that they come up in ascending order as the wheel is turned away from the operator. The zone 691 has the numbers from "0" to "17" similarly arranged, but in the reverse order. The "0" of zone 691 coincides with the "17" of zone 690, and vice versa.

There are ten number spaces upon the wheel 678, so that a single carry over step equal to one-tenth of a revolution advances the number wheel exactly one number space. There are eighteen number spaces circumferentially of the wheel 684, so that a single carry over step equal to one-eighteenth of a revolution advances the wheel exactly one number space.

The number wheels as described are used in conjunction with a shield 692 for exhibiting the numbers of the west longitude zones when the input to the longitude indicator is positive, and for exhibiting the numbers of the east longitude zones when the input to the longitude indicator is negative. The shield 692 is in the form of an arcuate plate 693, carried by arms 694 which are journalled upon the shaft 352. The plate 693 has three transversely aligned sight openings 695, 696, and 697, which are in circumferential alignment, respectively, with the zones 685, 688 and 690. It also has three transversely aligned sight openings 698, 699 and 700 which are in circumferential alignment, respectively, with the zones 686, 689 and 691.

Provision is made for automatically causing the openings 695, 696 and 697 to stand in register with the sight opening 673 when the input to the indicator is positive or west longitude, and for causing the shield to shift the openings 698, 699 and 700 into register with the sight opening 673 when the input to the indicator is negative or east longitude.

To this end, the wheel 684 of highest denomination is provided with a flattened pin 701 for co-operating alternatively with flattened pins 702 and 703 fast on a shutter lifting lever 704. The lever 704 is journalled upon the shaft 676, and is provided with a pin 705 for cooperating with a slot 705a, formed in one of the shutter carrying arms 694. A coil spring 706 is connected at one end to a pin 707 carried by the tail of the lever 704, and at its opposite end to a pin 708 fixed on the associated arm 672 of the yoke 670.

The parts as shown in Figs. 48 and 50, are in position to indicate west longitude. If now the input is in a positive direction so that it tends to carry the wheels in a counter-clockwise direction as viewed in Fig. 48, the pin 701 will travel counter-clockwise, and as the carry over from plus to minus occurs through zero the pin 701 will engage the pin 703 and move it downward, turning the lever 704 counter-clockwise, and causing the spring 706 to cross the axis of the shaft 676. As soon as this occurs the spring will immediately snap the lever 704 to the extremity of its clockwise limit of movement, causing the pin 705 acting in the slot 705a to shift the shutter 692 counter-clockwise, and thereby to bring the openings 695, 696 and 697 of the shutter to the tops of the dials as the openings 698, 699 and 700 are illustrated in Fig. 50. The openings 698, 699 and 700 will, of course, be simultaneously carried out of view.

The pin 705 in its shifting movement will first travel along the slot 705 toward the axis of the shaft 352, but when the pin 705 in its downward travel has crossed the line of centers of the shafts 352 and 676 it will again travel toward the outer end of the slot while continuing to swing the shutter counter-clockwise. This shifting movement is limited by the re-engagement of the pin 705 with the outer end of the slot 705a.

As an incident of the shifting, the pin 703 is carried clear of the path of the pin 701, and the pin 702 is carried into the path of the pin 701. If the counter-clockwise rotation of the shaft 352 be now continued, the carry over will occur in the normal way until the pin 701 is arrested against further counter-clockwise operation by engagement with the back or round side of the pin 702. This occurs substantially at 180°.

When the counter is initially on the positive side, and is operated with negative input through zero, the pin 701 traveling clockwise engages the flat side of the pin 702 as the carry over through zero occurs, and thereby shifts the lever 704 counter-clockwise until the spring 706 crosses the axis of shaft 676, whereupon the lever 704 is further snapped counter-clockwise to complete the shifting movement to the position illustrated in Fig. 48. Further negative rotation is arrested at minus 180 degrees by engagement of the pin 701 with the round side of pin 703.

The declination indicator dial is the same in all respects as the longitude indicator dial which has just been described with the following exceptions:

The carry-over gearing from the degrees units wheel to the tens wheel imparts one-ninth of a revolution to the tens wheel. The tens wheel bears the numbers from zero to eight in two zones, the numbers of each zone being arranged at equal space intervals. The numbers of the right hand zone for indicating north declination are arranged to be brought up in ascending order as the wheel is turned away from the operator, while the numbers of the left hand zone for indicating south declination are arranged in the reverse order. On this wheel of highest denomination the zero of each series coincides with the eight of the other series.

Since the wheel is completely rotated by nine carry-over steps, the shutter shifting mechanism is effective to limit the input in one direction to 90° north and in the other direction to 90° south.

The altitude dial may be made in all respects the same as the declination dial save that there is no need for a shiftable shutter since there is never any such thing as a negative altitude angle. The shutter, therefore, is directly affixed to the downwardly extending arms of the counter supporting yoke. The altitude dial is limited in its operation to zero in one direction and to plus 90° in the other by providing an abutment or pin on the wheel of highest denomination for co-acting with a stop arm provided on the dial shaft and having capacity for limited movement between spaced abutment pins fixed on one of the end plates of the supporting yoke.

The latitude indicating dial 15 may be the same as the declination dial 16 in all respects.

The Greenwich civil time indicator dial 8 is the same as the longitudinal indicating dial 13 with the following exceptions:

Each dial wheel carries only one set of numbers. There is no shiftable shutter, the shutter being fixed to the dial supporting yoke. The wheel of lowest denomination, which is the seconds wheel, is divided into twelve equal number spaces, and the series of numbers from zero to five occurs twice on the wheel. The carry-over disc associated with the wheel has two carry over notches and two associated two-toothed lugs. The carry over occurs once, therefore, for each half revolution of the seconds wheel. Each number space is divided into five equal parts by an index scale. The carry over to the minutes units wheel produces a step equal to one-tenth of a revolution of the wheel. The tens wheel for showing minutes is like the seconds wheel; that is, its has twelve equal number spaces and the series of numbers from zero to five is repeated upon it. This wheel also carries over to the next higher denomination wheel once for every half revolution.

The hours wheel is divided into twenty four equal number spaces and bears the series of numbers from "0" to "23." Carry-over to this wheel causes the wheel to be turned one number space, that is, one twenty-fourth of a revolution.

The Greenwich civil time dial 8 is limited to zero in one direction and to twenty-four hours in the other direction by means of a pin carried by the hours wheel. The pin coacts with an arm freely mounted on the dial shaft 317, which arm has capacity for limited shifting between a pair of stops carried by the adjacent end plate or arm of the dial supporting yoke.

The right ascension dial 12 is the same as the Greenwich civil time dial 8 in every respect.

The sun dial, the star wheel, the declination synchronizer, and the synchronizer are all simple decimal counters capable of operation in either direction. Each counter includes four denomination wheels. In the datum position for the star dial the letters S, T, A and R appear, respectively, upon the denomination wheels in descending order. The wheel of lowest denomination is divided into ten spaces, the letter R together with a distinctive index mark appearing at one of them, and dots appearing at each of the others, so that the operator may readily see that the dial is being turned, and in which direction the dial is being turned.

The other three counters have wheels of lowest denomination which are similar to the wheel of lowest denomination of the star dial, save that a special index mark only, appears in the datum position rather than a letter.

In certain of the appended claims the symbols $h$, $L$, $d$ and $t$ are used to designate altitude, latitude, declination and local hour angle, respectively.

We have described what we believe to be the best embodiments of our invention. We do not wish, however, to be confined to the embodiments shown, but what we desire to cover by Letters Patent is set forth in the appended claims.

We claim:

1. A navigating machine including, in combination, means for mechanically deriving a measure of the Greenwich hour angle of the apparent sun from date and Greenwich civil time inputs, a differential gear, means operable to cancel out the derived measure of the Greenwich hour angle and concomitantly to transmit such measure to the differential gear through one arm of the latter, a trigonometric computer, separate means for transmitting, respectively, to the trigonometric computer altitude, latitude, declination and local hour angle inputs, the local hour angle input transmitting means being connected to a second arm of the differential gear, an indicator operated by the computer for showing when the four inputs are in harmonious relation, means connected to the third arm of the differential gear to enter the difference between the Greenwich hour angle and the local hour angle, and an indicator connected thereto to enter the difference as longitude.

2. A navigating machine, including, in combination, separate means for running in the date, Greenwich civil time, and the right ascension of a heavenly body, means for combining said inputs and for mechanically deriving therefrom a measure of the Greenwich hour angle of the heavenly body, a differential gear, means operable to cancel out the derived measure of the Greenwich hour angle and concomitantly to transmit such measure to the differential gear through one arm of the latter, a trigonometric computer, separate means for transmitting respectively to the trigonometric computer altitude, latitude, declination and local hour angle inputs, the local hour angle input transmitting means being connected to a second arm of the differential gear, an indicator operated by the computer for showing when the four inputs are in harmonious relation, means connected to the third arm of the differential gear to enter the difference between the Greenwich hour angle and the local hour angle, and an indicator connected thereto to enter the difference as longitude.

3. A navigating machine including, in combination, means for running in the date and hour of Greenwich civil time and for mechanically obtaining therefrom a measure of the declination of the sun, and a measure of the Greenwich hour angle of the apparent sun, a trigonometric computer, separate means for running into the computer, respectively, the altitude of the sun and the latitude of the observer, means for canceling the measure of the Greenwich hour angle and concomitantly running such value into the computer, means for canceling the measure of the declination of the sun and concomitantly running such value into the computer, means operated by the computer for indicating when the hour angle run in is the local hour angle consistent with the latitude, declination and altitude inputs, means for readjusting the hour angle input to the correct local hour angle, and means for indicating the longitude as the difference between the local hour angle and the Greenwich hour angle.

4. A navigating machine including, in combination, an indicator, means for running in the date and hour of Greenwich civil time and for thereby displacing the indicator an amount equal to the Greenwich hour angle of the apparent sun, trigonometric computing mechanism comprising a series of sine and cosine gears, separate means for running into the computing mechanism the altitude and the declination, respectively, means for running into the computing mechanism the difference between the Greenwich hour angle and longitude, and means for running the latitude into the computing mechanism, said gears being connected to be operated exclusively by the angular inputs referred to or combinations thereof as distinguished from trigonometric functions thereof and producing as outputs operations which are trigonometric functions of the angular inputs, and said computing mechanism further including means for combining the functional outputs, to produce an ultimate output which is of predetermined value when all of the inputs are harmonious in their values, an indicator operated by said ultimate output for showing when the latitude run in is in harmony with the other angular inputs run into the computing mechanism, and means for exhibiting the value of the latitude run in.

5. A machine for solving spherical triangles including, in combination, a plurality of separate input members for running in altitude, latitude, declination and hour angle, respectively, and a trigonometric computing mechanism under the joint control of said input members and connected to be responsive to each of them, and including a sine cam and a series of cosine cams, the sine cam being responsive to the altitude input to produce an output which is the sine of the altitude, and the cosine cams being responsive to combinations of the other angular inputs, means for combining outputs of the cosine cams to secure as a combined output in each instance a monomail term of a standard triangle formula, and means for combining all the monomial terms, including the sine of the altitude, to secure an ultimate output which is of predetermined value when all of the inputs are harmonious in value, and an indicator operated by the ultimate output for showing when all of the inputs are harmonious in value.

6. A computer including a sine cam and six cosine cams, an altitude input means for running the altitude to the sine cam, a latitude input, means for running the latitude positively to all the cosine cams, a declination input, means for running the declination positively to three of the cosine cams and negatively to three of them, means for running the local hour angle positively to two of the cosine cams which receive the declination positively and negatively, respectively, and negatively to two of the other cosine cams which receive the declination positively and negatively, respectively, means for combining the outputs of the two consine cams which receive no local hour angle input to provide an output bearing a fixed relation to sin $L$ sin $d$, means for combining the outputs of the other four cosine cams to provide an output bearing a fixed relation to cos $L$ cos $d$ cos $t$, means for combining these combined outputs with one another and with the output of the sine cam in such proportion and in such relation as to signs that the net output for simultaneous values of latitude, altitude, declination and hour angle will invariably be a constant, an indicator, and means for transmitting the combined final output to the indicator.

7. A computer comprising a series of trigonometric gears, means for running in four distinct angular values, $L$, $d$, $t$ and $h$, separately, means for deriving an output bearing a fixed relation to sin $h$ from one of the trigonometric gears, means for deriving from the $L$ and $d$ inputs an output bearing a fixed relation to sin $L$ sin $d$ from one set of the gears, and means for deriving from the $L$, $d$ and $t$ inputs an output bearing a fixed relation to cos $L$ cos $d$ cos $t$ from another set of the gears, means for combining the outputs referred to, an indicator, and means for running the combined outputs continuously into the indicator.

8. In a navigating machine, in combination, an hour angle dial, a trigonometric computer including mechanism responsive to hour angle, altitude, latitude and declination inputs and an indicator operated thereby for indicating whether or not the four inputs are in harmonious relation to one another, means for deriving a measure of the Greenwich hour angle of a heavenly body including a plurality of separate input members, means for combining the inputs thereof, and means for running the combined inputs into the dial, separate means for running the altitude, latitude and declination, respectively, into the trigonometric computer, and means for running the hour angle dial back to its datum position and for running the Greenwich hour angle into the trigonometric computer as an incident of such operation.

9. In a navigating machine, in combination, a declination dial, a trigonometric computer including mechanism responsive to hour angle, altitude, latitude and declination inputs and an indicator operated thereby for indicating whether or not the four inputs are in harmonious relation to one another, means for deriving a measure of the declination of a heavenly body including separate data and hour input members, means for combining said inputs, means for producing a declination output therefrom, and means for running said output into the dial to the exclusion of the computer, means for running the altitude, latitude and local hour angle into the computer to the exclusion of the declination dial, and means for running the declination indicator back to its datum position and for running the declination into the computer as an incident of such operation.

10. In a navigating machine, in combination, Greenwich hour angle and declination dials, a trigonometric computer including mechanism responsive to hour angle, altitude, latitude and declination inputs and an indicator operated thereby for indicating whether or not the four inputs are in harmonious relation to one another, means for deriving a measure of the Greenwich hour angle from date and hour inputs and for running such measure into the hour angle dial, means for deriving a measure of declination from the date and hour inputs and for running such measure into the declination dial, separate means for running the altitude and latitude, respectively, into the computer to the exclusion of the dials, means for running the Greenwich hour angle dial back to its datum position and for running the Greenwich hour angle into the computer as an incident of such operation, and means for running the declination dial back to its datum position and for running the declination into the computer as an incident of such operation.

11. A navigating machine comprising, in combination, a main section comprising mechanism for performing operations based on the Greenwich hour angle of the apparent sun which section includes a Greenwich civil time input member, and a replaceable almanac section including a date input member and mechanism for deriving the equation of time from the date and hour inputs, an operating train running from the hour input member of the main section to the equation of time mechanism of the almanac section, an operating train running from the equation of time mechanism of the almanac section into the main section to transmit the equation of time as an output from the almanac section into the main section, means in the main section for combining the equation of time with the Greenwich civil time input to yield an output which is a measure of the Greenwich hour angle of the apparent sun, and means for separably connecting the almanac section to the main section, said trains including separable driving connections between the almanac section and the main section to facilitate removal of one almanac section capable of covering one period and its replacement by another similar almanac section capable of covering a following period.

12. A navigating machine comprising, in combination, a main section including mechanism for running in various elements of a navigation problem involving determination of position, said section including means for running in the Greenwich hour angle of the mean sun, and a replaceable almanac section, including a date input member and mechanisms responsive to the date and hour input members for simultaneously producing, respectively, equation of time and declination inputs to the main section, both required for solving a single navigation problem based on the date and hour, means in the main section for combining the equation of time input with the Greenwich hour angle input to produce a resulting output which is a measure of the Greenwich hour angle of the apparent sun, and means in the main section for utilizing the so-derived measure of the declination and of the Greenwich hour angle of the apparent sun together with the other elements run in to determine position.

13. In a navigating machine, in combination, a pair of hour angle dials, one for star work and the other for sun work, means for deriving the Greenwich hour angle of the apparent sun from date and Greenwich civil time inputs and running the Greenwich hour angle of the apparent sun into one dial, means for deriving the Greenwich hour angle of the first point of Aries from date and Greenwich civil time inputs, means for running in the right ascension of a heavenly body, means for deriving from such hour angle of the first point of Aries and the right ascension of a heavenly body the Greenwich hour angle of such heavenly body, and for running the Greenwich hour angle of such heavenly body into the other dial, a trigonometric computer including mechanism responsive to hour angle, altitude, latitude and declination inputs and an indicator operated thereby for indicating whether or not the four inputs are in harmonious relation to one another, separate means for running altitude, latitude and declination, respectively, into the trigonometric computer to the exclusion of the hour angle dials, and means for simultaneously operating the dials to run either dial back to its datum position and for running into the trigonometric computer as an incident of such operation the Greenwich hour angle of whichever dial is returned to its datum position.

14. A navigating machine comprising, in combination, a main section including mechanism for performing operations in dependence upon a non-linear function of the date and Greenwich civil time such as the equation of time or the declination of the sun, said main section including an hour input member, and an almanac section including a date input member and a translating mechanism responsive to said input members for producing as an output a non-linear function of the date and Greenwich civil time as hereinabove referred to which is appropriate to the date and hour, said sections including a train for transmitting the date input from the almanac section into the main section, means in the main section for combining the date and hour inputs, a train for transmitting the combined date and hour inputs back to the translating mechanism of the almanac section, and a train for transmitting the functional output of said translating mechanism from the almanac section into the main section, said sections being separably connected to one another, and each of said trains including a separable driving connection between the sections.

WILLIAM L. MAXSON.
PETER J. McLAREN.
WILLIAM T. GREEN.

---

CERTIFICATE OF CORRECTION.

Patent No. 2,373,771.            April 17, 1945.

WILLIAM L. MAXSON, ET AL.

It is hereby certified that error appears in the printed specification of the above numbered patent requiring correction as follows: Page 26, second column, line 23, claim 9, for the word "data" read --date--; line 30, same claim, for "indicator" read --dial--; and that the said Letters Patent should be read with this correction therein that the same may conform to the record of the case in the Patent Office.

Signed and sealed this 26th day of June, A. D. 1945.

Leslie Frazer (Seal)                       Acting Commissioner of Patents.